United States Patent
Iwami et al.

(10) Patent No.: US 10,841,165 B2
(45) Date of Patent: Nov. 17, 2020

(54) INFORMATION PROCESSING APPARATUS, AND INFORMATION PROCESSING METHOD THAT CHANGE DATA TRANSMISSION ROLES OF DIFFERENT DEVICES

(71) Applicant: SONY CORPORATION, Tokyo (JP)

(72) Inventors: Hideki Iwami, Saitama (JP); Tomoya Yamaura, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 125 days.

(21) Appl. No.: 15/549,202

(22) PCT Filed: Mar. 3, 2016

(86) PCT No.: PCT/JP2016/056563
§ 371 (c)(1),
(2) Date: Aug. 7, 2017

(87) PCT Pub. No.: WO2016/163181
PCT Pub. Date: Oct. 13, 2016

(65) Prior Publication Data
US 2018/0069761 A1 Mar. 8, 2018

(30) Foreign Application Priority Data
Apr. 8, 2015 (JP) ................. 2015-079336

(51) Int. Cl.
*H04W 84/10* (2009.01)
*H04W 84/20* (2009.01)
(Continued)

(52) U.S. Cl.
CPC .............. *H04L 41/12* (2013.01); *G06F 13/00* (2013.01); *H04L 41/0816* (2013.01);
(Continued)

(58) Field of Classification Search
None
See application file for complete search history.

(56) References Cited

U.S. PATENT DOCUMENTS 9,277,007 B2 * 3/2016 Nam .................. H04L 67/1044
9,699,047 B2 7/2017 Goto
(Continued)

FOREIGN PATENT DOCUMENTS

JP 2011-244151 A 12/2011
JP 2014-78785 A 5/2014
(Continued)

OTHER PUBLICATIONS

Extended Search Report issued in European Application 16776350.7-1218 dated Sep. 11, 2018.
(Continued)

*Primary Examiner* — Joshua Joo
(74) *Attorney, Agent, or Firm* — Xsensus LLP

(57) ABSTRACT

An information processing apparatus is appropriately connected wirelessly.
The information processing apparatus has a wireless communication unit and a controller. The wireless communication unit performs data transmission with another information processing apparatus. It is assumed, while data transmission is being performed between the information processing apparatus and a first information processing apparatus which plays the role of a group owner of a network made up of at least the information processing apparatus and the first information processing apparatus, the information processing apparatus is to newly perform data transmission with a second information processing apparatus. In such a situation, the controller performs a control process to exchange information to change roles for carrying
(Continued)

out each data transmission to the first information processing apparatus and the second information processing apparatus.

12 Claims, 43 Drawing Sheets

(51) Int. Cl.
| | |
|---|---|
| *H04L 12/24* | (2006.01) |
| *G06F 13/00* | (2006.01) |
| *H04M 11/00* | (2006.01) |
| *H04M 1/00* | (2006.01) |
| *H04W 8/00* | (2009.01) |
| *H04W 92/08* | (2009.01) |
| *H04W 76/14* | (2018.01) |
| *H04L 29/06* | (2006.01) |
| *H04L 29/08* | (2006.01) |
| *H04W 48/08* | (2009.01) |

(52) U.S. Cl.
CPC ...... *H04L 41/0893* (2013.01); *H04L 65/1083* (2013.01); *H04L 67/1051* (2013.01); *H04M 1/00* (2013.01); *H04M 11/00* (2013.01); *H04W 8/00* (2013.01); *H04W 48/08* (2013.01); *H04W 76/14* (2018.02); *H04W 84/10* (2013.01); *H04W 92/08* (2013.01); *H04L 67/16* (2013.01); *H04W 84/20* (2013.01)

(56) References Cited

U.S. PATENT DOCUMENTS

| | | | |
|---|---|---|---|
| 2011/0085529 A1* | 4/2011 | Choi | H04L 29/08396 370/338 |
| 2011/0280152 A1 | 11/2011 | Saito et al. | |
| 2014/0099987 A1 | 4/2014 | Saito et al. | |
| 2014/0177615 A1* | 6/2014 | Kim | H04W 8/005 370/338 |
| 2014/0223181 A1* | 8/2014 | Bernsen | H04L 9/0833 713/168 |
| 2014/0325049 A1 | 10/2014 | Goto | |
| 2014/0330967 A1 | 11/2014 | Goto | |
| 2014/0347433 A1* | 11/2014 | Kafle | H04L 65/1069 348/14.02 |
| 2014/0351479 A1* | 11/2014 | Lee | H04W 76/14 710/303 |
| 2015/0223029 A1* | 8/2015 | Kanno | H04W 4/08 370/254 |
| 2016/0057215 A1* | 2/2016 | Rayanki | H04L 67/1051 709/228 |
| 2016/0073377 A1 | 3/2016 | Nagara et al. | |
| 2016/0127950 A1* | 5/2016 | Gupta | H04W 48/16 370/255 |
| 2017/0105102 A1* | 4/2017 | Smadi | H04W 4/12 |
| 2018/0234978 A1* | 8/2018 | Shao | H04W 72/02 |

FOREIGN PATENT DOCUMENTS

| | | |
|---|---|---|
| JP | 2014-96074 A | 5/2014 |
| JP | 2014-216767 A | 11/2014 |
| WO | 2013/095394 A1 | 6/2013 |
| WO | 2014/115611 A1 | 7/2014 |
| WO | 2014/171182 A1 | 10/2014 |

OTHER PUBLICATIONS

International Search Report dated May 24, 2016 in PCT/JP2016/056563 filed Mar. 3, 2016.
Japanese Office Action dated Mar. 24, 2020, issued in corresponding Japanese Patent Application No. 2017-511499.

* cited by examiner

F I G . 4
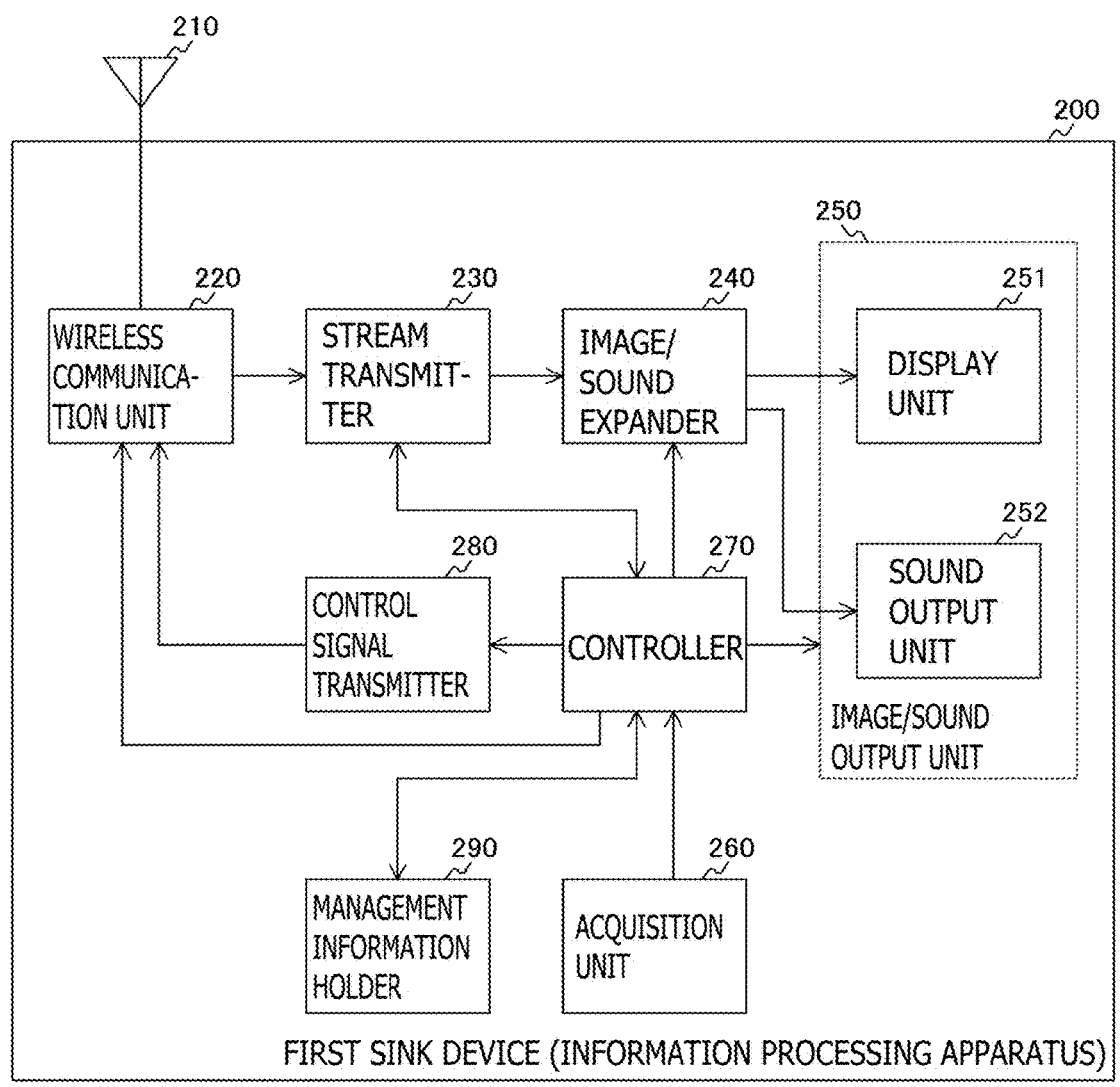

EXAMPLE OF COMMUNICATION FOR WFD capability negotiation USING RTSP PROTOCOL

FIG. 8
EXAMPLE OF TRANSITION IF FIRST SINK DEVICE IS PERMITTED TO CHANGE FROM P2P GO TO P2P CLIENT AND AT LEAST ONE OF SOURCE DEVICE AND FIRST SINK DEVICE IS CONCURRENT-INCOMPATIBLE
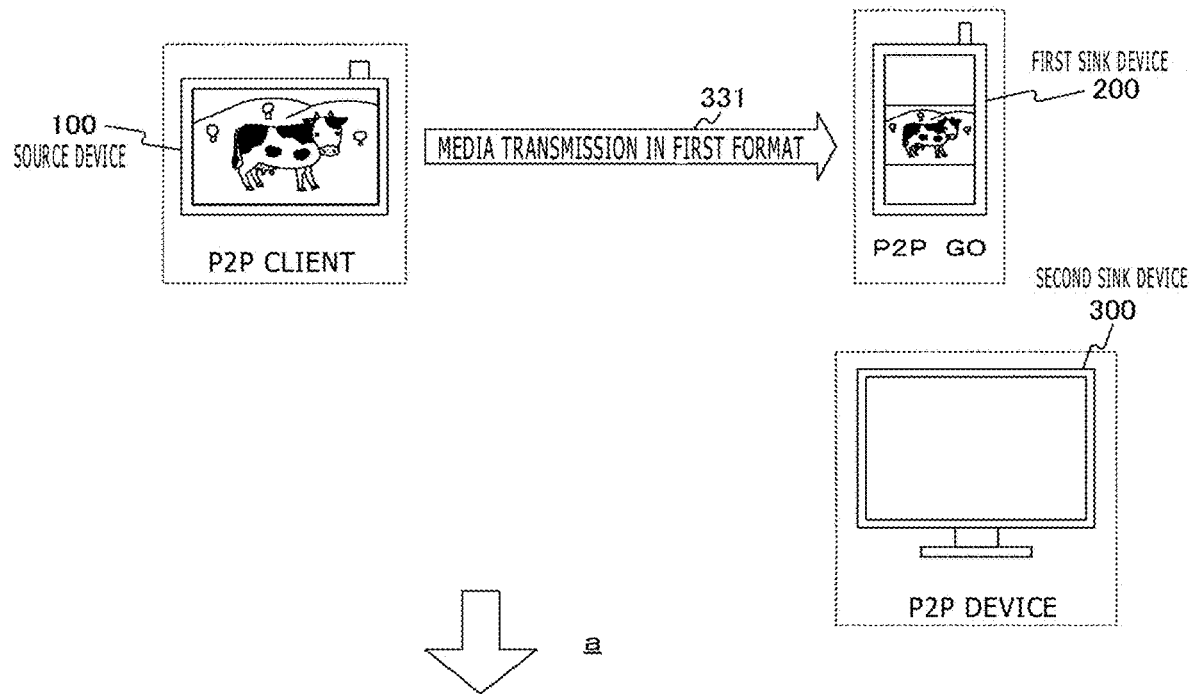
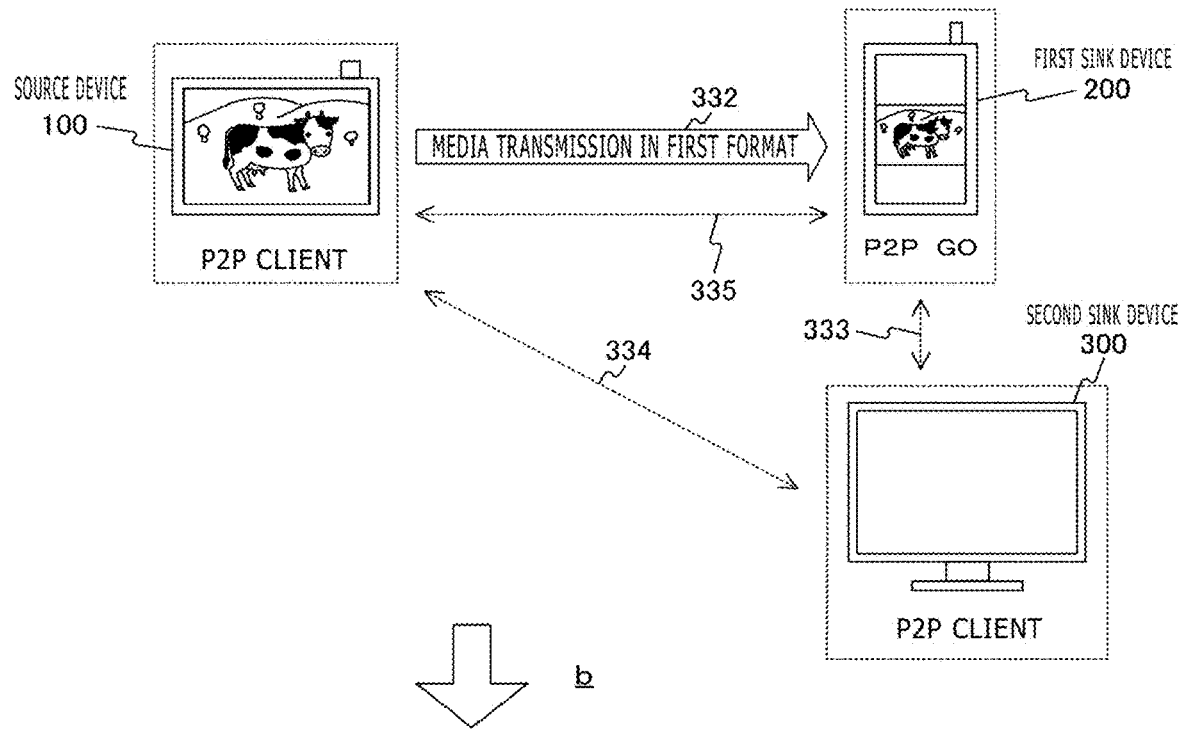

FIG.9
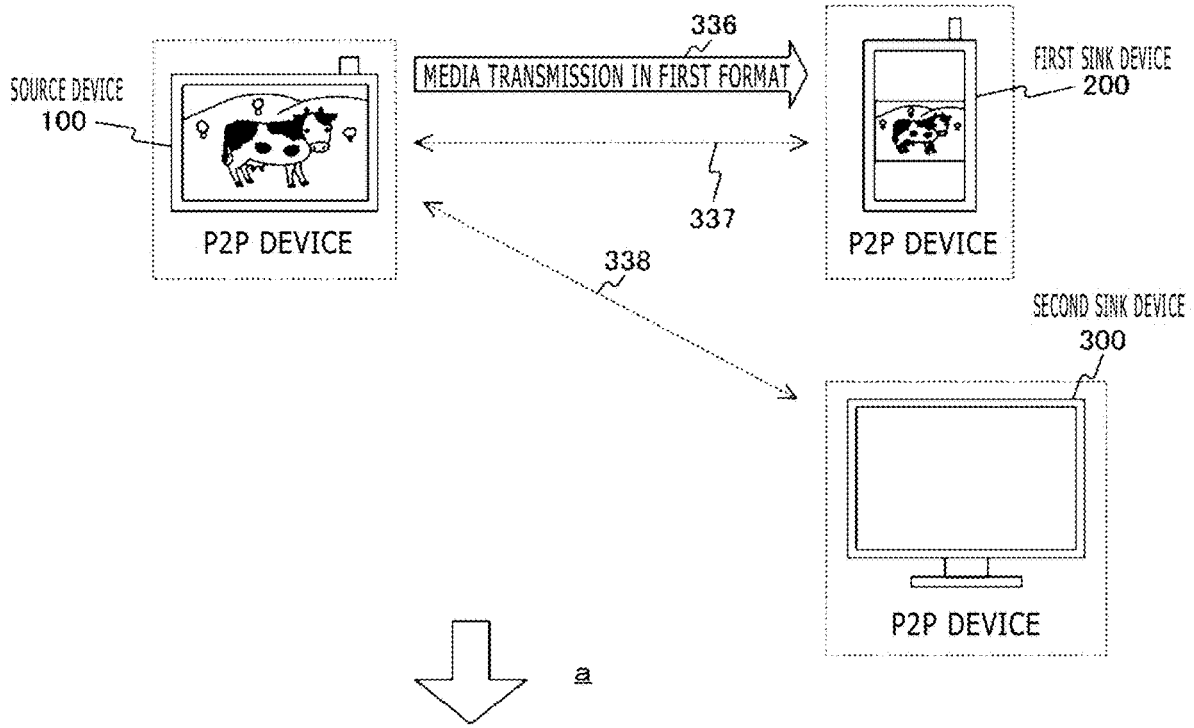
a
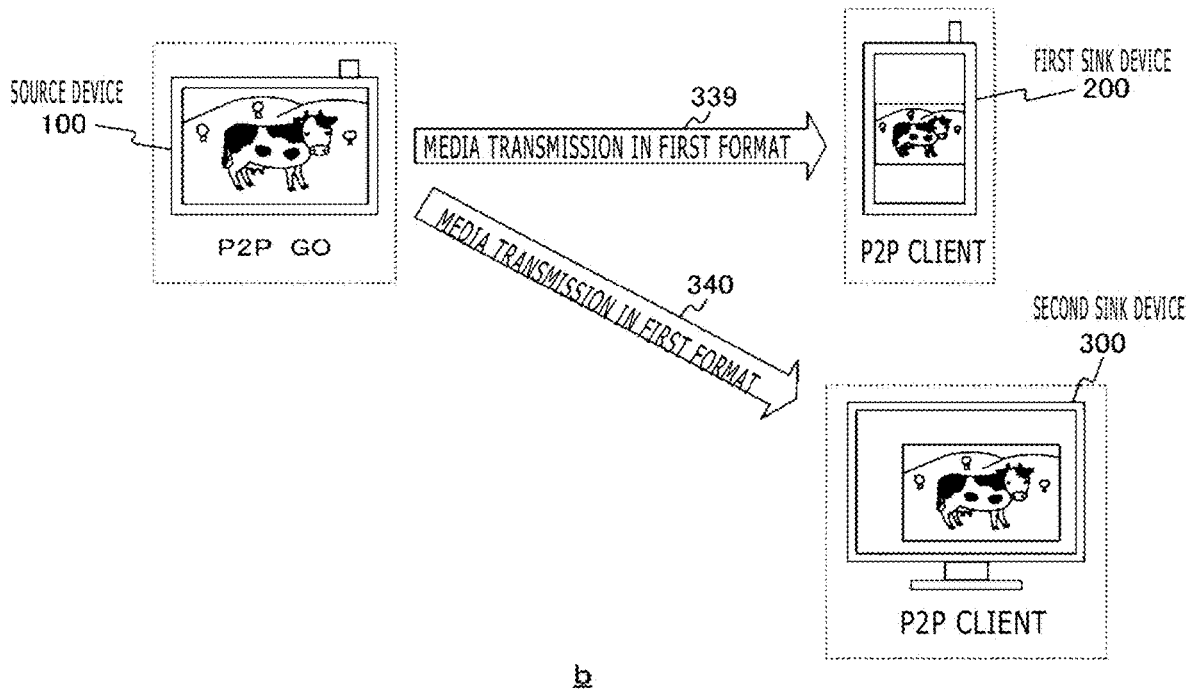
b

FIG. 10
EXAMPLE OF TRANSITION IF FIRST SINK DEVICE IS PERMITTED TO CHANGE FROM P2P GO TO P2P CLIENT AND BOTH SOURCE DEVICE AND FIRST SINK DEVICE ARE CONCURRENT-COMPATIBLE
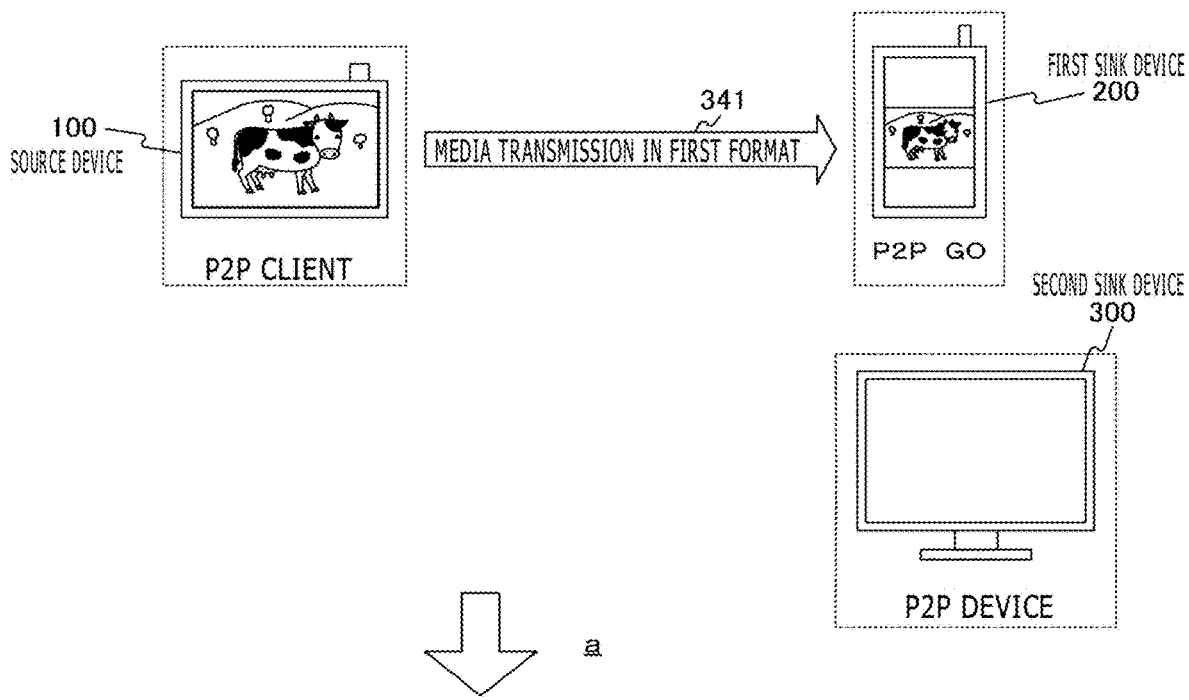
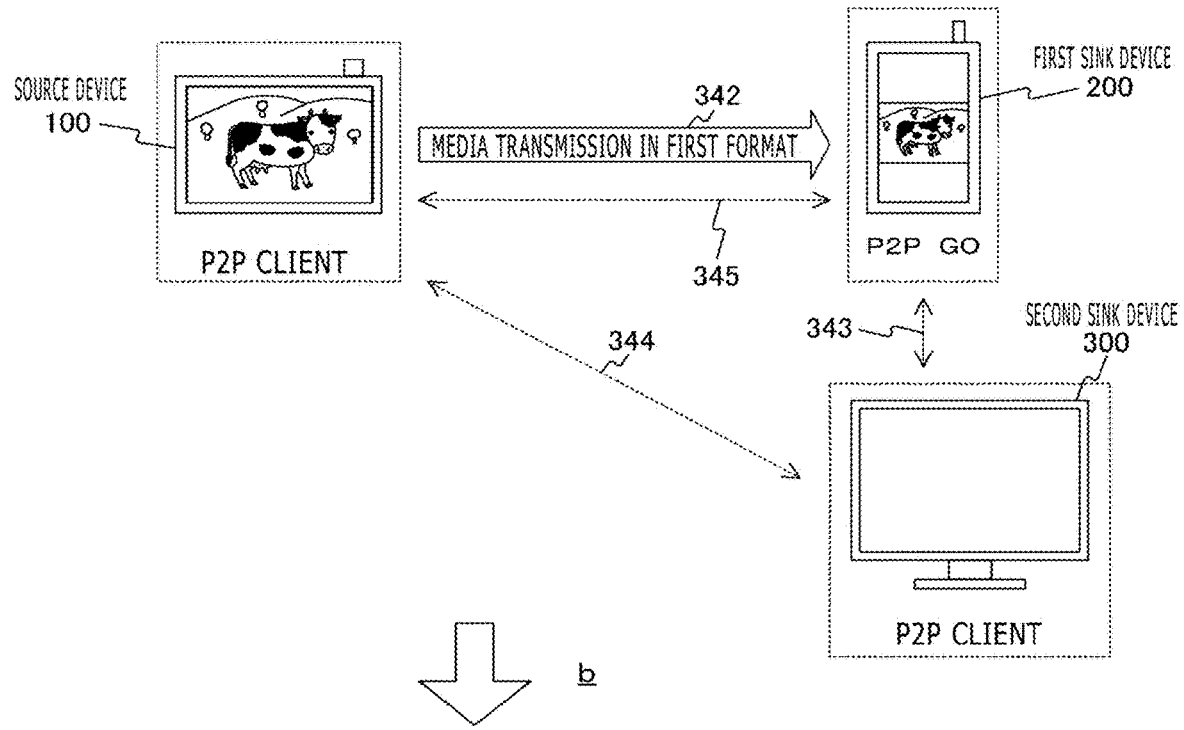

FIG.11
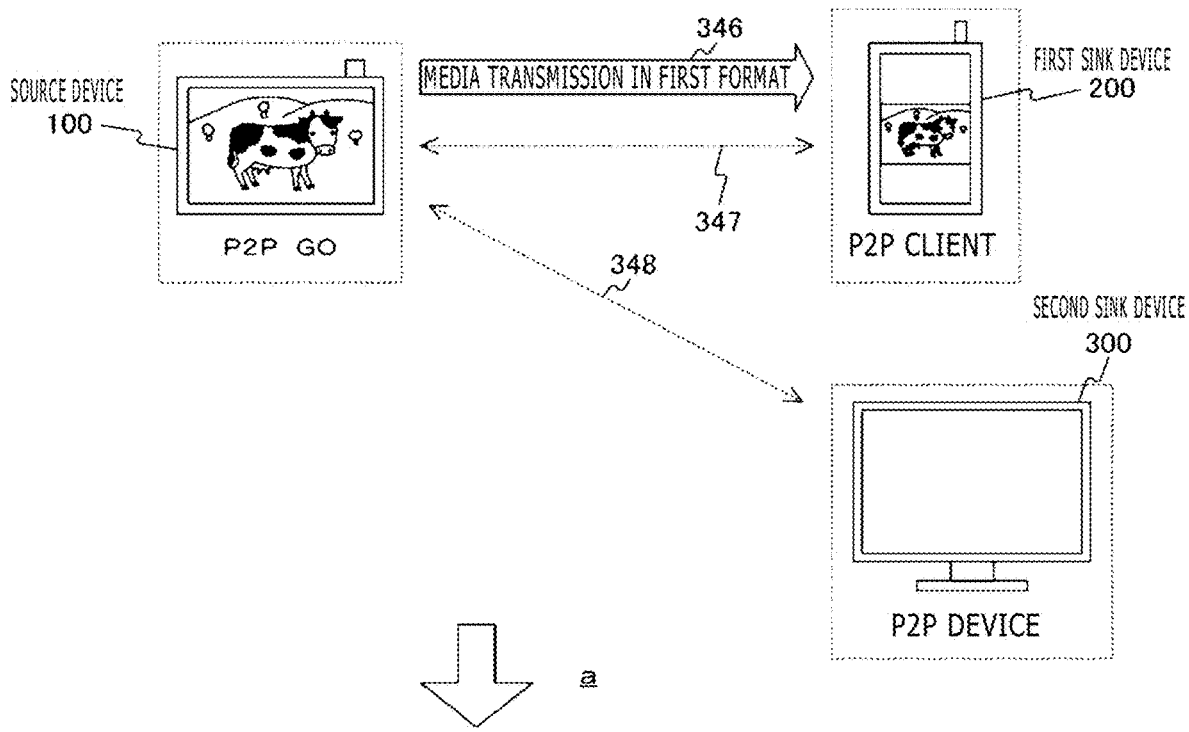
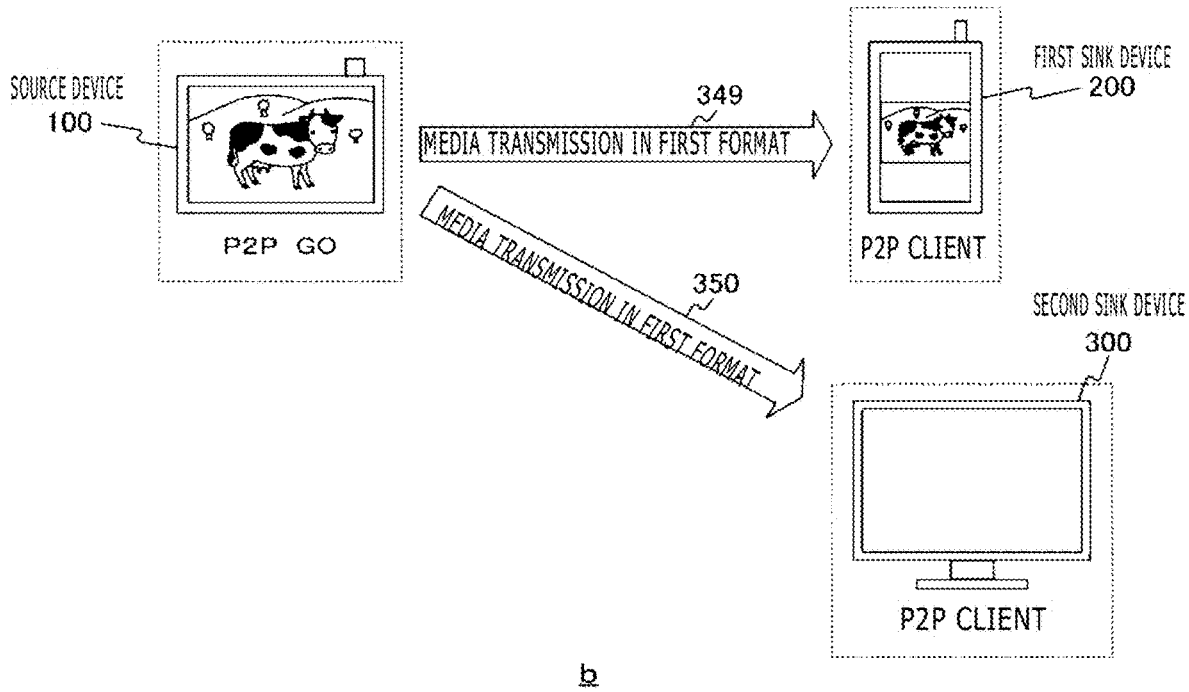

FIG.12
EXAMPLE OF TRANSITION IF FIRST SINK DEVICE IS NOT PERMITTED TO CHANGE FROM P2P GO TO P2P CLIENT AND SOURCE DEVICE IS INCOMPATIBLE WITH A PLURALITY OF OPERATIONS
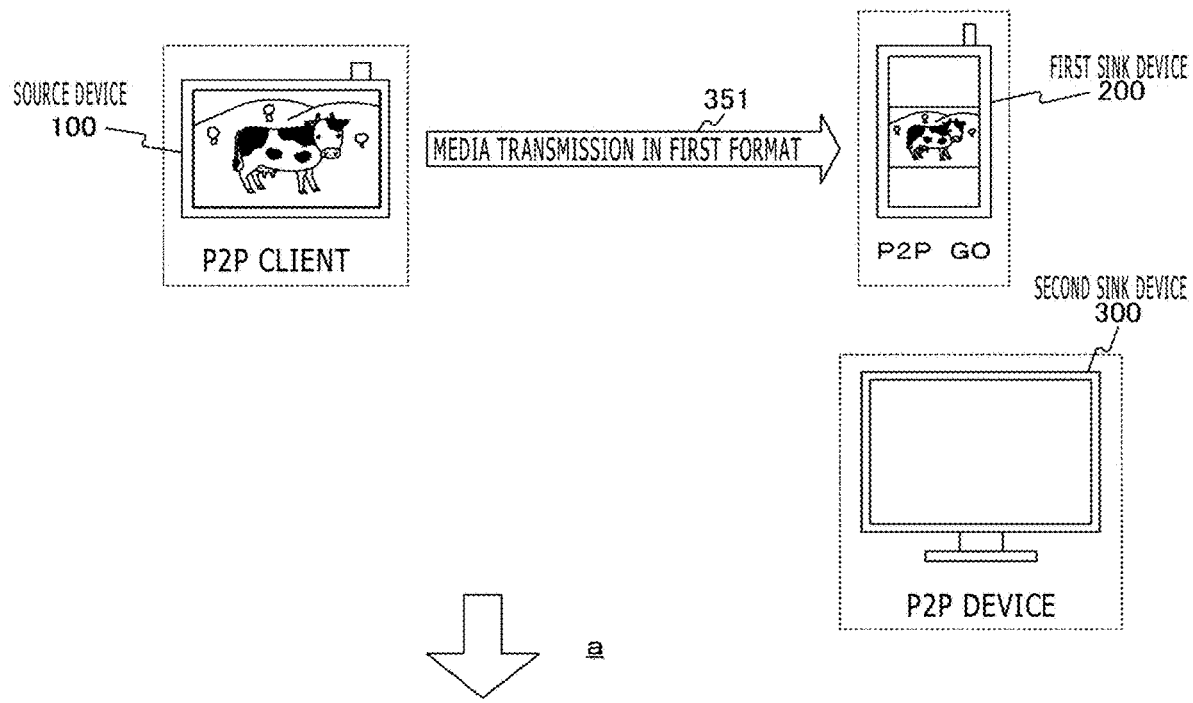
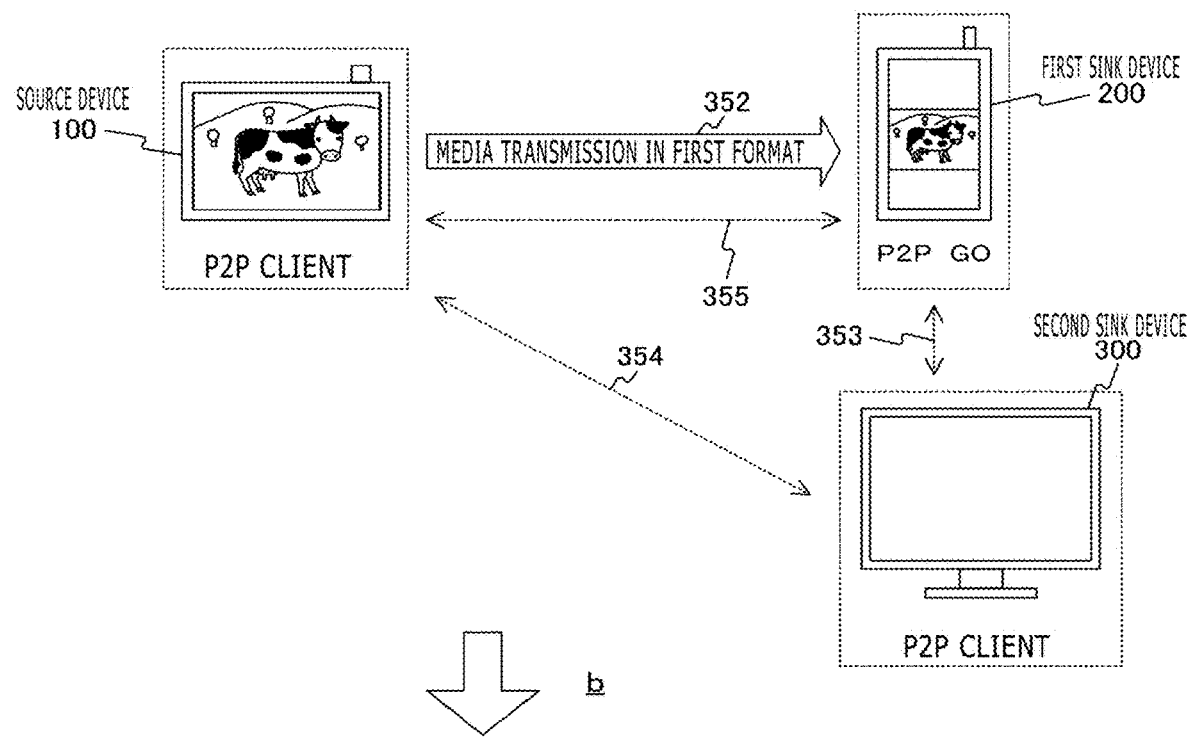

FIG.13
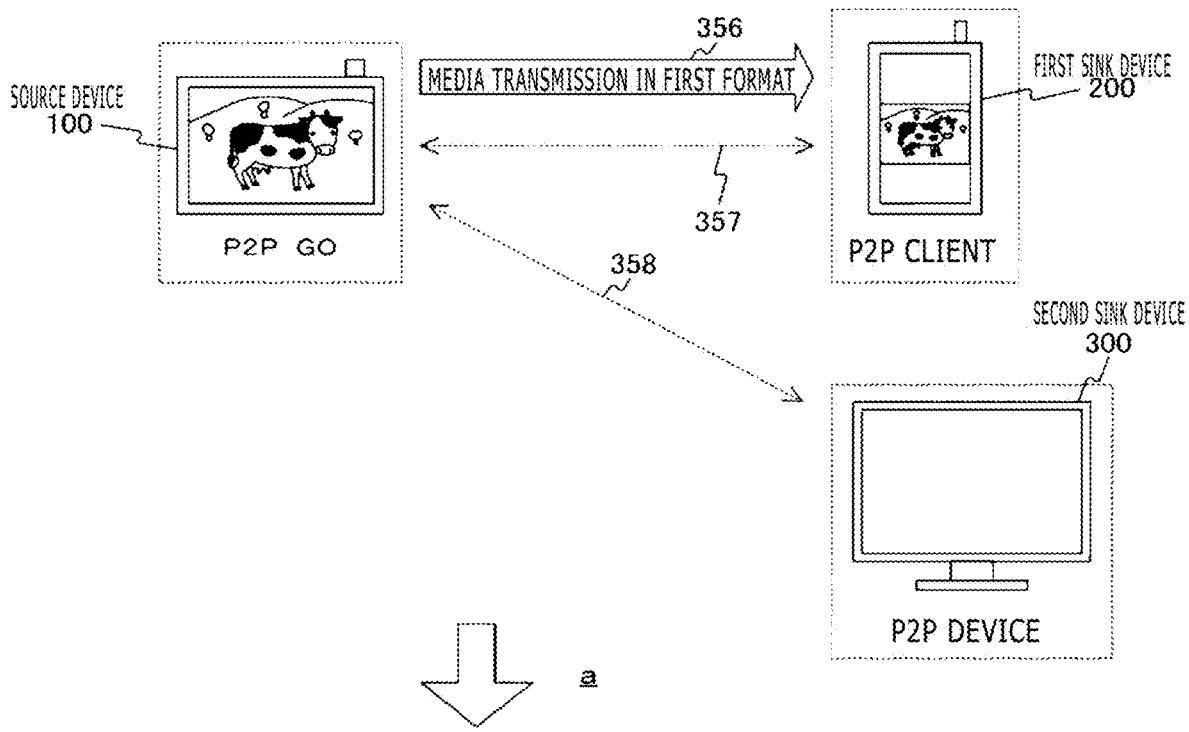
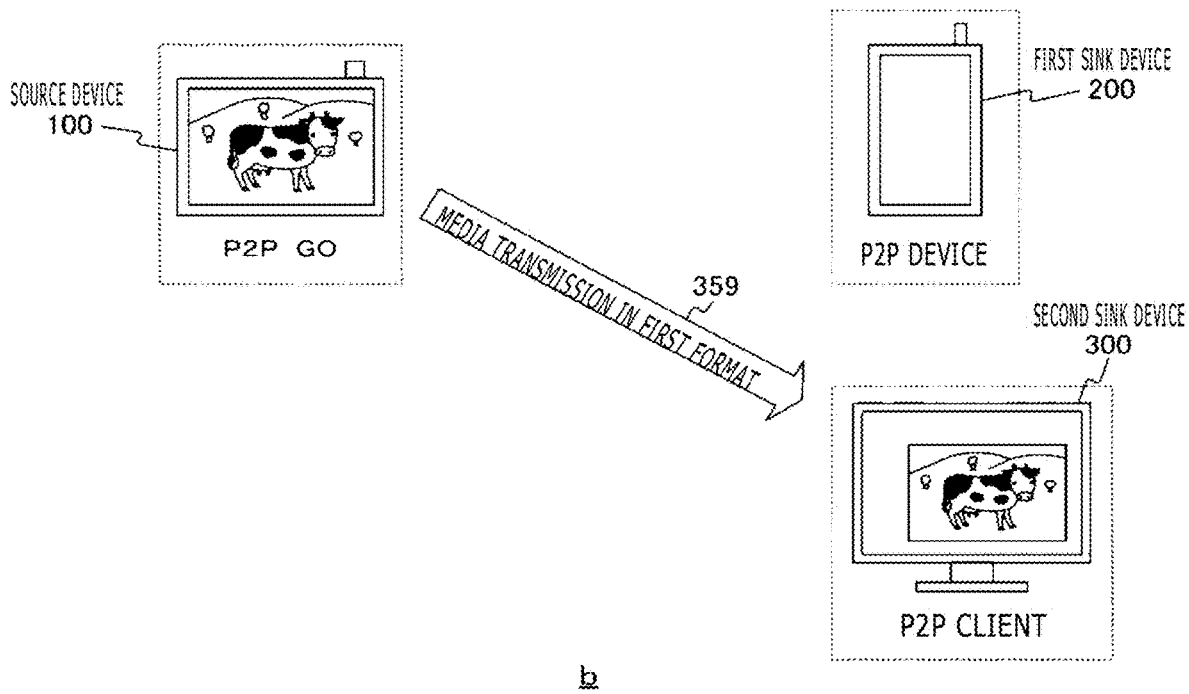

FIG.14
EXAMPLE OF TRANSITION IF FIRST SINK DEVICE IS NOT PERMITTED TO CHANGE FROM P2P GO TO P2P CLIENT AND SOURCE DEVICE IS COMPATIBLE WITH A PLURALITY OF OPERATIONS
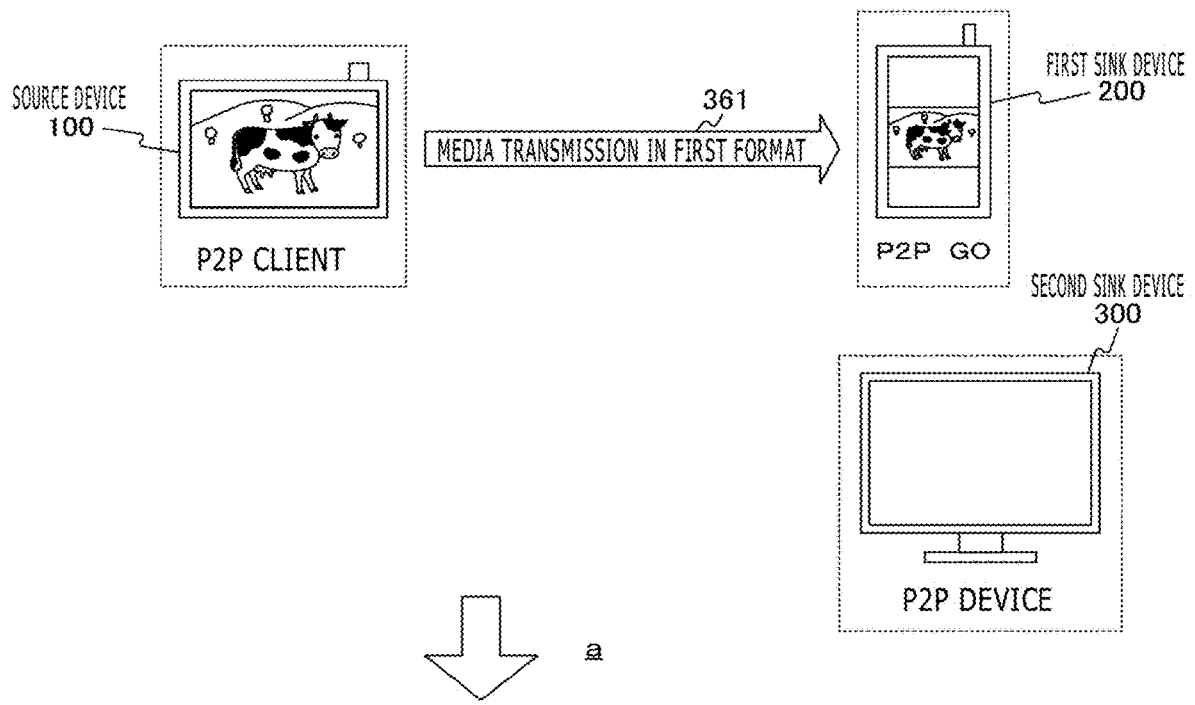
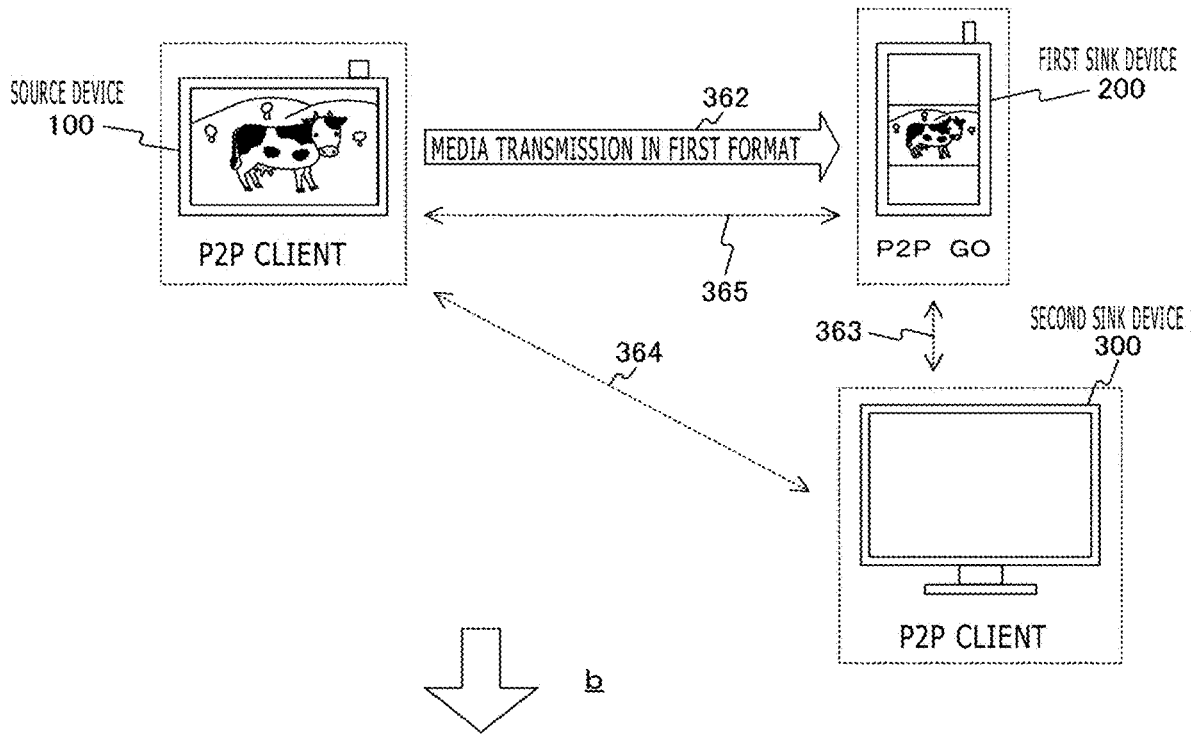

FIG.15
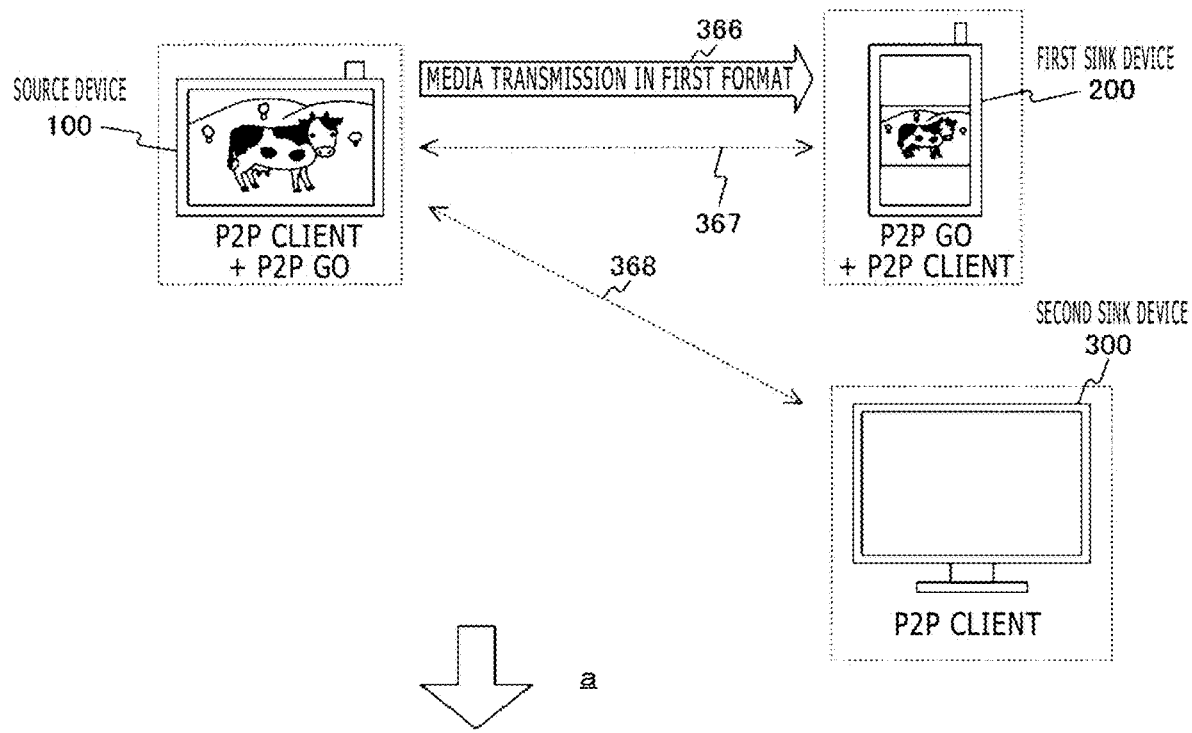
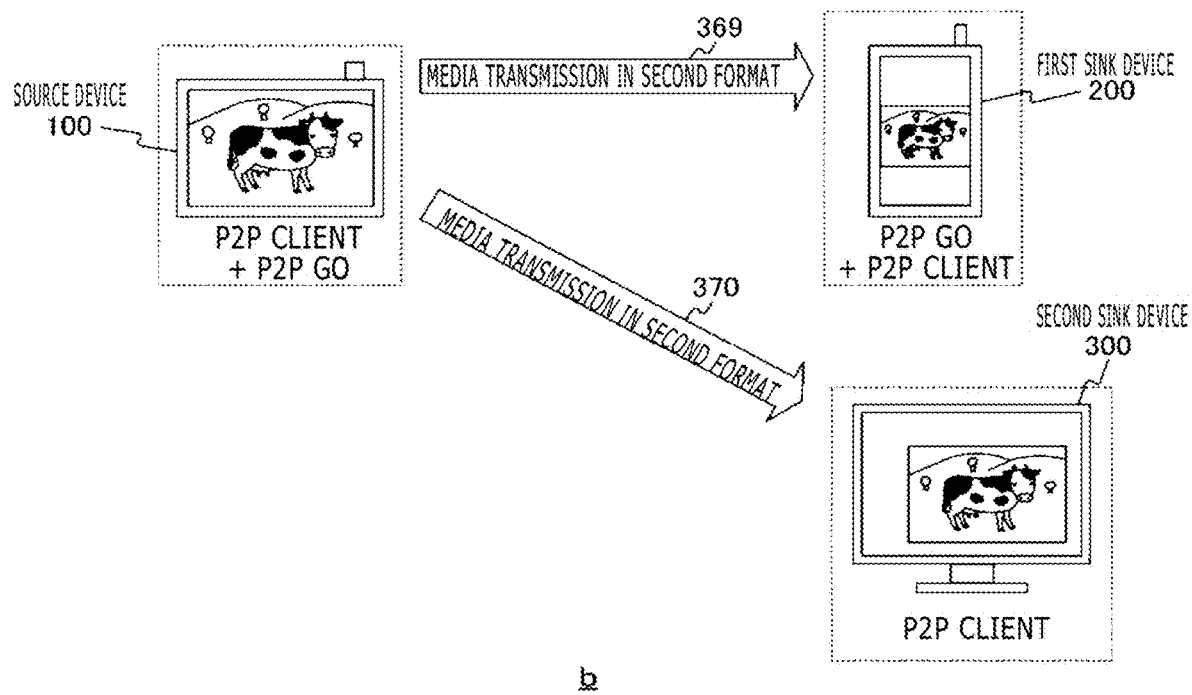

FIG. 16
EXAMPLE OF NOTIFYING USER OF FAILURE TO CONNECT TO OTHER PARTY
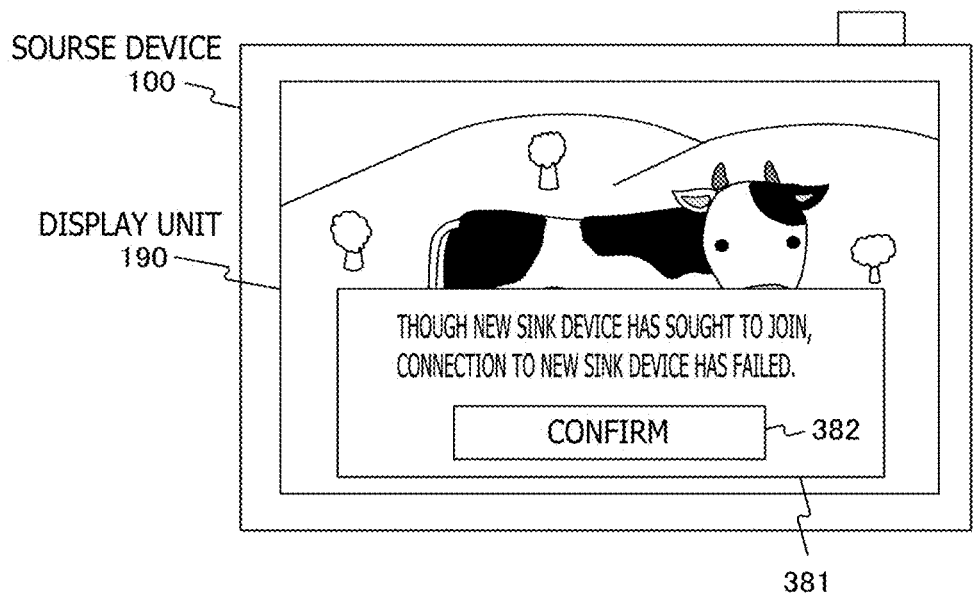
a
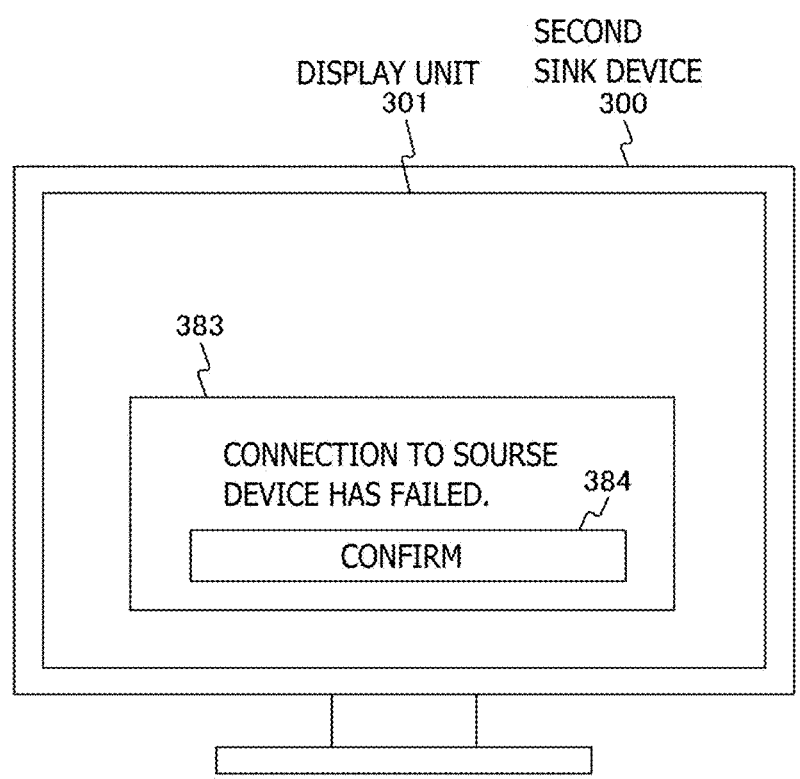
b

FIG. 17
EXAMPLE OF NOTIFYING USER OF CHANGE OF P2P GO
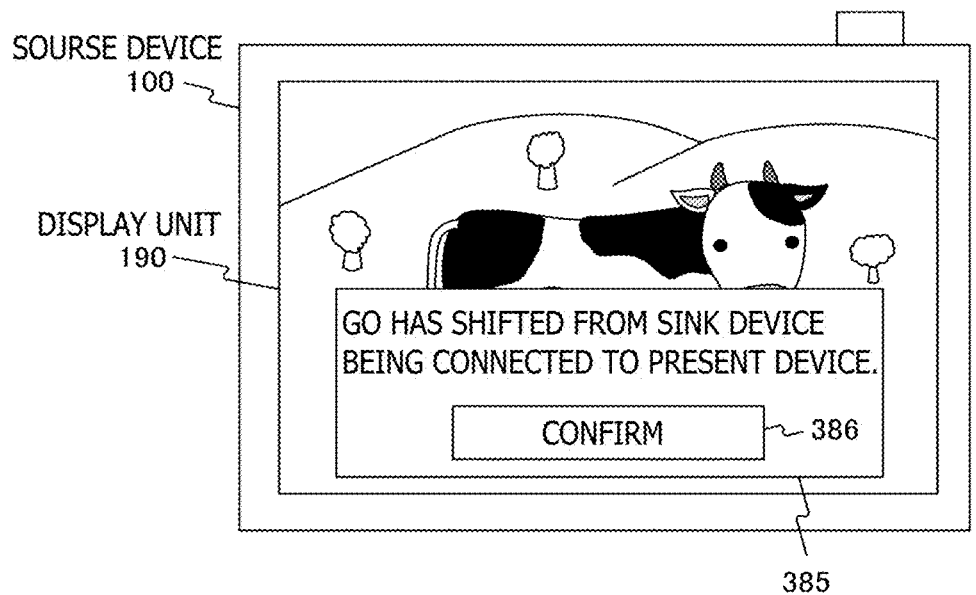
a
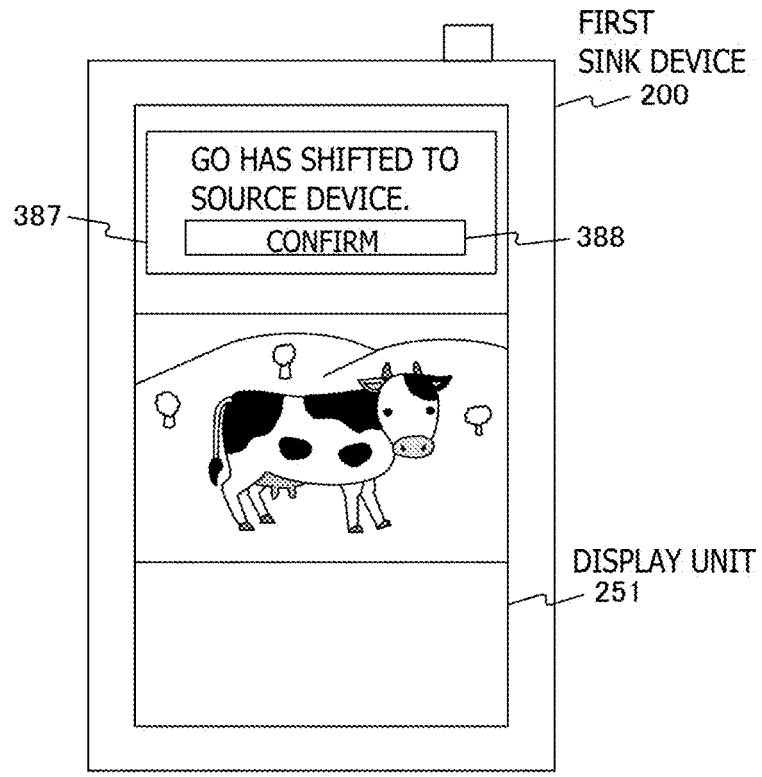
b

FIG. 18
EXAMPLE OF SELECTING SINK DEVICE FOR MEDIA TRANSMISSION THROUGH USER OPERATION
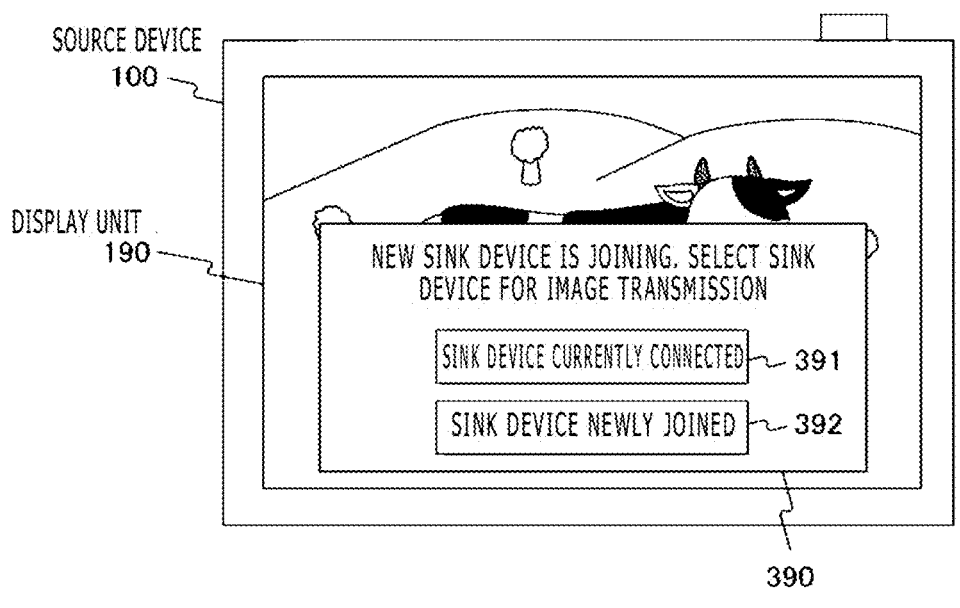
a
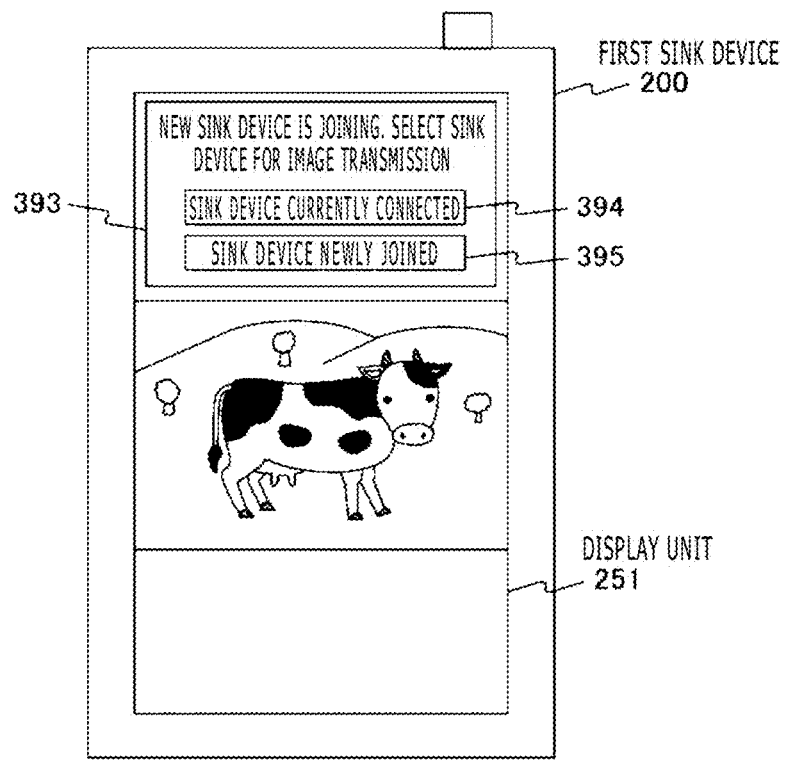
b

FIG. 19
EXAMPLE OF SEARCHING FOR NEW SINK DEVICE AND NOTIFYING USER
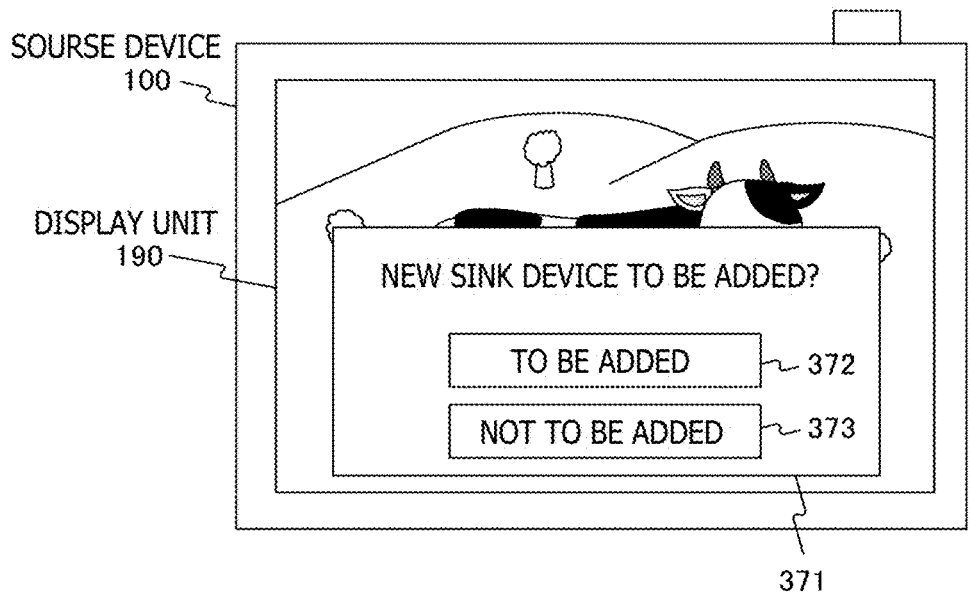
a
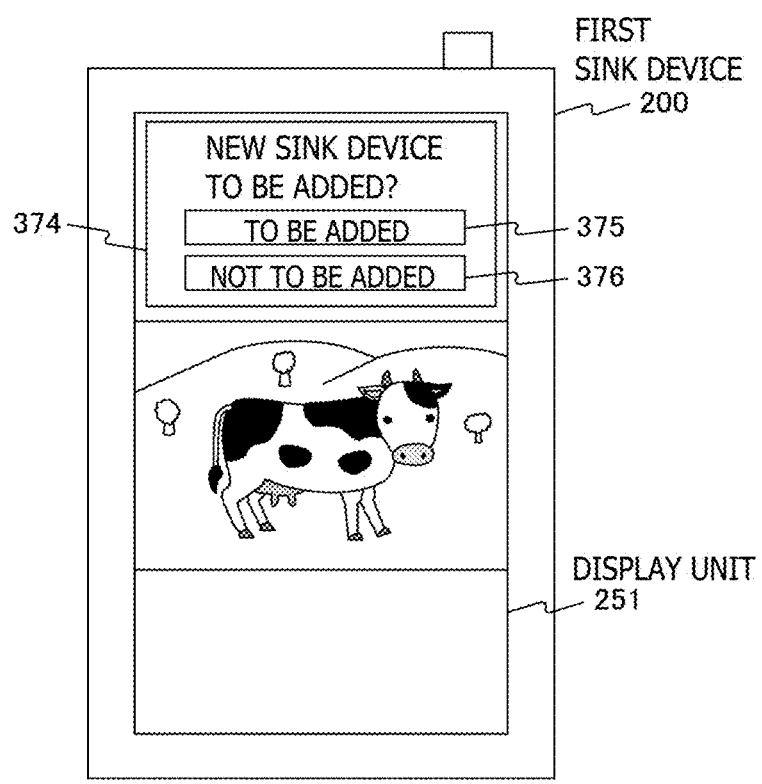
b

FIG.22

EXAMPLE OF WFD IE FORMAT

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI |
| OUI Type | 1 | 0A | Identifying the type or version of the WFD IE. Setting to 0x0A indicates WFA WFD v1.0 |
| WFD subelements | Variable | | One or more WFD Subelements appear in the WFD IE |

FIG.23

EXAMPLE OF General Format of a WFD Subelement

| Field | Size (octets) | Value (Hexadecimal) | Description |
|---|---|---|---|
| Subelement ID | 1 | | Identifying the type of WFD subelement. The specific value is defined in Table 5-3. |
| Length | 2 | Variable | Length of the following fields in the subelements |
| Subelements body field | Variable | | Subelement specific information fields |

FIG. 24

EXAMPLE OF WFD Subelement ID Definitions

| Subelement ID (Decimal) | Notes |
| --- | --- |
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11 | New Device Information |
| 12-255 | Reserved |

FIG. 25

EXAMPLE OF NEW DEVICE INFORMATION SUBELEMENT

| Field | Size (octets) | Value | Description |
|---|---|---|---|
| Subelement ID | 1 | 11 | |
| Length | 1 | 3 | Length of the following fields of the subelement. |
| New Device Information | 3 | | |

FIG. 26

EXAMPLE OF NEW DEVICE INFORMATION FIELD

| Field | Size (octets) | Value | Description |
|---|---|---|---|
| 1:0 | 3 | INFRA CONNECTION | [0] WIRELESS USE (1:Connected 0:Non-use)<br>[1] WIRED USE (1:Connected 0:Non-use) |
| 5:2 | | WIRELESS ABILITY | [5] TIME-DIVISION CONNECTION OF SAME FREQUENCY CHANNELS (1:OK 0:NG)<br>[4] TIME-DIVISION CONNECTION OF DIFFERENT FREQUENCY CHANNELS (1:OK 0:NG)<br>[3] SIMULTANEOUS CONNECTION OF SAME FREQUENCY CHANNELS (1:OK 0:NG)<br>[2] SIMULTANEOUS CONNECITON OF DIFFERENT FREQUENCY CHANNEL (1:OK 0:NG) |
| 10:8 | | Source Capability | 10: INFRA USE (1:OK 0:Non-Available)<br>9: P2P USE (1:OK 0:Non-Available)<br>8: TDLS USE (1:OK 0:Non-Available) |
| 13:11 | | Sink Capability | 13: INFRA USE (1:OK 0:Non-Available)<br>12: P2P USE (1:OK 0:Non-Available)<br>11: TDLS USE (1:OK 0:Non-Available) |
| 23:14 | | Frequency Channel | IF WIRELESS USE IS INDICATED AS CONNECTED IN [1:0], DESCRIBE CHANNEL NUMBER |

FIG.27

EXAMPLE OF PAYLOAD OF ASP MESSAGE

| Field | Size (octets) | Value | Description |
|---|---|---|---|
| 1:0 | 3 | INFRA CONNECTION | [0] WIRELESS USE (1:Connected 0:Non-use)<br>[1] WIRED USE (1:Connected 0:Non-use) |
| 5:2 | | WIRELESS ABILITY | [5] TIME-DIVISION CONNECTION OF SAME FREQUENCY CHANNELS (1:OK 0:NG)<br>[4] TIME-DIVISION CONNECTION OF DIFFERENT FREQUENCY CHANNELS (1:OK 0:NG)<br>[3] SIMULTANEOUS CONNECTION OF SAME FREQUENCY CHANNELS (1:OK 0:NG)<br>[2] SIMULTANEOUS CONNECITON OF DIFFERENT FREQUENCY CHANNEL (1:OK 0:NG) |
| 10:8 | | Source Capability | 10: INFRA USE (1:OK 0:Non-Available)<br>9: P2P USE (1:OK 0:Non-Available)<br>8: TDLS USE (1:OK 0:Non-Available) |
| 13:11 | | Sink Capability | 13: INFRA USE (1:OK 0:Non-Available)<br>12: P2P USE (1:OK 0:Non-Available)<br>11: TDLS USE (1:OK 0:Non-Available) |
| 23:14 | | Frequency Channel | IF WIRELESS USE IS INDICATED AS CONNECTED IN [1:0], DESCRIBE CHANNEL NUMBER |

EXAMPLE OF COMMUNICATION IF FIRST SINK DEVICE IS PERMITTED
TO CHANGE FROM P2P GO TO P2P CLIENT AND AT LEAST ONE OF
SOURCE DEVICE AND FIRST SINK DEVICE IS CONCURRENT-INCOMPATIBLE

EXAMPLE OF SHIFTING GO IF SECOND SINK DEVICE
IS NOT HOLDING CREDENTIALS ABOUT DESTINATION

EXAMPLE OF SHIFTING GO IF SECOND SINK
DEVICE IS HOLDING CREDENTIALS ABOUT DESTINATION

EXAMPLE OF COMMUNICATION IF FIRST SINK DEVICE IS
PERMITTED TO SHIFT FROM P2P GO TO P2P CLIENT AND
BOTH SOURCE DEVICE AND SINK DEVICE ARE CONCURRENT-COMPATIBLE

EXAMPLE OF CONNECTING TO SECOND SINK DEVICE
IF SECOND SINK DEVICE IS NOT HOLDING CREDENTIALS ABOUT DESTINATION

EXAMPLE OF CONNECTING TO SECOND SINK DEVICE
IF SECOND SINK DEVICE IS HOLDING CREDENTIALS ABOUT DESTINATION

EXAMPLE OF CONNECTING TO SECOND SINK DEVICE
IF SECOND SINK DEVICE IS NOT HOLDING CREDENTIALS ABOUT DESTINATION

EXAMPLE OF COMMUNICATION IF FIRST SINK DEVICE IS NOT
PERMITTED TO CHANGE FROM P2P GO TO P2P CLIENT AND
SOURCE DEVICE IS COMPATIBLE WITH A PLURALITY OF OPERATIONS

EXAMPLE OF CONNECTING TO SECOND SINK DEVICE
IF SECOND SINK DEVICE IS NOT HOLDING CREDENTIALS ABOUT DESTINATION

EXAMPLE OF CONNECTING TO SECOND SINK DEVICE
IF SECOND SINK DEVICE IS HOLDING CREDENTIALS ABOUT DESTINATION

FIG. 39
EXAMPLE OF REQUESTING CONNECTION TO NEW SINK DEVICE
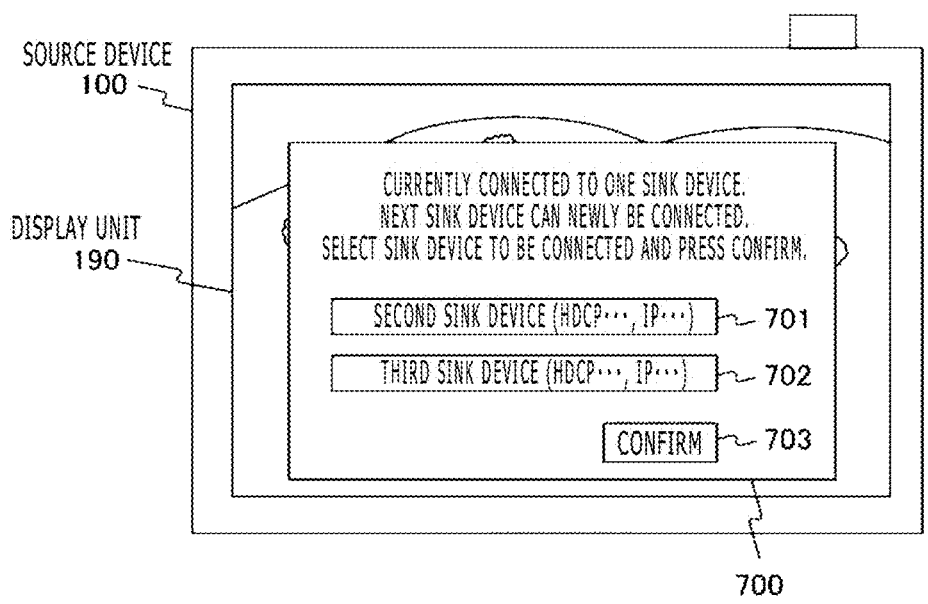
a
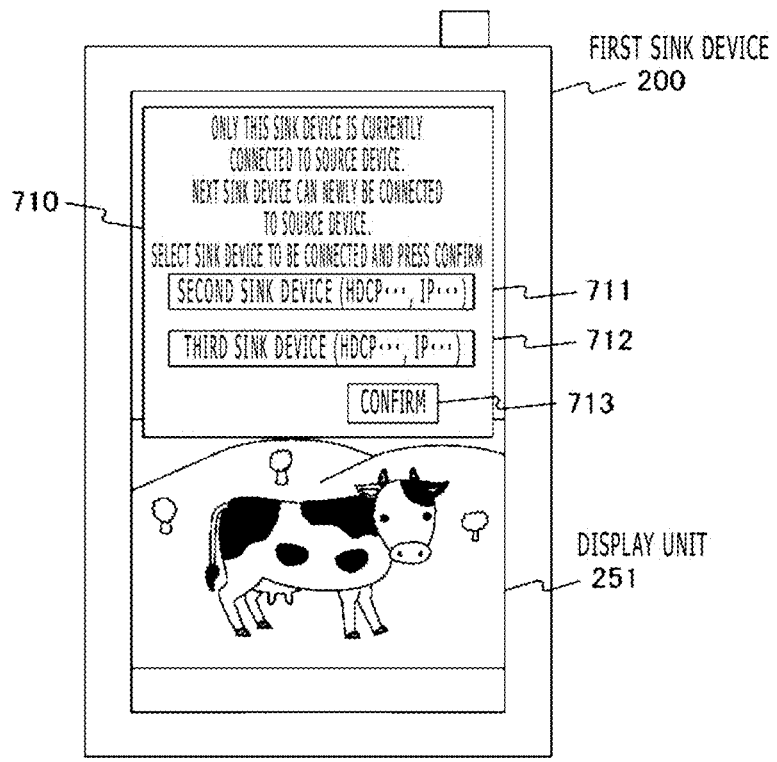
b

EXAMPLE OF OPERATION OF SOURCE DEVICE

EXAMPLE OF COMMUNICATION IF FIRST SINK DEVICE IS PERMITTED
TO CHANGE FROM P2P GO TO P2P CLIENT AND AT LEAST ONE OF
SOURCE DEVICE AND FIRST SINK DEVICE IS CONCURRENT-INCOMPATIBLE

EXAMPLE OF COMMUNICATION IF FIRST SINK DEVICE IS
PERMITTED TO CHANGE FROM P2P GO TO P2P CLIENT AND
BOTH SOURCE DEVICE AND FIRST SINK DEVICE ARE CONCURRENT-COMPATIBLE

EXAMPLE OF COMMUNICATION IF FIRST SINK DEVICE IS NOT PERMITTED TO CHANGE FROM P2P GO TO P2P CLIENT AND SOURCE DEVICE IS INCOMPATIBLE WITH A PLURALITY OF OPERATIONS

EXAMPLE OF COMMUNICATION IF FIRST SINK DEVICE IS NOT PERMITTED TO CHANGE FROM P2P GO TO P2P CLIENT AND SOURCE DEVICE IS COMPATIBLE WITH A PLURALITY OF OPERATIONS

US 10,841,165 B2

INFORMATION PROCESSING APPARATUS, AND INFORMATION PROCESSING METHOD THAT CHANGE DATA TRANSMISSION ROLES OF DIFFERENT DEVICES

TECHNICAL FIELD

The present technology relates to an information processing apparatus. More specifically, the present technology relates to an information processing apparatus and an information processing method that exchange information using wireless communications, and a program for enabling a computer to carry out the method.

BACKGROUND ART

Recent years have seen a widespread use of information processing apparatus that perform wireless communication using a wireless local area network (LAN). The wireless LAN represented by Institute of Electrical and Electronics Engineers (IEEE) 802.11, for example, has been widely used as such a wireless LAN.

There has also been proposed Wireless Fidelity (Wi-Fi) CERTIFIED Miracast, for example, as wireless audio visual (AV) transmission communications (see PTL 1, for example).

CITATION LIST

Patent Literature

[PTL 1]
Japanese Patent Laid-Open No. 2014-96074

SUMMARY

Technical Problems

According to the conventional art described above, it is possible to perform real-time image transmission between two information processing apparatus in accordance with Wi-Fi CERTIFIED Miracast specifications. For instance, it is possible to display an image based on image data sent from a source device on the display unit of a sink device.

It may be imagined that a plurality of source devices are connected to a single sink device. A plurality of sink devices may be imagined to be connected to a single source device. Since various topologies of interconnected devices are expected, it is important that the devices be connected appropriately depending on each topology.

The present technology has been accomplished in view of the above situation, and it is an object the present technology to connect information processing apparatus appropriately in a wireless manner.

Solution to Problems

The present technology has been developed to solve the above problems. According to a first aspect of the technology, there are provided an information processing apparatus, an information processing method, and a program for enabling a computer to perform the information processing method, such that the information processing apparatus including a wireless communication unit configured to perform data transmission with another information processing apparatus, and a controller configured to, while data transmission is being performed between the information processing apparatus and a first information processing apparatus which plays the role of a group owner of a network made up of at least the information processing apparatus and the first information processing apparatus, if the information processing apparatus is to newly perform data transmission with a second information processing apparatus, perform a control process to exchange information to change roles for carrying out each data transmission to the first information processing apparatus and the second information processing apparatus. If the information processing apparatus is to newly perform data transmission with a second information processing apparatus while data transmission is being performed between the information processing apparatus and the first information processing apparatus which plays the role of the group owner, then information to change roles for carrying out each data transmission to the first information processing apparatus and the second information processing apparatus is exchanged.

According to the first aspect, the controller may perform a control process to exchange, as the information, at least one of information indicative of whether the first information processing apparatus permits the role of the group owner to be changed, information indicative of whether the information processing apparatus and the first information processing apparatus each have a concurrent function, and information indicative of whether the information processing apparatus is compatible with a plurality of operations for carrying out wireless communications with a plurality of devices. Therefore, at least one of information indicative of whether the first information processing apparatus permits the role of the group owner to be changed, information indicative of whether the information processing apparatus and the first information processing apparatus each have a concurrent function, and information indicative of whether the information processing apparatus is compatible with a plurality of operations is exchanged with a plurality of devices.

According to the first aspect, the controller may perform a control process to include the information in a message exchanged between the information processing apparatus and the first information processing apparatus and exchange the message. Therefore, the information is included in the message exchanged between the information processing apparatus and the first information processing apparatus, and the message is exchanged.

According to the first aspect, if the first information processing apparatus permits the role of the group owner to be changed, the controller may perform a control process to change the role of the group owner from the first information processing apparatus to the information processing apparatus and thereafter perform a connection process to connect to the second information processing apparatus. Therefore, if the first information processing apparatus permits the role of the group owner to be changed, the role of the group owner is changed from the first information processing apparatus to the information processing apparatus and thereafter a connecting process is carried out to connect to the second information processing apparatus.

According to the first aspect, if the first information processing apparatus permits the role of the group owner to be changed and both the information processing apparatus and the first information processing apparatus have a concurrent function, the controller may perform a control process to change the role of the group owner from the first information processing apparatus to the information processing apparatus, thereafter perform a cutoff process to cut off the information processing apparatus and the first information processing apparatus from each other, and perform a connection process to perform each data transmission to the first information processing apparatus and the second information processing apparatus. Therefore, if the first information processing apparatus permits the role of the group owner to be changed and both the information processing apparatus and the first information processing apparatus have a concurrent function, the role of the group owner is changed from the first information processing apparatus to the information processing apparatus, thereafter a cutoff process is performed to cut off the information processing apparatus and the first information processing apparatus from each other, and a connection process is carried out to perform each data transmission to the first information processing apparatus and the second information processing apparatus.

According to the first aspect, if the first information processing apparatus permits the role of the group owner to be changed, and when the second information processing apparatus does not hold connection setting information about a situation where the information processing apparatus is a group owner and the first information processing apparatus is a client, the controller may perform a control process to include information for acquiring the connection setting information in a message exchanged between the information processing apparatus and the first information processing apparatus before the role of the group owner is changed from the first information processing apparatus to the information processing apparatus. Therefore, if the first information processing apparatus permits the role of the group owner to be changed, and when the second information processing apparatus does not hold connection setting information about a situation where the information processing apparatus is a group owner and the first information processing apparatus is a client, information for acquiring the connection setting information is included in a message exchanged between the information processing apparatus and the first information processing apparatus before the role of the group owner is changed from the first information processing apparatus to the information processing apparatus.

According to the first aspect, the controller may perform a control process to include at least one of information about dynamic host configuration protocol, media access control address information during communication, information for shifting an Internet protocol address while high-bandwidth digital content protection system is in operation, and information required for Persistent, in a message exchanged between the information processing apparatus and the first information processing apparatus, and exchange the message. Therefore, information about dynamic host configuration protocol (DHCP), media access control (MAC) address information during communication, information for shifting an Internet protocol (IP) address while high-bandwidth digital content protection system (HDCP) is in operation, and information required for Persistent, is included in a message exchanged between the information processing apparatus and the first information processing apparatus, and the message is exchanged.

According to the first aspect, if connection setting information of a connected state after the role is changed is not held, the controller may apply a predetermined rule to first connection setting information already shared before the role is changed, thereby generating second connection setting information after the role is changed. Therefore, if connection setting information of a connected state after the role is changed is not held, a predetermined rule is applied to first connection setting information already shared before the role is changed, thereby generating second connection setting information after the role is changed.

According to the first aspect, the controller may use only the first connection setting information which only the information processing apparatus and the first information processing apparatus have, in generating the second connection setting information. Therefore, only the first connection setting information which only the information processing apparatus and the first information processing apparatus have is used in generating the second connection setting information.

According to the first aspect, if the first information processing apparatus does not permit the role of the group owner to be changed, and the information processing apparatus is incompatible with a plurality of operations, the controller may provide the user with selection information for selecting one of the first information processing apparatus and the second information processing apparatus for data transmission. Therefore, if the first information processing apparatus does not permit the role of the group owner to be changed, and the information processing apparatus is incompatible with a plurality of operations, the user is provided with selection information for selecting one of the first information processing apparatus and the second information processing apparatus for data transmission.

According to the first aspect, the controller may manage image information to be handled for data transmission and the selection information differently from each other. Therefore, image information to be handled for data transmission and the selection information are managed differently from each other.

According to the first aspect, if the first information processing apparatus permits the role of the group owner to be changed, and when the role of the group owner is changed from the first information processing apparatus to the information processing apparatus, the controller may provide the user with notification information for notifying the user of the changed role of the group owner. Therefore, if the first information processing apparatus permits the role of the group owner to be changed, and when the role of the group owner is changed from the first information processing apparatus to the information processing apparatus, the user is provided with notification information for notifying the user of the changed role of the group owner.

According to the first aspect, the wireless communication unit may perform data transmission with the other information processing apparatus according to Wireless Fidelity CERTIFIED Miracast specifications. Therefore, data transmission is performed with the other information processing apparatus according to Wireless Fidelity (Wi-Fi) CERTIFIED Miracast specifications.

Advantageous Effect of Invention

According to the present technology, there is achieved an excellent advantage that the information processing apparatus can appropriately be connected wirelessly. The advantage described here is not necessarily limitative, but any of the advantages described in the present disclosure may be added.

BRIEF DESCRIPTION OF DRAWINGS

FIG. 4 is a block diagram illustrating by way of example a functional configuration of a first sink device (information processing apparatus) 200 according to the first embodiment of the present technology.

FIG. 8 is a diagram illustrating by way of example a transition for the devices that make up the communication system 10 according to the first embodiment of the present technology to set up a multi-sink topology environment.

FIG. 9 is a diagram illustrating by way of example a transition for the devices that make up the communication system 10 according to the first embodiment of the present technology to set up a multi-sink topology environment.

FIG. 10 is a diagram illustrating by way of example a transition for the devices that make up the communication system 10 according to the first embodiment of the present technology to set up a multi-sink topology environment.

FIG. 11 is a diagram illustrating by way of example a transition for the devices that make up the communication system 10 according to the first embodiment of the present technology to set up a multi-sink topology environment.

FIG. 12 is a diagram illustrating by way of example a transition for the devices that make up the communication system 10 according to the first embodiment of the present technology to set up a multi-sink topology environment.

FIG. 13 is a diagram illustrating by way of example a transition for the devices that make up the communication system 10 according to the first embodiment of the present technology to set up a multi-sink topology environment.

FIG. 14 is a diagram illustrating by way of example a transition for the devices that make up the communication system 10 according to the first embodiment of the present technology to set up a multi-sink topology environment.

FIG. 15 is a diagram illustrating by way of example a transition for the devices that make up the communication system 10 according to the first embodiment of the present technology to set up a multi-sink topology environment.

FIG. 16 is a diagram illustrating by way of example a notification screen image which is displayed on the source device 100 and a second sink device 300 according to the first embodiment of the present technology.

FIG. 17 is a diagram illustrating by way of example a notification screen image which is displayed on the source device 100 and the first sink device 200 according to the first embodiment of the present technology.

FIG. 18 is a diagram illustrating by way of example a selection screen image which is displayed on the source device 100 and the first sink device 200 according to the first embodiment of the present technology.

FIG. 19 is a diagram illustrating by way of example a notification screen image which is displayed on the source device 100 and the first sink device 200 according to the first embodiment of the present technology.

FIG. 22 is a diagram illustrating by way of example a Wi-Fi display (WFD) information element (IE) format exchanged between the devices that make up the communication system 10 according to the first embodiment of the present technology.

FIG. 23 is a diagram illustrating by way of example a WFD IE format exchanged between the devices that make up the communication system 10 according to the first embodiment of the present technology.

FIG. 24 is a diagram illustrating by way of example a WFD IE format exchanged between the devices that make up the communication system 10 according to the first embodiment of the present technology.

FIG. 25 is a diagram illustrating by way of example a WFD IE format exchanged between the devices that make up the communication system 10 according to the first embodiment of the present technology.

FIG. 26 is a diagram illustrating by way of example a WFD IE format exchanged between the devices that make up the communication system 10 according to the first embodiment of the present technology.

FIG. 27 is a diagram illustrating by way of example a new message for application service platform (ASP) exchanged between the devices that make up the communication system 10 according to the first embodiment of the present technology.

FIG. 39 is a diagram illustrating by way of example a selection screen image which is displayed on a source device 100 and a first sink device 200 according to a second embodiment of the present technology.

DESCRIPTION OF EMBODIMENTS

Modes for carrying out the present technology (hereinafter referred to as embodiments) will be described below. The embodiments will be described in the following order:

1. first embodiment (an example in which a sink device to be newly joined makes a connection request in setting up a multi-sink topology);
2. second embodiment (an example in which a source device sends a connection request to a sink device to be newly joined in setting up a multi-sink topology); and
3. application examples.

1. First Embodiment

Figure 1:
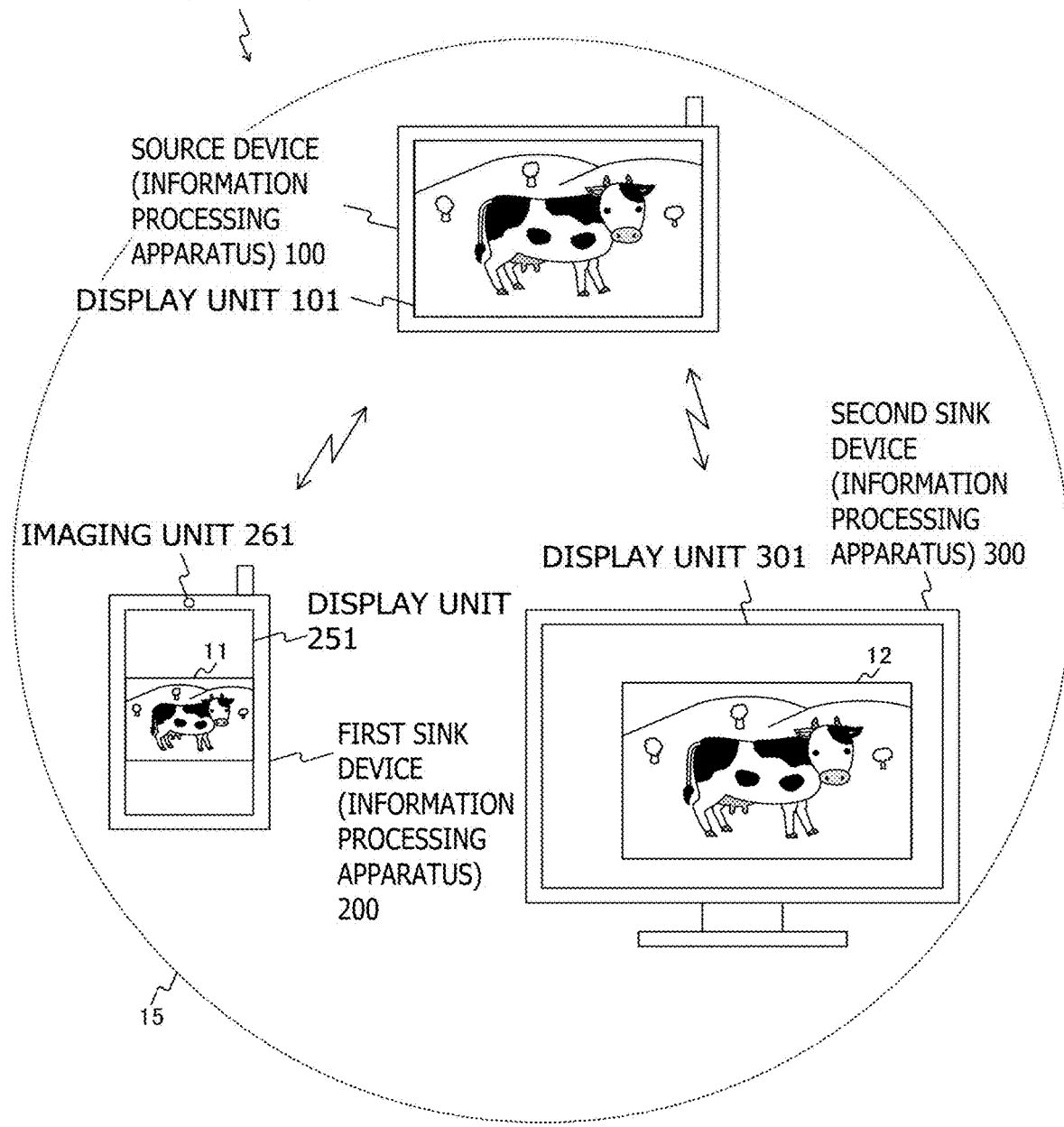
FIG. 1 is a block diagram illustrating by way of example a system configuration of a communication system 10 according to a first embodiment of the present technology.

Example of system configuration of communication system FIG. 1 is a block diagram illustrating by way of example a system configuration of a communication system 10 according to a first embodiment of the present technology. FIG. 1 illustrates an example of communication system which is capable of providing wireless connections in a multi-sink topology environment using peer to peer (P2P) direct communications.

The communication system 10 includes a source device (information processing apparatus) 100, a first sink device (information processing apparatus) 200, and a second sink device (information processing apparatus) 300. In FIG. 1, the communication system 10 represents an example of communication system in which the first sink device 200 and the second sink device 300 receive data (e.g. image data and sound data) sent from the source device 100.

The source device 100, the first sink device 200, and the second sink device 300 are a transmitting and receiving device (information processing apparatus) provided with a wireless function. For example, the source device 100, the first sink device 200, and the second sink device 300 are a display apparatus provided with a wireless communication function (e.g., a personal computer) or a portable information processing apparatus (e.g., a smartphone or a tablet terminal). Furthermore, the source device 100, the first sink device 200, and the second sink device 300 are a wireless communication apparatus based on Institute of Electrical and Electronics Engineers (IEEE) 802.11, IEEE 802.15, IEEE 802.16, 3rd generation partnership project (3GPP) specifications (e.g., wideband code division multiple access (W-CDMA), global system for mobile communications (GSM) (trademark), worldwide interoperability for microwave access (WiMAX), WiMAX2, long term evolution (LTE), long term evolution-advanced (LTE-A)), or licensed assisted access using LTE (LAA). The source device 100, the first sink device 200, and the second sink device 300 can exchange various items of information using the wireless communication function.

The first sink device 200 and the second sink device 300 are a device for receiving data sent from the source device 100. Therefore, an exchange between the source device 100 and the second sink device 300 is equivalent to an exchange between the source device 100 and the first sink device 200. According to the embodiments of the present technology, part of the description of an exchange between the source device 100 and the second sink device 300 is omitted, and an exchange (e.g., a connecting process) between the source device 100 and the first sink device 200 will mainly be described by way of example. According to the embodiments of the present technology, moreover, wireless communication performed by the source device 100 and the first sink device 200, using a wireless local area network (LAN) will mainly be described by way of example.

The wireless LAN may include, for example, an Infrastructure mode (Wi-Fi Infrastructure mode), Wireless Fidelity (Wi-Fi), Direct, tunneled direct link setup (TDLS), ad hoc network, or a mesh network. Wi-Fi CERTIFIED Miracast (technical specification title: Wi-Fi Display), for example, may be used as short-distance wireless audio visual (AV) transmission communication for use in the communication system 10. Wi-Fi CERTIFIED Miracast represents a mirroring technology for sending sound data and display images that are reproduced on one terminal to another terminal and enabling the other terminal to output the sound data the image data similarly.

In addition, Wi-Fi CERTIFIED Miracast implements user input back channel (UIBC) on transmission control protocol/Internet protocol (TCP/IP). UIBC represents a technology for sending operation information with respect to an input device such as a mouse, a keyboard, or the like from one terminal to another terminal. Other remote desktop software (e.g., virtual network computing (VNC)) may be applied instead of Wi-Fi CERTIFIED Miracast.

Wi-Fi CERTIFIED Miracast stipulates that images (videos) should be compressed and expanded using H.264, for example. According to Wi-Fi CERTIFIED Miracast, furthermore, H.264 can be adjusted on the sender's side. Wi-Fi CERTIFIED Miracast is compatible with not only H.264, but also H.265 (e.g., high efficiency video coding (HEVC), scalable video coding extensions of high efficiency video coding (SHVC)), moving picture experts group (MPEG) 4, and joint photographic experts group (JPEG) 2000, for example. Wi-Fi CERTIFIED Miracast is also compatible with, for example, a line-based codec for bundling and compressing one or more lines or dividing two or more lines into 2×2 macroblocks and compressing and expanding them (e.g., Wavelet, discrete cosine transform (DCT)). Wi-Fi CERTIFIED Miracast is further compatible with, for example, a codec for reducing a transmission rate without compressing data according to DCT or Wavelet, by determining the differences between a particular code amount region (picture or a bundle of plural lines or macroblock, etc.) and a preceding code amount region. Images (videos) may be sent and received as uncompressed data.

The source device 100 can handle, for example, image data and sound data generated by an imaging process as an object to be sent. The source device 100 can handle, for example, content (e.g., content including image data and sound data) saved in a storage device (e.g., a hard disk) thereof as an object to be sent. An electronic device equipped with a camera (e.g., a personal computer, a game machine, a smartphone, or a tablet terminal) may be used as the source device 100, the first sink device 200, and the second sink device 300. Furthermore, another electronic device equipped with a display unit (e.g., an imaging device, a game machine, a smartphone, or a tablet terminal) may be used as the source device 100, the first sink device 200, and the second sink device 300. If the source device 100 has a dithering function, then it may handle content saved in an Internet service provider (ISP) via a wireless or wired network as an object to be sent.

For example, image data generated by an imaging process performed by the source device 100 are sent to the first sink device 200, and an image 11 based on the image data is displayed on a display unit 251 of the first sink device 200.

In FIG. 1, a range in which the source device 100 is able to communicate directly through wireless communication by P2P direct connections is illustrated as an information transfer range 15. The information transfer range 15 refers to an information transfer range (service range) with respect to the source device 100.

Roles of the source device 100, the first sink device 200, and the second sink device 300 in a direct communication mode will be described below. In the direct communication mode, each of the devices (the source device and the sink devices) is, for example, in a state as either a P2P group owner (GO), a P2P client (P2P Client), or P2P unconfigured (P2P Device).

It is assumed here that the source device 100 is a P2P GO, the first sink device 200 is a P2P client, and the second sink device 300 is P2P unconfigured. In this case, the source device 100 (P2P GO) establishes a direct connection to each device (P2P client) in a group of devices which is provided by direct connections between the devices by way of wireless communication.

The source device 100 (P2P GO) also transmits a beacon, authenticates a device that is joining the group, and provides connection setting information (credentials) to a device that is joining the group, for example. The connection setting information (credentials) is shared in a Wi-Fi protected setup (WPS) process. WPS is also referred to as Wi-Fi simple configuration (WSC) or WSC exchange. The source device 100 (P2P GO) also plays a role as an access point in the group.

The first sink device 200 (P2P client) establishes a direct connection to the source device 100 (P2P GO) in a group of devices which is provided by direct connections between the devices by way of wireless communication, for example. Specifically, the first sink device 200 (P2P client) communicates with the source device 100 (P2P GO) or communicates with another P2P client via the source device 100 (P2P GO). The second sink device 300 (P2P unconfigured) has not initially established a direct connection between devices by way of wireless communication.

P2P GOs include a Persistent GO and a Temporary GO. The Persistent GO represents a GO that holds the connection setting information of a destination device even after the end of a P2P connection session and that can be connected again in response to an Invitation Request and a Provision Discovery Request from the destination device. The Temporary GO represents a GO that holds connection setting information only during a P2P connection session and that discards the connection setting information after the end of the P2P connection session.

Example of Setting Up of Multi-Sink Topology

A process of setting up a multi-sink topology will be described below.

Figure 2:
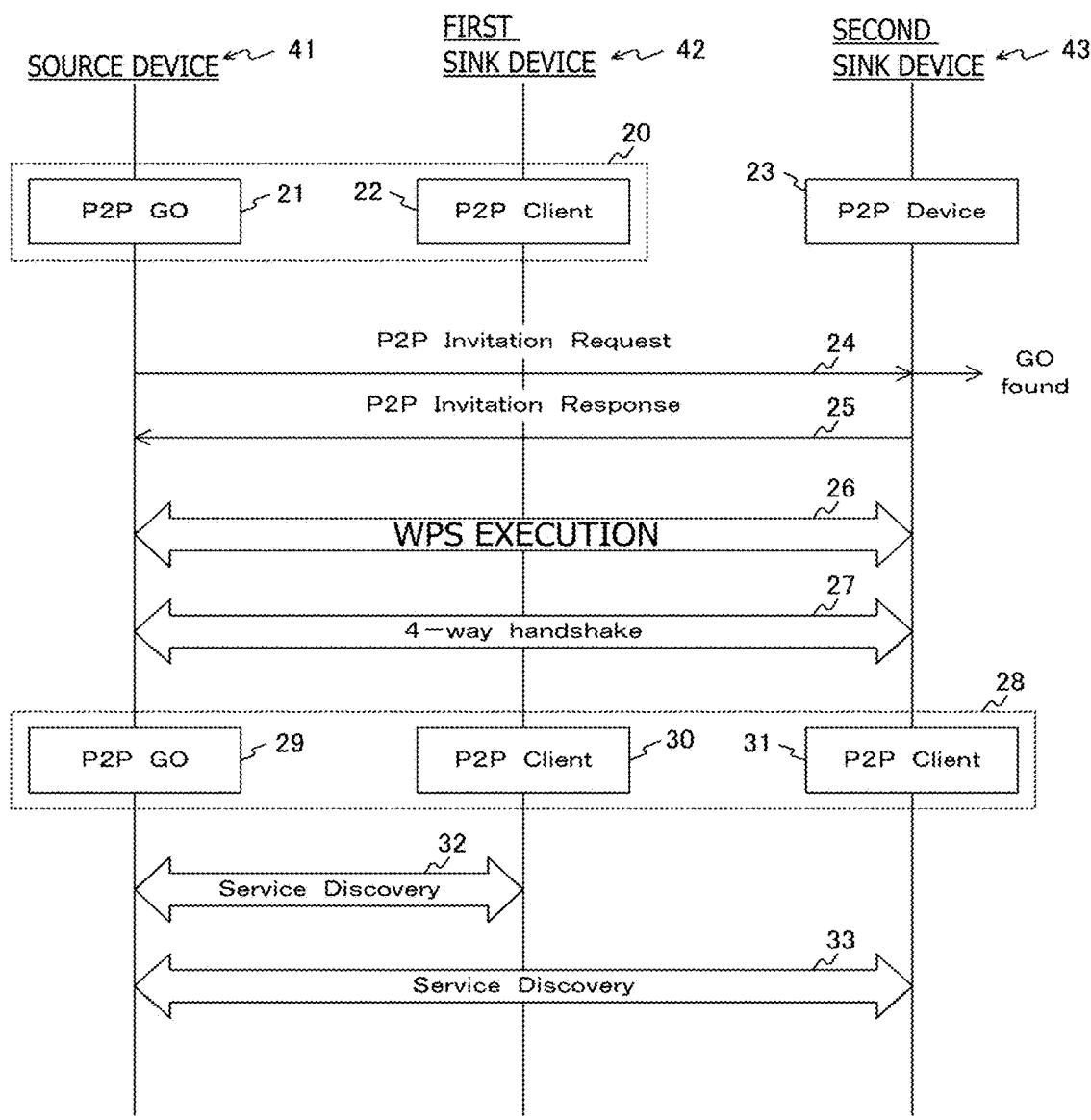
FIG. 2 is a sequence chart illustrating by way of example a communication processing sequence between a source device 41, a first sink device 42, and a second sink device 43 which serves as a basis for the present technology.

FIG. 2 is a sequence chart illustrating by way of example a communication processing sequence between a source device 41, a first sink device 42, and a second sink device 43 which serves as a basis for the present technology. Specifically, FIG. 2 illustrates a basic flow from a P2P direct connection to the setup of a multi-sink topology environment. FIG. 2 illustrates an example in which the second sink device 43 joins a group in an environment where the source device 41 is connected to the first sink device 42 by way of P2P direct communication.

If a source device connects two or more sink devices, it is preferable that the source device operate as a P2P GO and the sink devices operate as P2P clients. In the example illustrated in FIG. 2, there is formed a group 20 in which the source device 41 serves as a P2P GO (Group Owner) 21 and the first sink device 42 serves as a P2P client 22. The source device 41 has already been connected as the P2P GO 21 to the first sink device 42 (P2P client 22). It is assumed that the second sink device 43 is a P2P device 23 capable of P2P direct connection.

First, the source device 41 performs a P2P Invitation Request process on the second sink device 43 (24). Alternatively, the second sink device 43 may perform a P2P Provision Discovery Request process on the source device 41.

When the P2P Invitation Request process is performed (24), the second sink device 43 returns a P2P Invitation Response to the source device 41 (25). A Wi-Fi protected setup (WPS) execution (26) and 4-way Handshake (authentication process) (27) are carried out between the source device 41 and the second sink device 43.

Through the above processes, the source device 41 connects the second sink device 43 as a new P2P client 31. There is now formed a group 28 in which the source device 41 serves as a P2P GO 29 and the first sink device 42 and the second sink device 43 as P2P clients 30 and 31, respectively.

Then, the source device 41 performs service discovery processes (32, 33) between itself and the first sink device 42 and the second sink device 43, thereby setting up a multi-sink topology.

After the topology has thus been set up, the source device 41 sends image data (e.g., image data generated by an imaging process performed by the source device 41) to the first sink device 42 and the second sink device 43. An image based on the image data is displayed on the respective display units of the first sink device 42 and the second sink device 43. Therefore, the content sent from the source device 41 to the first sink device 42 and the second sink device 43 and displayed thereon can be the same content (image). However, content sent from the source device 41 to the first sink device 42 and the second sink device 43 and displayed thereon may be different content (images). For example, the source device 41 may send an image displayed thereon to the first sink device 42, and may send content stored in a storage device of the source device 41 to the second sink device 43.

Example of Configuration of Source Device (Information Processing Apparatus)

Figure 3:
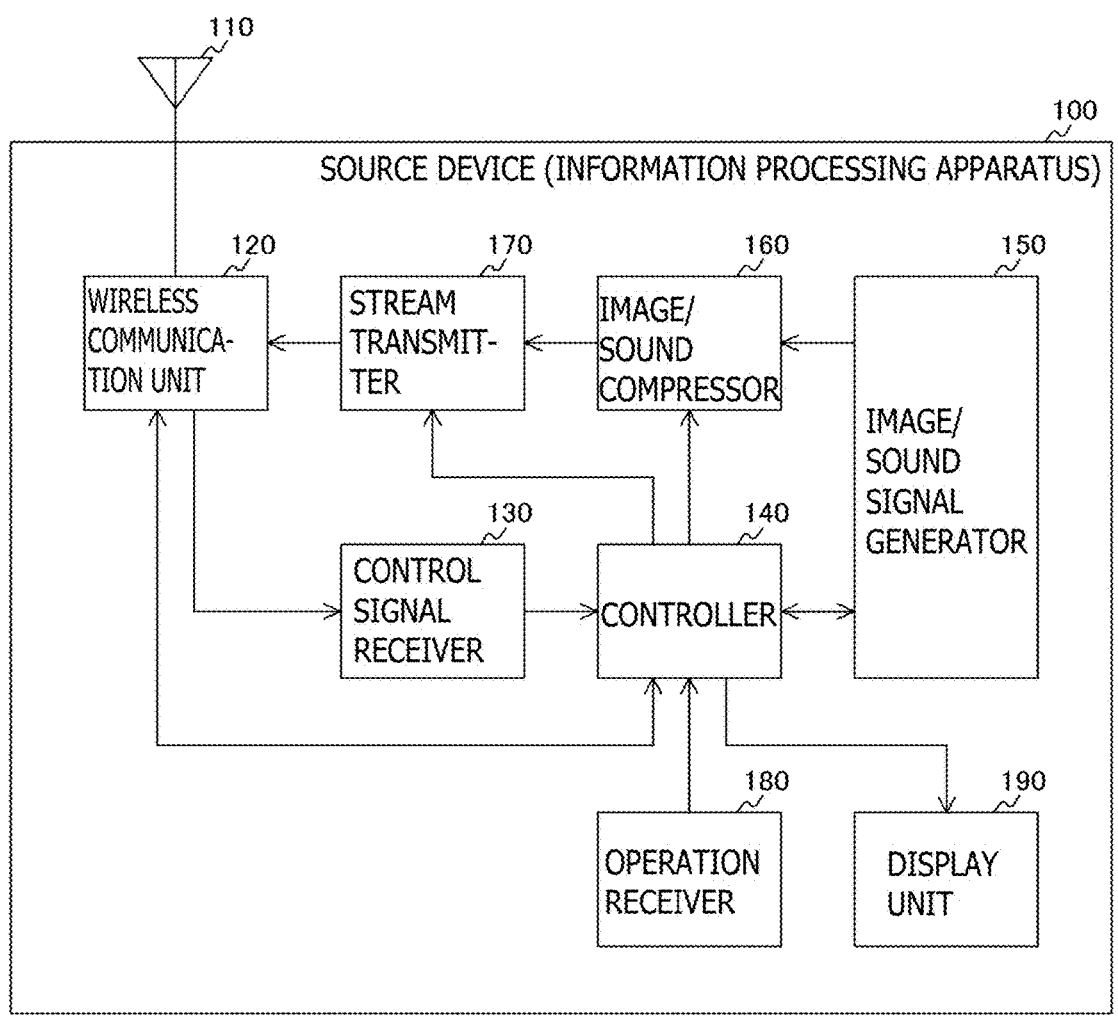
FIG. 3 is a block diagram illustrating by way of example a functional configuration of a source device (information processing apparatus) 100 according to the first embodiment of the present technology.

FIG. 3 is a block diagram illustrating by way of example a functional configuration of the source device (information processing apparatus) 100 according to the first embodiment of the present technology.

The source device 100 includes an antenna 110, a wireless communication unit 120, a control signal receiver 130, a controller 140, an image/sound signal generator 150, an image/sound compressor 160, a stream transmitter 170, an operation receiver 180, and a display unit 190.

The wireless communication unit 120 sends and receives information (e.g., image data and sound data) to and from another information processing apparatus (e.g., the first sink device 200) through the antenna 110 by way of wireless communication under the control of the controller 140. For example, for sending image data, image data generated by the image/sound signal generator 150 are compressed by the image/sound compressor 160, and the compressed image data (image stream) are sent via the wireless communication unit 120 from the antenna 110.

The wireless communication unit 120 can also send information to and receive information from another information processing apparatus (e.g., the first sink device 200) using a plurality of frequency channels. The first embodiment of the present technology illustrates an example in which the wireless communication unit 120 has a function capable of sending and receiving three frequency channels of 2.4 GHz, 5 GHz, and 60 GHz simultaneously or only a selected frequency. If a source device has a function capable of sending and receiving a plurality of frequency channels as described above, then a sink device (e.g., the first sink device 200) can control a process of deciding which frequency channel each source device is to use.

The wireless communication unit 120 is thus able to perform media transmission between itself and other devices according to Wi-Fi CERTIFIED Miracast specifications.

The control signal receiver 130 acquires a control signal (e.g., information about an exchange with the first sink device 200) sent from another information processing apparatus (e.g., the first sink device 200) from among various items of information received by the wireless communication unit 120. The control signal receiver 130 then sends the acquired control signal to the controller 140.

The controller 140 performs control processes with respect to various items of information to be sent from the source device 100. For example, the controller 140 performs control processes on the image/sound signal generator 150 and the image/sound compressor 160 on the basis of the control signal received by the control signal receiver 130. For example, the controller 140 performs a control process for changing the resolution of image data as an object to be sent and the number of channels of sound data, and a control process for changing the image region of image data as an object to be sent. Specifically, the controller 140 performs transmission control on a stream as an object to be sent on the basis of a control signal received by the control signal receiver 130. The transmission control on the stream includes, for example, data transmission speed control and scalability transmission rate control.

Furthermore, the controller 140 may have a function to measure a radio-wave propagation state (link radio-wave propagation state) while data are being sent to and received from a sink device by way of wireless communication, and to send the measured result (radio-wave propagation measurement information) to the sink device.

The radio-wave propagation measurement information represents, for example, information used for determining whether the quality of a link to a sink device is a quality capable of sending and receiving image data and sound data. The radio-wave propagation measurement information is also used for performing transmission control on a stream, for example.

The data transmission speed mainly means a ratio at which the communication path is occupied, and covers a communication speed and a communication capacity. The resolution is defined as an index of image quality that is composed of elements including a frame of image data (the numbers of vertical and horizontal pixels), the bit rate (compression ratio) of image data, etc., for example. The index of image quality may be represented by the throughput of a stream. The number of channels of sound covers sound recording and reproducing schemes, such as monaural (1.0 ch), stereo (2.0 ch), 5.1 ch, 6.1 ch, 9.1 ch, high-res. (high-resolution audio), etc. The number of channels of sound is defined as an index of sound quality that is composed of elements including the bit rate (compression ratio) of sound data, the number of channels, etc. The index of sound quality may be represented by the throughput of a stream.

The controller 140 also performs a control process for improving a situation that cannot be stabilized by data rate control. For example, the controller 140 grasps system performance information of a sink device (e.g., the first sink device 200) through an exchange of information with the sink device. The system performance information represents, for example, performance information with respect to the system of a sink device. For example, the system performance information includes a frequency channel that can be used, a resolution, transmission control protocol (TCP), and user datagram protocol (UDP). The system performance information also refers to, for example, information representing compatibility with an encryption method, standard definition/high definition (SD/HD)/4K compatibility, and compatibility with a low power consumption mode. For example, depending on whether a sink device is compatible with a low power consumption mode, the controller 140 can select a stream transmission control process for further increasing the overall system stability of the communication system 10.

The controller 140 puts information indicative of, for example, whether the source device 100 is a mobile device into information exchanged with the first sink device 200. For example, the controller 140 can include information indicative of whether the source device 100 is a mobile device into Capability information about the source device 100. When the first sink device 200 grasps that the source device 100 is a mobile device, the first sink device 200 can decide that it is not necessary to operate the source device 100 on the basis of the relationship to another connected information processing apparatus. If it is decided that it is not necessary to operate the source device 100, then the source device 100 receives a transmission stop command from the first sink device 200. When the controller 140 grasps the transmission stop command, the controller 140 can turn down the power supplies for the functions of the image/sound signal generator 150, the image/sound compressor 160, and the stream transmitter 170 for a certain period of time. The controller 140 can also control the wireless communication unit 120 to go to intermediate reception (a mode in which the wireless communication unit 120 periodically wakes up to an extent able to receive a command from the first sink device 200 and other components have their power supplies turned down).

The image/sound signal generator 150 generates data (image data or sound data) as an object to be sent under the control of the controller 140, and outputs the generated data to the image/sound compressor 160. The image/sound signal generator 150 has an imaging unit (not illustrated) and a sound data acquisition unit (not illustrated, for example). The imaging unit (e.g., a lens, an imaging element, and a signal processing circuit) images a subject and generates an image (image data). The sound data acquisition unit (e.g., a microphone) acquires sounds in the periphery at the time the image data are generated. The data thus generated become an object to be sent to another information processing apparatus (e.g., the first sink device 200).

The image/sound compressor 160 compresses (encodes) data (image data and sound data) generated by the image/sound signal generator 150 under the control of the controller 140. The image/sound compressor 160 outputs the compressed data (image data and sound data) to the stream transmitter 170. The image/sound compressor 160 may be software-implemented for encoding data or hardware-implemented for encoding data. Though the image/sound compressor 160 is assumed to function as a codec, it is able to handle uncompressed images or sounds. The image/sound compressor 160 also functions as a scalable codec. The scalable codec, for example, signifies a codec capable of adapting itself freely to the resolution of an information processing apparatus (sink device) on the receiving side, a network environment, etc.

The stream transmitter 170 performs a transmission process for sending data (image data and sound data) compressed by the image/sound compressor 160 as a stream via the wireless communication unit 120 from the antenna 110 under the control of the controller 140.

The operation receiver 180 represents an operation receiver for receiving operation inputs entered by the user, and includes, for example, a keyboard, a mouse, a game pad, a touch panel, a camera, or a microphone. The operation receiver 180 and the display unit 190 may be constructed as an integral touch panel that allows the user to enter operation inputs by touching a finger to a display screen thereof or bring a finger closely to it.

The display unit 190 represents a display unit for displaying an image generated by the image/sound signal generator 150, for example. The display unit 190 may include any of various display panels, e.g., an organic electroluminescence (EL) display, a crystal light-emitting diode (LED) display, and a liquid crystal display (LCD).

The source device 100 may include a sound output unit, etc. in addition to the components described above. These additional components are omitted from illustration in FIG. 3. In the illustrated example, the source device 100 generates image data and sound data as an object to be sent. However, the source device 100 may acquire image data and sound data as an object to be sent from an external apparatus. For example, the source device 100 may acquire image data and sound data as an object to be sent from a Web camera equipped with a microphone. Furthermore, the source device 100 may handle, as an object to be sent, content (e.g., content made up of image data and sound data) saved in a storage device (e.g., a hard disk) that may be located inside or outside of the source device 100. It may be assumed that content saved in the storage device are compressed content. If such compressed content has been compressed by an encoding process defined according to standards adopted by the communication system 10, then the source device 100 may send out the compressed content without decoding it.

The sound output unit (not illustrated) of the source device 100 includes, for example, a sound output unit (e.g., a speaker) for outputting sounds generated by the image/sound signal generator 150. Though images can be output from both a source device and a sink device, sounds should preferably be output from only either one of the source device and the sink device.

Example of Configuration of Sink Device (Information Processing Apparatus)

FIG. 4 is a block diagram illustrating by way of example a functional configuration of the first sink device (information processing apparatus) 200 according to the first embodiment of the present technology. A functional configuration (a functional configuration about wireless communication) of the second sink device 300 is essentially the same as the functional configuration of the first sink device 200, and its description will be omitted below.

The first sink device 200 includes an antenna 210, a wireless communication unit 220, a stream receiver 230, an image/sound expander 240, an image/sound output unit 250, a user information acquisition unit 260, a controller 270, a control signal transmitter 280, and a management information holder 290.

The wireless communication unit 220 sends and receives various items of information (e.g., image data and sound data) to and from another information processing apparatus (e.g., the source device 100) through the antenna 210 by way of wireless communication under the control of the controller 270. For example, if image data are received, then image data received by the antenna 210 are delivered through the wireless communication unit 220 and the stream receiver 230 and expanded (decoded) by the image/sound expander 240. The expanded image data are supplied to the image/sound output unit 250, which outputs an image depending on the expanded image data. In other words, the image depending on the expanded image data is displayed on a display unit 251.

The wireless communication unit 220 can also send information to and receive information from another information processing apparatus (e.g., the source device 100) using a plurality of frequency channels. The first embodiment of the present technology illustrates an example in which the wireless communication unit 220 has a function capable of sending and receiving three frequency channels of 2.4 GHz, 5 GHz, and 60 GHz simultaneously or only a selected frequency. Specifically, the wireless communication unit 220 is capable of performing a communication process using a first frequency band and a communication process using a second frequency band with a higher data transmission speed than the first frequency band. The controller 270 can also control a process of deciding which frequency channel of a plurality of frequency channels is to use for wireless communication with each source device. The controller 140 of the source device 100 can control a process of deciding which frequency channel of a plurality of frequency channels is to use for wireless communication with each sink device.

The link between the source device 100 and the first sink device 200 and the link between the source device 100 and the second sink device 300 may have the same frequency channel or different frequency channels.

The first embodiment of the present technology illustrates the example in which the wireless communication unit 220 has the function capable of sending and receiving the three frequency channels of 2.4 GHz, 5 GHz, and 60 GHz. However, the present technology is not limited to such an arrangement. The wireless communication unit 220 may, for example, have a function capable of sending and receiving another frequency channel or two or four or more frequency channels.

The stream receiver 230 receives information about an exchange with each source device and streams (e.g., an image stream, a sound stream) among the information received by the wireless communication unit 220 under the control of the controller 270. The stream receiver 230 outputs the received command information to the controller 270 and outputs the received stream to the image/sound expander 240 and the controller 270.

The information of the exchange with each source device represents information sent from a source device (e.g., the source device 100), and includes, for example, an acquisition request for system performance information of the first sink device 200. The system performance information is information which includes a frequency channel that can be used, a resolution, TCP, UDP, compatibility with an encryption method, SD/HD/4K compatibility, and compatibility with a low power consumption mode.

The stream receiver 230 also has a function to measure a radio-wave propagation state (link radio-wave propagation state) while data are being sent to and received from a sink device by way of wireless communication. The stream receiver 230 then outputs the measured result (radio-wave propagation measurement information) to the controller 270.

The image/sound expander 240 expands (decodes) streams (image data and sound data) sent from another information processing apparatus (e.g., the source device 100) under the control of the controller 270. The image/sound expander 240 then outputs the expanded data (image data and sound data) to the image/sound output unit 250. The image/sound expander 240 may be software-implemented for decoding data or hardware-implemented for decoding data. Though the image/sound expander 240 is assumed to function as a codec, it is able to handle uncompressed images and sounds. The image/sound expander 240 also functions as a scalable codec.

The image/sound output unit 250 has a display unit 251 and a sound output unit 252.

The display unit 251 refers to a display unit for displaying images based on the image data expanded by the image/sound expander 240. The display unit 251 may, for example, include a display panel such as an organic EL display panel, a crystal LED display panel, an LCD panel, or the like. The display unit 251 may employ a touch panel that allows the user to enter operation inputs by touching a finger to a display screen thereof or bring a finger closely to it.

The sound output unit 252 refers to a sound output unit (e.g., a speaker) for outputting various sounds (sounds about images displayed on the display unit 251) based on the sound data expanded by the image/sound expander 240. According to a process of outputting sounds that can be used, for example, only the sound of a source device assigned to a central channel (main image) is reproduced by a speaker whereas the sound of a source device assigned to a peripheral channel (sub-image) is not reproduced. According to another process of outputting sounds that can be used, for example, the volume of the sound of a source device assigned to a central channel is used as a main level whereas the volume of the sound of a source device assigned to a peripheral channel is reproduced at a reduced level. Other processes of outputting sounds may be used.

The user information acquisition unit 260 serves to acquire information about the user (user information) and output the acquired user information to the controller 270. For example, the user information acquisition unit 260 can acquire user information by receiving an input from an operation receiver (a keyboard, a mouse, a remote controller, a game pad, or a touch panel) which allows the user to set a display method directly. The operation receiver refers to an operation member for designating any desired region in an image displayed on the display unit 251, for example. Furthermore, for example, the user information acquisition unit 260 can acquire user information by receiving an input from a device capable of grasping the user's intention, such as a camera, a microphone, various sensors (e.g., a gyro sensor or a sensor for sending a human body), or the like.

For example, the user information acquisition unit 260 acquires user information generated by a user's action while the image/sound output unit 250 is outputting information based on a stream received from another information processing apparatus (e.g., the source device 100) by way of wireless communication. This user information represents user information generated by a user's action with respect to an image displayed on the display unit 251, for example. The user information refers to information produced on the basis of a user's operation about an image displayed on the display unit 251, for example.

For example, the user information acquisition unit 260 can generate user information by acquiring image data generated by an imaging unit (abbreviated) that is ancillary to the display unit. Moreover, for example, the user information acquisition unit 260 may generate user information by acquiring information (e.g., positional information or identifying information) that is acquired by an external apparatus (e.g., a sensor or a wearable device).

The controller 270 serves to control the management information holder 290 to hold information acquired by the stream receiver 230 and manage each source device on the basis of management information held by the management information holder 290. The controller 270 carries out a stream transmission control process on streams sent from a plurality of source devices for increasing the overall system stability of the system.

For example, the controller 270 carries out a stream transmission control process on the basis of user information acquired by the user information acquisition unit 260 and management information held by the management information holder 290. Specifically, the controller 270 generates, for each source device, a control signal for performing a stream transmission control process on the basis of the management information held by the management information holder 290. Then, the controller 270 outputs the generated control signal to the control signal transmitter 280. For example, the controller 270 changes the resolution of an image displayed on the display unit 251 on the basis of the user information and the management information and generates a control signal for requesting a transmission rate equivalent to the resolution from each source device. Furthermore, for example, the controller 270 generates a control signal for determining a display region for an image on the display unit 251 on the basis of the user information and the management information. Moreover, for example, the controller 270 generates a control signal for determining a size for an image on the display unit 251 on the basis of the user information and the management information.

The controller 270 also performs a control process for setting a frequency channel and a resolution to be used on the basis of the user information and the management information. For example, the controller 270 sets, for each source device, a frequency channel to be used among a plurality of frequency channels that are provided by the wireless communication unit 220. In addition, if different power consumption modes are set for the frequency channels, then the controller 270 can grasp the modes and set frequency channels where the power consumptions of mobile devices are taken care of. Specifically, the controller 270 can separately set a first power consumption mode with respect to the first frequency band and a second power consumption mode with respect to the second frequency band with a higher data transmission speed than the first frequency band.

The control signal transmitter 280 performs a transmission process for sending the control signals output from the controller 270 via the wireless communication unit 220 and the antenna 210 to other wireless communication apparatus.

Example of Configuration of Device Role Manager

Figure 5:
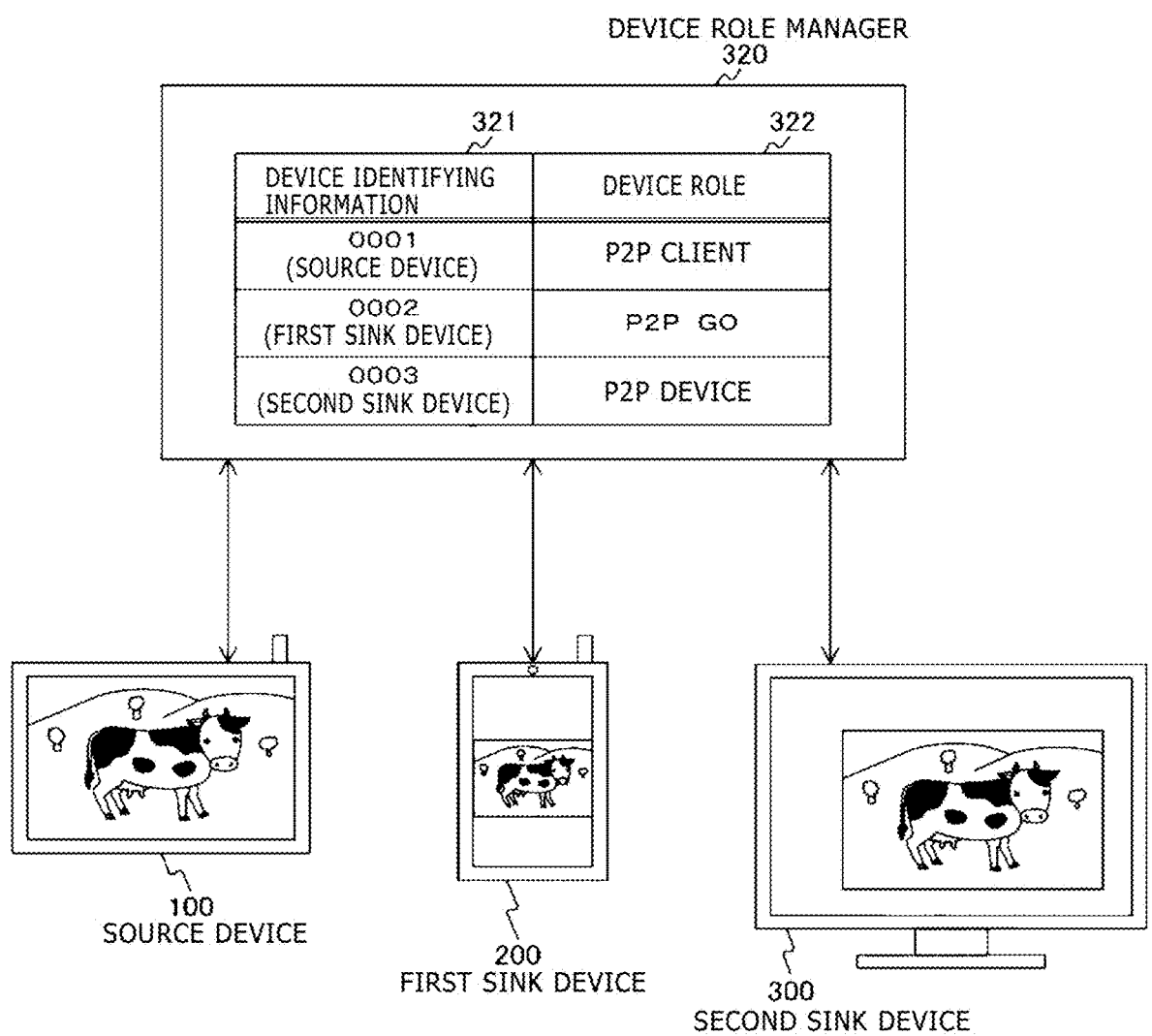
FIG. 5 is a diagram schematically illustrating by way of example a configuration of a device role manager 320 according to the first embodiment of the present technology.

FIG. 5 is a diagram schematically illustrating by way of example a configuration of the device role manager 320 according to the first embodiment of the present technology.

The device role manager 320 serves to manage the roles of a plurality of devices in a situation where the devices make a P2P direct connection. Specifically, the device role manager 320 stores therein device identifying information 321 and device roles 322 in association with each other. These items of information are stored in the device role manager 320 on the basis of information exchanged between the devices.

The device identifying information 321 represents identifying information (e.g., media access control (MAC) address) for identifying the devices. In FIG. 5, the names indicating the source device 100, the first sink device 200, and the second sink device 300 are illustrated in parentheses for illustrative purposes.

The device roles 322 represent the roles of the devices in a situation where the devices make a P2P direct connection. For example, either one of P2P GO, P2P client, and P2P device is stored for each item of device identifying information.

The device role manager 320 is provided in at least one device of the source device 100, the first sink device 200, and the second sink device 300. If, for example, the device role manager 320 is provided in the source device 100, then the controller 140 thereof may function as the device role manager 320. If, for example, the device role manager 320 is provided in the first sink device 200, then the controller 270 thereof may function as the device role manager 320.

Alternatively, the device role manager 320 may be provided in another device to which the above devices can be connected by way of wireless communication. If the device role manager 320 is provided in each of a plurality of devices, then it is preferable for the devices to make periodic or random exchanges to confirm the contents of the device role managers 320 so that the contents of the device role managers 320 are identical to each other.

The device which has the device role manager 320 provided therein can provide the contents of the device role manager 320 in response to a request from another device. Alternatively, the device which has the device role manager 320 provided therein may periodically or randomly provide the contents of the device role manager 320 to another device.

Example of Communication Using Wi-Fi CERTIFIED Miracast Specification Command

Figure 6:
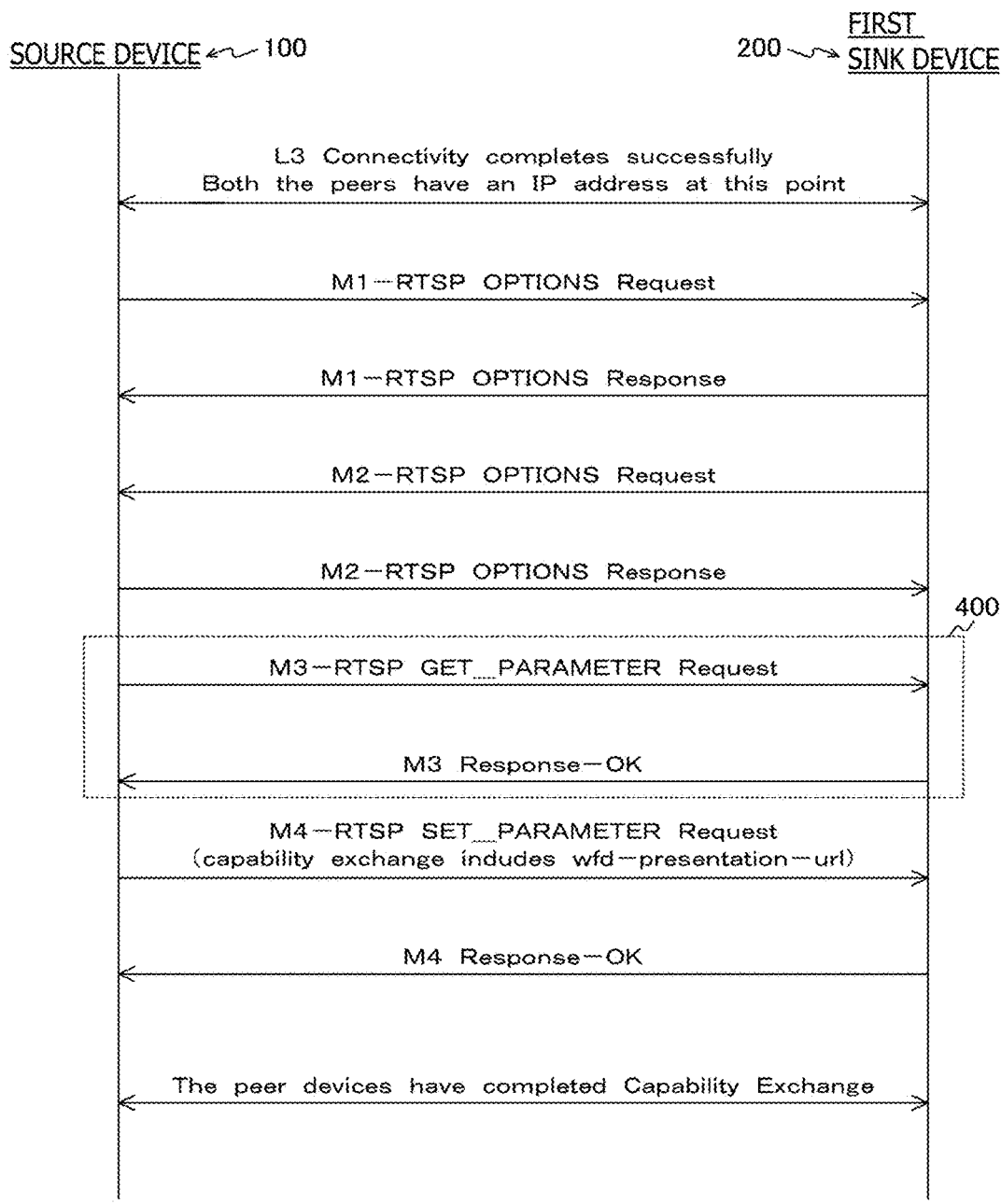
FIG. 6 is a sequence chart illustrating by way of example a communication processing sequence between the source device 100 and the first sink device 200 according to the first embodiment of the present technology.

FIG. 6 is a sequence chart illustrating by way of example a communication processing sequence between the source device 100 and the first sink device 200 according to the first embodiment of the present technology. FIG. 6 illustrates an example of communication using the real time streaming protocol (RTSP) protocol.

As indicated in a dotted-line rectangle 400 illustrated in FIG. 6, for example, the communication processing sequence can employ a "RTSP M3 Request" (M3-RTSP GET_PARAMETER Request) message that is sent from the source device 100 to the first sink device 200 and a "RTSP M3 Response" (M3-RTSP GET_PARAMETER Response) message that is sent from the first sink device 200 to the source device 100 in response thereto.

Alternatively, the source device 100 may send appropriate information to the first sink device 200. For example, the exchange of the "RTSP M3 Request" (M3-RTSP GET_PARAMETER Request) message and the "RTSP M3 Response" (M3-RTSP GET_PARAMETER Response) message may be omitted, and the source device 100 may include management information in a message to be sent from source device 100 to the first sink device 200, and send the management information from the source device 100 to the first sink device 200, and the first sink device 200 may select the information and hold the information in the management information holder 290 (illustrated in FIG. 4). If a content protection setting is made, then a link protection setup may be established subsequent to the M3 Response, and communication may be carried out while keeping secrecy about messages of M4 and higher.

The information that the source device 100 receives as RTSP M3 Response from the first sink device 200 may be each of the following items (1) through (11):

(1) Audio format(s) supported by the WFD Sink.
(2) Video format(s) supported by the WFD Sink.
(3) 3D formats supported by the WFD Sink.
(4) The HDCP system 2.0/2.1/2.2 support/control port.
(5) Available extended display identification data (EDID) information of display attached to the WFD Sink.
(6) Coupled WFD Sink information.
(7) Real time transport protocol (RTP) port(s) the WFD Sink(s) listen on.
(8) Supports inter-integrated circuit (I2C) commands and port number.
(9) UIBC capability supported.
(10) WFD Source uses this parameter to obtain the connector type currently active on the WFD Sink.
(11) Indicate the support for standby and resume control using RTSP.

The connection sequence for the source device 100 and the first sink device 200 illustrated in FIG. 1 has been described above with reference to FIG. 6. However, the same connection sequence is performed in the connection sequence for the source device 100 and the second sink device 300.

Example of Communication for Setting Up Multi-Sink Topology Environment

Figure 7:
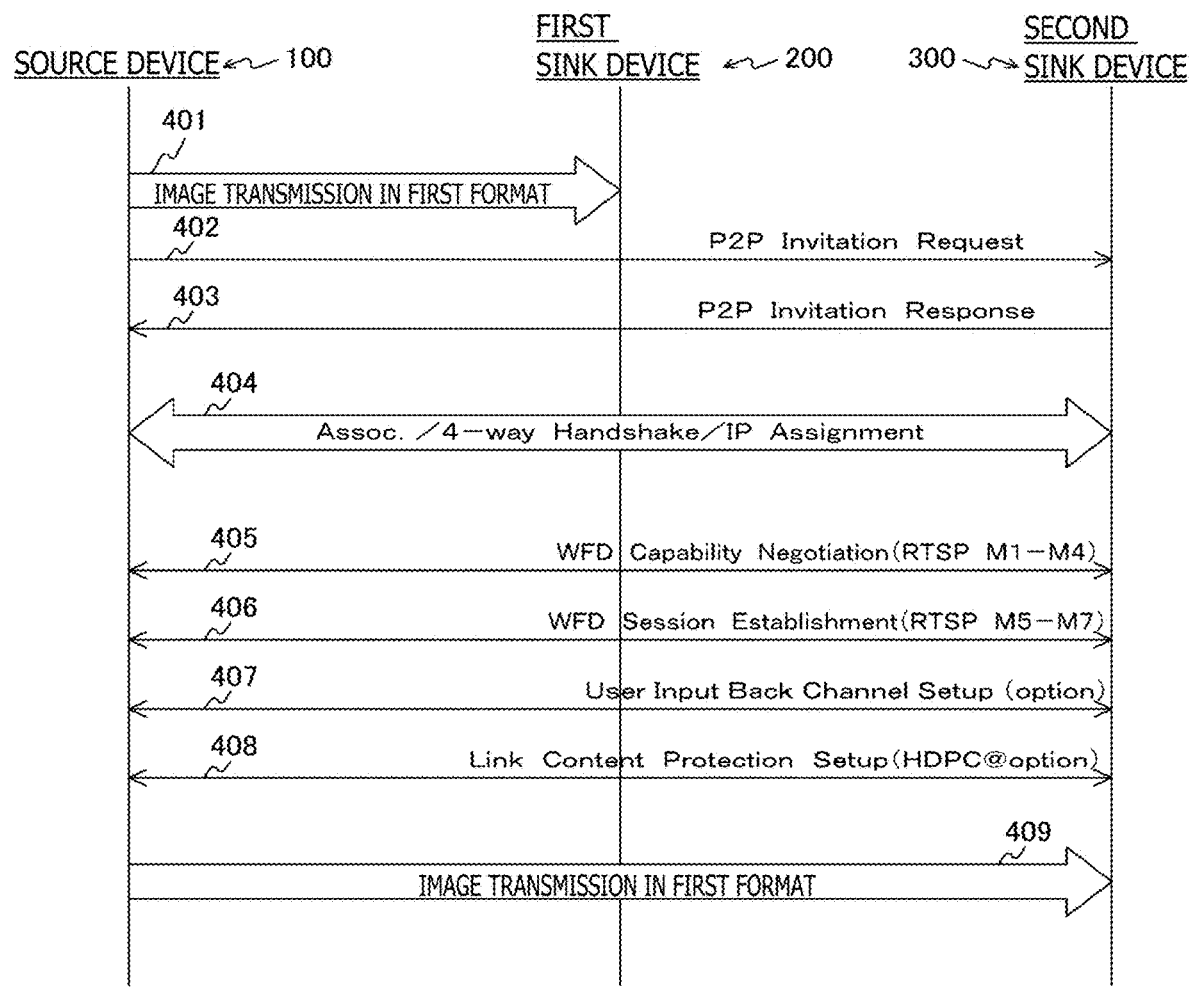
FIG. 7 is a sequence chart illustrating by way of example a communication processing sequence between the devices that make up the communication system 10 according to the first embodiment of the present technology.

FIG. 7 is a sequence chart illustrating by way of example a communication processing sequence between the devices that make up the communication system 10 according to the first embodiment of the present technology.

FIG. 7 illustrates a basic flow from a P2P direct connection to the setup of a multi-sink topology environment in an environment using a P2P direct connection which is typified by Wi-Fi CERTIFIED Miracast.

FIG. 7 illustrates an example in which the second sink device 300 is to join the group in an environment where the source device 100 is being connected to the first sink device 200 for P2P direct communication.

In the example illustrated in FIG. 7, the processing flow of the source device 100 is different from the P2P direct connection. The differences will mainly be described below.

It is assumed that the source device 100 has already been connected as a P2P GO to a P2P client (the first sink device 200) (401). It is also assumed that the source device 100 is to perform media transmission using a first format as a transmission format that can be used by the first sink device 200 (401).

If the second sink device 300 is to join the group, then the source device 100 performs an Invitation Request process on the second sink device 300 (402). Alternatively, the second sink device 300 may perform a Provision Discovery process on the source device 100. It is assumed here that the source device 100 performs an Invitation Request process.

When the source device 100 performs the P2P Invitation Request process on the second sink device 300 (402), the second sink device 300 returns an Invitation Response to the source device 100 (403). Since the source device 100 is connected to the newly added second sink device 300 as well as the first sink device 200 that is being connected, the source device 100 can notify the second sink device 300 that the number of devices which are simultaneously connected is two or more, as device information or service information.

The notifying process can be performed by exchanging at least one of the following items (a) through (d):

(a) P2P IE (Information Element)
(b) WFD IE (Information Element)
(c) Application service platform (ASP) (e.g., an ASP format command in a new format)
(d) Protocol according to universal plug and play (UPnP) standards In response to the Invitation Response (403), the source device 100 connects the second sink device 300 as a new P2P client, and performs an association process (404). The association process represents a Group Formation process (e.g., a process of 4-way Handshake, IP assignment, etc.).

The source device 100 and the second sink device 300 mutually perform a service discovery process (405). By referring to the information grasped by the service discovery process, there is set up a multi-sink topology where the source device 100 serves as a source device and the first sink device 200 and the second sink device 300 as sink devices (406 through 408).

For example, the source device 100 can decide to generate two data paths (for sending data to the first sink device 200 and the second sink device 300) for stable data transmission via respective P2P direct links. The source device 100 then sends media data (image data and sound data) using the two data paths (409).

The multi-sink topology is set up in the manner described above. After the multi-sink topology has been set up, the content sent from the source device 100 to the first sink device 200 and the second sink device 300 and displayed thereon may be the same content (images) or different content (images). For example, the source device 100 may send an image displayed thereon to the first sink device 200 and send a content saved in the storage device of the source device 100 to the second sink device 300. The source device 100 may send only image data, only sound data, or only control data to the first sink device 200 and the second sink device 300.

In the multi-sink topology, Discovery information or Capability information is exchanged using device information or service information. Items (A) through (C) of information described below may be exchanged (e.g., 405 illustrated in FIG. 7) as the Capability information exchanged using the device information or the service information describe above. These items of information are exchanged as, for example, information sent from a source device to a sink device or information received from a sink device by a source device.

(A) The kind of a data transmission format that a sink device uses for media transmission (e.g., the Decode capability of the sink device)

(B) Whether switching to a data transmission format that a newly joined sink device can use is permitted (e.g., a resolution, an image quality or a sound quality, or whether there is a function that will operate normally even when settings for stopping and reproducing images or stopping and reproducing sounds are changed, and whether the timing for receiving this information is possible on Capability Negotiation or during media transmission (e.g., image transmission or sound transmission))

(C) The number of encryption keys of high-bandwidth digital content protection system (HDCP) that a source device can use (e.g., whether there is a function for a source device to manage a plurality of encryption keys when the source device needs to use HDCP).

Based on conditions (e.g., whether there is a capability or a function) specified by the items of information thus acquired, the source device 100 grasps a group to be shared and generates a minimum of data paths for generating image data or sound data.

Example of Transition for Setting Up Multi-Sink Topology Environment

FIGS. 8 through 15 are diagrams illustrating by way of example a transition for the devices that make up the communication system 10 according to the first embodiment of the present technology to set up a multi-sink topology environment.

FIGS. 8 through 15 illustrate examples in which the second sink device 300 joins a group in an environment where the source device 100 is connected to the first sink device 200 by way of P2P direct communication.

FIGS. 8 through 11 illustrate examples in which the first sink device 200 is a P2P GO, the source device 100 is a P2P client, and the first sink device 200 is permitted to change from a P2P GO to a P2P client.

FIGS. 8 and 9 illustrate an example in which at least one of the source device 100 and the first sink device 200 is concurrent-incompatible. FIGS. 8 and 9 will be described in detail with reference to FIGS. 28 through 30.

On Concurrent Function

A concurrent function will be described below. The concurrent function refers, for example, to a function for a source device to set up a concurrent session with one or more sink devices. The concurrent function refers, for example, to a function for a sink device to set up a concurrent session with one or more source devices.

Furthermore, the concurrent function refers, for example, to a function to be able to set up a concurrent session with two or more source devices on an IP network in a Wi-Fi Infra mode when all P2P devices are connected to one IP subnet in the Wi-Fi Infra mode. Moreover, the concurrent function refers, for example, to a function to be able to set up a concurrent session with two or more sink devices on an IP network in a Wi-Fi Infra mode when all P2P devices are connected to one IP subnet in the Wi-Fi Infra mode.

Furthermore, the concurrent function refers, for example, to a function for a sink device to set up a concurrent session with two or more source devices in one channel on a P2P connection. Moreover, the concurrent function refers, for example, to a function for a source device to set up a concurrent session with two or more sink devices in one channel on a P2P connection.

Furthermore, the concurrent function refers, for example, to a function for a sink device to indicate information of the maximum number of connected sink devices that are supported and the remaining number of possible concurrent session connections. Moreover, the concurrent function refers, for example, to a function for a source device to indicate information of the maximum number of connected source devices that are supported and the remaining number of possible concurrent session connections.

Furthermore, the concurrent function defines, for example, an ability to notify one frequency channel or two or more different frequency channels of the number of sink devices on two or more simultaneously usable concurrent sessions. Moreover, the concurrent function defines, for example, an ability to notify one frequency channel or two or more different frequency channels of the number of source devices on two or more simultaneously usable concurrent sessions.

FIGS. 10 and 11 illustrate an example in which both the source device 100 and the first sink device 200 are concurrent-compatible. FIGS. 10 and 11 will be described in detail with reference to FIG. 31.

FIGS. 12 through 15 illustrate examples in which the first sink device 200 is a P2P GO, the source device 100 is a P2P client, and the first sink device 200 is permitted to change from a P2P GO to a P2P client.

FIGS. 12 and 13 illustrate an example in which the source device 100 is incompatible with a plurality of operations. A device that is compatible with a plurality of operations, for example, refers to a device capable of simultaneously performing different processes on a plurality of other devices. For example, a device with a concurrent function is a device compatible with a plurality of operations. However, even a device with a concurrent function shall be a device incompatible with a plurality of operations if the device is incompatible with a plurality of operations in P2P direct communication. FIGS. 12 and 13 will be described in detail with reference to FIGS. 32 through 35.

FIGS. 14 and 15 illustrate an example in which the source device 100 is compatible with a plurality of operations. FIGS. 14 and 15 will be described in detail with reference to FIGS. 36 through 38.

The second sink device 300 may be imagined as being unable to connect to the source device 100. In such a situation, the source device 100 or the second sink device 300 should preferably notify the user that it cannot connect to a companion device using notifying means such as a pop-up screen image or the like. An example of such notification is illustrated in FIG. 16. When the second sink device 300 has connected to the source device 100, that fact should preferably be indicated to the user using notifying means such as a pop-up screen image or the like.

Example of Process of Notifying User that Device is Unable to Connect to Companion Device FIG. 16 is a diagram illustrating by way of example a notification screen image which is displayed on the source device 100 and the second sink device 300 according to the first embodiment of the present technology.

FIG. 16 illustrates at "a" a notification screen image 381 displayed on the display unit 190 of the source device 100. FIG. 16 illustrates at "b" a notification screen image 383 displayed on a display unit 301 of the second sink device 300. These notification screen images 381 and 383 can be displayed as a pop-up screen image, for example. When the user has confirmed these notification screen images 381 and 383, the user can erase the notification screen images 381 and 383 by pressing confirm buttons 382 and 384. After the confirm buttons 382 and 384 have been pressed, operation screen images for making a reconnection may be displayed or screen images for indicating the cause of the connection failure may be displayed.

In this manner, if the controller 140 of the source device 100 decides that it is unable to perform media transmission with the second sink device 300, then the controller 140 can provide the user with notification information (e.g., the notification screen images 381 and 383) for notifying the user of that fact. For a process for transmitting the information, the notification information may be transmitted by one of the processes (N1) through (N3) described below, for example, which is appropriately selected as an optimum process.

(N1) a transmission process of encoding a source image (e.g., an image sent from a source device to a sink device according to Wi-Fi CERTIFIED Miracast specifications) overlapped with notification information (e.g., the notification screen images 381 and 383) and transmitting the encoded data (N2) a transmission process of separately encoding a source image and notification information and transmitting the encoded data (e.g., a source image may be transmitted as a moving image and notification information may be transmitted as a still image)

(N3) a transmission process of transmitting a source image and notification information as control data (e.g., they may be transmitted using hypertext transfer protocol (HTTP), extensible markup language (XML), or WebSocket.)

Example of process of notifying user of P2P GO change

FIG. 17 is a diagram illustrating by way of example a notification screen image which is displayed on the source device 100 and the first sink device 200 according to the first embodiment of the present technology. FIG. 17 illustrates an example of notification when the P2P GO has changed from the first sink device 200 to the source device 100.

FIG. 17 illustrates at "a" a notification screen image 385 displayed on the display unit 190 of the source device 100. FIG. 17 illustrates at "b" a notification screen image 387 displayed on the display unit 251 of the first sink device 200. These notification screen images 385 and 387 can be displayed as a pop-up screen image, for example. When the user has confirmed these notification screen images 385 and 387, the user can erase the notification screen images 385 and 387 by pressing confirm buttons 386 and 388.

In this manner, if the controller 140 of the source device 100 newly performs media transmission with the second sink device 300, then the controller 140 can provide the user with notification information for notifying the user that the P2P GO has changed from the first sink device 200 to the source device 100. The P2P GO change can thus be indicated to the user.

Example of process of selecting sink device for performing media transmission through user operation FIG. 18 is a diagram illustrating by way of example a selection screen image which is displayed on the source device 100 and the first sink device 200 according to the first embodiment of the present technology. FIG. 18 illustrates an example of a selection screen image provided if the source device 100 is incompatible with a plurality of operations (e.g., the situations illustrated in FIGS. 12 and 13).

FIG. 18 illustrates at "a" a selection screen image 390 displayed on the display unit 190 of the source device 100. FIG. 18 illustrates at "b" a selection screen image 393 displayed on the display unit 251 of the first sink device 200. These selection screen images 390 and 393 may be displayed as a pop-up screen image, for example.

In this manner, if the controller 140 of the source device 100 finds it necessary to select a companion device for media transmission, then the controller 140 can provide the user with notification information (e.g., the selection screen images 390 and 393) for notifying the user of that fact. Based on the notification information, the user can select a desired sink device. A connection can thus be started according to the user's intention.

In the examples illustrated in FIGS. 12 and 13, the source device 100 cuts off the connection to the first sink device 200 and performs media transmission with the second sink device 300, for example. However, a sink device for media transmission may be selected by a user's operation. In the event that a message is output which indicates that only either one device is connected contrary to the user's intention, the user may possibly feel annoyed. To deal with this, a reason why another device cannot be connected may be displayed. By grasping the cause, even the user who is lacking in an understanding of the topology can smoothly handle the situation quickly.

The selection screen image 390 serves as a screen image for prompting the user who is operating the source device 100 to select which sink device media transmission is to be directed. For example, the user can select a sink device for media transmission by pressing either one of operation buttons 391 and 392.

The controller 140 of the source device 100 can send the selection screen image 390 displayed on the display unit 190 to the first sink device 200, enabling the display unit 251 of the first sink device 200 to display the selection screen image 393. In this case, the user who is operating the first sink device 200 may act on the selection screen image 393 to prompt the source device 100 to make a selection via UIBC from the first sink device 200.

When switching the transmission to a sink device, the source device 100 may display a pop-up screen image indicating switching (or fallback) of resolution, image quality, image On/Off, sound quality, sound On/Off, etc. The source device 100 may display a pop-up indicating that fact on the display unit of the sink device to be cut off.

In event that the second sink device 300 is connected to the source device 100 in the above processes, the source device 100 may display a pop-up screen image displaying a connection request from the second sink device 300 to notify the user of the connection request.

A screen image displayed on the source device 100 may possibly be sent as an image to the first sink device 200 that has already been connected thereto. The controller 140 of the source device 100 switches the control of the display unit 190 on the basis of a user setting or a predetermined rule.

Furthermore, for example, the user can search for and connect to a new connection device, using the source device 100 or the first sink device 200. An example of screen images displayed in such a situation is illustrated in FIG. 19.

Example of process of notifying user of new sink device FIG. 19 is a diagram illustrating by way of example a notification screen image which is displayed on the source device 100 and the first sink device 200 according to the first embodiment of the present technology.

FIG. 19 illustrates at "a" a notification screen image 371 displayed on the display unit 190 of the source device 100. FIG. 19 illustrates at "b" a notification screen image 374 displayed on the display unit 251 of the first sink device 200. These notification screen images 371 and 374 can be displayed as a pop-up screen image, for example.

For example, if the user desires to search for and connect a sink device other than the first sink device 200 connected to the source device 100, then the user performs an operation to display the notification screen image 371 illustrated in FIG. 19 at "a." When the user has performed this operation, the controller 140 of the source device 100 displays the notification screen image 371 on the display unit 190. The controller 140 of the source device 100 can receive user's operations using operation buttons 372 and 373 in the notification screen image 371. The controller 140 of the source device 100 can perform a control process for searching for other devices on the basis of a user's operation received using the operation buttons 372 and 373. For example, when the operation button 372 in the notification screen image 371 is pressed by the user, the controller 140 of the source device 100 scans devices existing around the source device 100 to search for devices that can be connected to the source device 100. The controller 140 of the source device 100 then displays a screen image indicating the results of the search (e.g., a list of connectable devices) on the display unit 190. An example of the displayed screen image is illustrated in FIG. 39. The controller 140 of the source device 100 performs a connection process for connecting to a device selected by a user's operation in the screen image indicating the results of the search.

Furthermore, the controller 140 of the source device 100 can also display the notification screen image 374 on the display unit 251 of the first sink device 200 which is being connected, for example. Therefore, the users of the source device 100 and the first sink device 200 can search for and confirm new connectable devices.

The controller 140 of the source device 100 can receive a user's operation using operation buttons 375 and 376 in the notification screen image 374. The controller 140 of the source device 100 can perform a control process for searching for other devices on the basis of the user's operation using the operation buttons 375 and 376.

The controller 140 of the source device 100 can manage pop-ups (e.g., the notification screen images and selection images illustrated in FIGS. 16 through 19) separately from images and sounds to be sent to the first sink device 200. In this case, the controller 140 of the source device 100 may or may not send information for displaying pop-up screen images to the first sink device 200 on the basis of a user setting or a predetermined rule.

For example, in an ability confirmation process, the controller 140 of the source device 100 can manage image information (e.g., the images of the cow illustrated in FIGS. 16 through 19) as an object of media transmission and notification information (e.g., notification screen images and selection images illustrated in FIGS. 16 through 19) differently from each other. In this manner, pop-ups not related to the first sink device 200 can be prevented from being displayed while it is being connected, making it possible to provide ordinary services for medical devices and in-vehicle devices that require real-timeness.

Pop-ups may not be displayed on source devices which display information that need instantaneous reactions and require operations thereon, such as game devices, in-vehicle monitors, etc. The controller 140 of the source device 100 can thus be arranged not to display pop-ups (e.g., notification screen images and selection images illustrated in FIGS. 16 through 19) on the basis of a user setting or a predetermined rule.

For the source device 100 to send a connection request to the second sink device 300, a setting may be made not to send a user interface required for the connection request to the first sink device 200 to which data are being sent at present.

Example of Operation of Source Device

Figure 20:
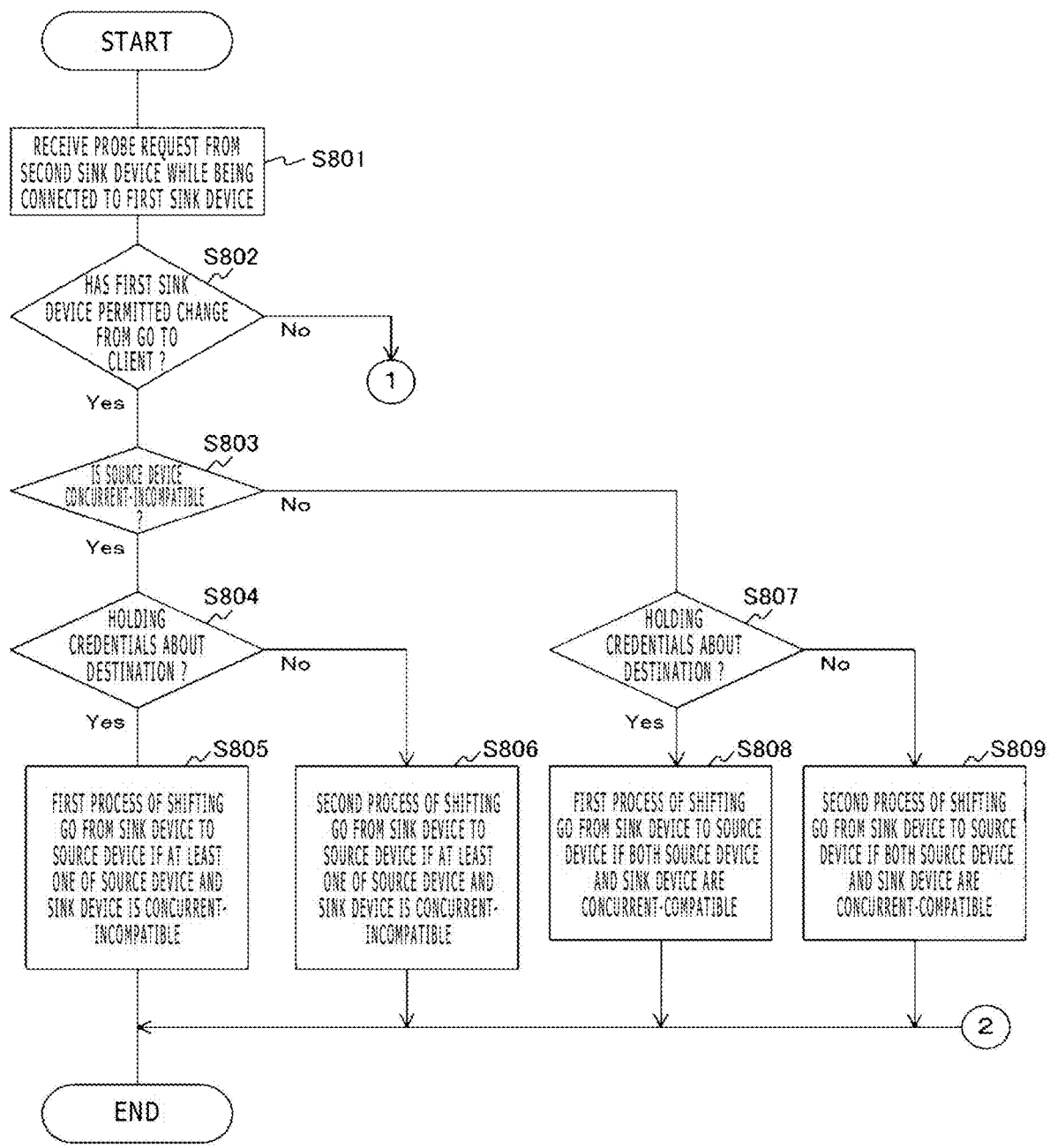
FIG. 20 is a flowchart illustrating by way of example a processing sequence of a multi-sink connection process carried out by the source device 100 according to the first embodiment of the present technology.
Figure 21:
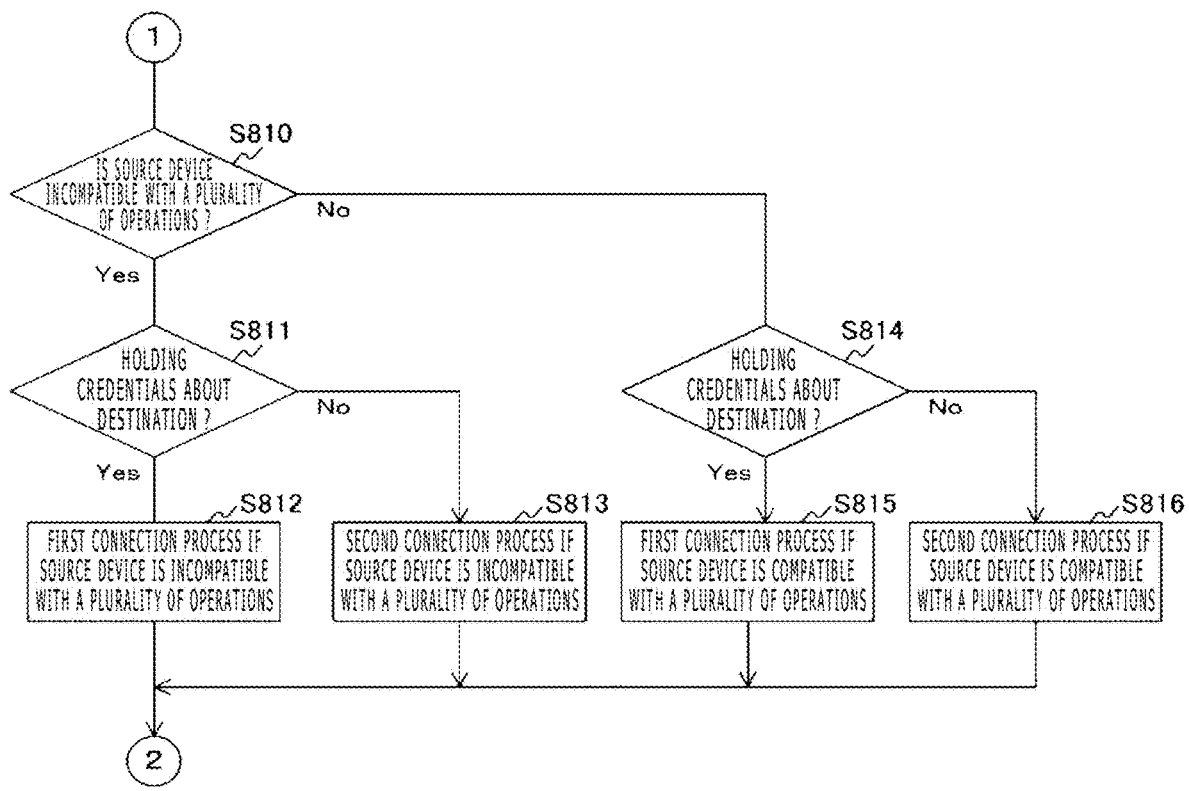
FIG. 21 is a flowchart illustrating by way of example the processing sequence of the multi-sink connection process carried out by the source device 100 according to the first embodiment of the present technology.

FIGS. 20 and 21 are flowcharts illustrating by way of example a processing sequence of a multi-sink connection process carried out by the source device 100 according to the first embodiment of the present technology.

FIGS. 20 and 21 illustrates an example of operation of the source device 100 in which the second sink device 300 newly joins a P2P topology where the first sink device 200 has been playing the role of a P2P GO, setting up a multi-sink topology.

It is assumed that the source device 100 which plays the role of a P2P client is being connected to the first sink device 200 which plays the role of a P2P GO. It is also assumed that the source device 100 is not connected to the second sink device 300 which plays the role of a P2P device.

Initially, the source device 100, while being connected to the first sink device 200, receives a Probe Request from the second sink device 300 (step S801). Upon reception of the Probe Request, the source device 100 starts to operate to connect to the second sink device 300.

The controller 140 of the source device 100 determines whether it is possible for the first sink device 200 being connected to change its role from the P2P GO to the P2P client (whether the first sink device 200 permits its role to change) (step S802). The controller 140 of the source device 100 can determine whether the role can be changed on the basis of information sent from the first sink device 200 (e.g., a GO shuffle Request illustrated in FIG. 28), for example.

If it is possible to change the role (step S802), then the controller 140 of the source device 100 determines whether the wireless communication unit 120 (e.g., a wireless module) of the source device 100 can use a concurrent mode (step S803). The concurrent mode refers to a mode in which a concurrent-compatible device (a device having a concurrent function) performs a concurrent operation.

If it is impossible to use a concurrent mode (step S803), then the controller 140 of the source device 100 determines whether the newly joining second sink device 300 is holding credentials (connection setting information) with respect to the source device 100 (step S804). The credentials about the source device 100 represent, for example, connection setting information that is used for connecting to the source device 100, e.g., information used for authentication such as identifier (ID), password, or the like.

If the second sink device 300 is holding credentials about the source device 100 (step S804), then the controller 140 of the source device 100 performs a first shifting process for the P2P GO (step S805). This first shifting process for the P2P GO will be described in detail with reference to FIGS. 28 and 30.

If the second sink device 300 is not holding credentials about the source device 100 (step S804), then the controller 140 of the source device 100 performs a second shifting process for the P2P GO (step S806). This second shifting process for the P2P GO will be described in detail with reference to FIGS. 28 and 29.

If it is impossible to use a concurrent mode (step S803), then the controller 140 of the source device 100 determines whether the newly joining second sink device 300 is holding credentials (connection setting information) with respect to the source device 100 (step S807).

If the second sink device 300 is holding credentials about the source device 100 (step S807), then the controller 140 of the source device 100 performs a first shifting process for the P2P GO (step S808). This first shifting process for the P2P GO will be described in detail with reference to FIGS. 30 and 31.

If the second sink device 300 is not holding credentials about the source device 100 (step S807), then the controller 140 of the source device 100 performs a second shifting process for the P2P GO (step S809). This second shifting process for the P2P GO will be described in detail with reference to FIGS. 29 and 31.

If it is impossible to change the role (step S802), then the controller 140 of the source device 100 determines whether the wireless communication unit 120 of the source device 100 is compatible with a plurality of operations (step S810).

If the wireless communication unit 120 of the source device 100 is incompatible with a plurality of operations (step S810), then the controller 140 of the source device 100 determines whether the newly joining second sink device 300 is holding credentials (connection setting information) with respect to the source device 100 (step S811).

If the secondسink device 300 is holding credentials about the source device 100 (step S811), then the controller 140 of the source device 100 performs a first connection process if the source device is incompatible with a plurality of operations (step S812). This first connection process will be described in detail with reference to FIGS. 32 and 34.

If the second sink device 300 is not holding credentials about the source device 100 (step S811), then the controller 140 of the source device 100 performs a second connection process if the source device is incompatible with a plurality of operations (step S813). This second connection process will be described in detail with reference to FIGS. 32, 33, and 35.

If the wireless communication unit 120 of the source device 100 is compatible with a plurality of operations (step S810), then the controller 140 of the source device 100 determines whether the newly joining second sink device 300 is holding credentials (connection setting information) about the source device 100 (step S814).

If the second sink device 300 is holding credentials about the source device 100 (step S814), then the controller 140 of the source device 100 performs a first connection process if the source device is compatible with a plurality of operations (step S815). This first connection process will be described in detail with reference to FIGS. 36 and 38.

If the second sink device 300 is not holding credentials about the source device 100 (step S814), then the controller 140 of the source device 100 performs a second connection process if the source device is compatible with a plurality of operations (step S816). This second connection process will be described in detail with reference to FIGS. 36 and 37.

Example of Confirmation of Information

An example in which WFD IE is encapsulated in the payload of a Probe Request or a Probe Response, and an example of process of controlling controllable Device Discovery or Service Discovery will be described below as a process of confirming the items of information described above.

FIGS. 22 through 26 are diagrams illustrating examples of WFD IE formats exchanged between the devices that make up the communication system 10 according to the first embodiment of the present technology.

FIG. 27 is a diagram illustrating by way of example a new message for application service platform (ASP) exchanged between the devices that make up the communication system 10 according to the first embodiment of the present technology.

WFD IE illustrated in FIGS. 22 through 26 can be exchanged through P2P connections between the devices that make up the communication system 10. Furthermore, WFD IE illustrated in FIGS. 22 through 26 can be exchanged via access points between the devices that make up the communication system 10. Examples in which WFD IE is exchanged via access points will hereinafter be described below. For example, the source device 100 sends a Probe Request via an access point to the second sink device 300 to search for a P2P-connectable device.

If the second sink device 300 is a P2P-connectable device, for example, then the source device 100 can detect a frequency channel to be used in a P2P connection by receiving a Probe Response via an access point. The examples will be described below on the assumption that the second sink device 300 is a P2P-connectable device and on the premise that the source device 100 has been able to receive a Probe Response.

According to the above process, the source device 100 grasps a frequency channel for being P2P-connected to the second sink device 300, establishing a P2P connection.

After having established a P2P connection, the source device 100 establishes a link as a TCP connection or an RTSP connection to the second sink device 300, and thereafter exchanges at least one of the following items (a) through (d):

(a) P2P IE (Information Element)
(b) WFD IE (Information Element)
(c) Application service platform (ASP) (e.g., an ASP format command in a new format)
(d) Protocol according to universal plug and play (UPnP) standards For example, a process of encapsulating WFD IE in the payload of a Probe Request or a Probe Response and exchanging it will be described below.

Examples of formats using WFD IE described in (b) above are illustrated in FIGS. 22 through 26. FIGS. 22 through 24 illustrate formats already assigned according to Miracast Release 1. However, a new bit is assigned to Subelement ID (11) illustrated in FIG. 24. Specifically, a new Field corresponding to Subelement ID (11) is illustrated in FIGS. 25 and 26.

In FIG. 26, [5:0] of New Device Information field represents information for the second sink device 300 to decide an optimum frequency channel in a P2P connection.

During a sequence using either one of (a) through (c) described above, the source device 100 can decide an optimum frequency channel in a P2P connection to the second sink device 300 by grasping items of information. For example, for accessing the second sink device 300 using the TDLS process, associated frequency information (field [23:14] illustrated in FIG. 26) between the access point and the second sink device 300 can be used. Furthermore, for example, concurrent information (field [5:2] illustrated in FIG. 26) of the wireless link of the second sink device 300 can be used. The concurrent information represents information about, for example, whether a connection mode such as a time-division connection of the same frequency channels, a time-division connection of different frequency channels, a simultaneous connection of the same frequency channels, or a simultaneous connection of different frequency channels is possible (field [5:2] illustrated in FIG. 26). Moreover, for example, a terminal ability (field [13:8] illustrated in FIG. 26) as a wireless function can be used.

There is an instance where the access point and the second sink device 300 are connected to each other by a wire or a connector such as an Ethernet (registered trademark) cable or a universal serial bus (USB) cable/connector. In this case, the second sink device 300 notifies the source device 100 of information about the fact that the second sink device 300 is connected to the access point by a wire ([1:0] illustrated in FIG. 26) and about whether the second sink device 300 has a P2P connection wireless function. The source device 100 can thus decide an optimum frequency channel. If the second sink device 300 is compatible with a wired link only, for example, then it is directly connected to the access point rather than going to a P2P connection. If the second sink device 300 is also compatible with a wireless link, then it is possible to select one of supported frequency channels and connect to the second sink device 300 through the selected frequency channel.

The example in which WFD IE is encapsulated in the payload of a Probe Request or a Probe Response has been described above. The present technology is not limited to the above example.

If Display Service of Wi-Fi Direct Services is used, for example, then Service Capability information can be exchanged between devices via a message based on ASP. Specifically, information included in WFD IE is divided in every four bits and converted into a hexadecimal number, which is converted into a text string to be sent and received. Moreover, information included in WFD IE is not limited to specifications at the present time. For example, the Service Capability information illustrated in FIG. 27 may be included in the payload.

Figure 28:
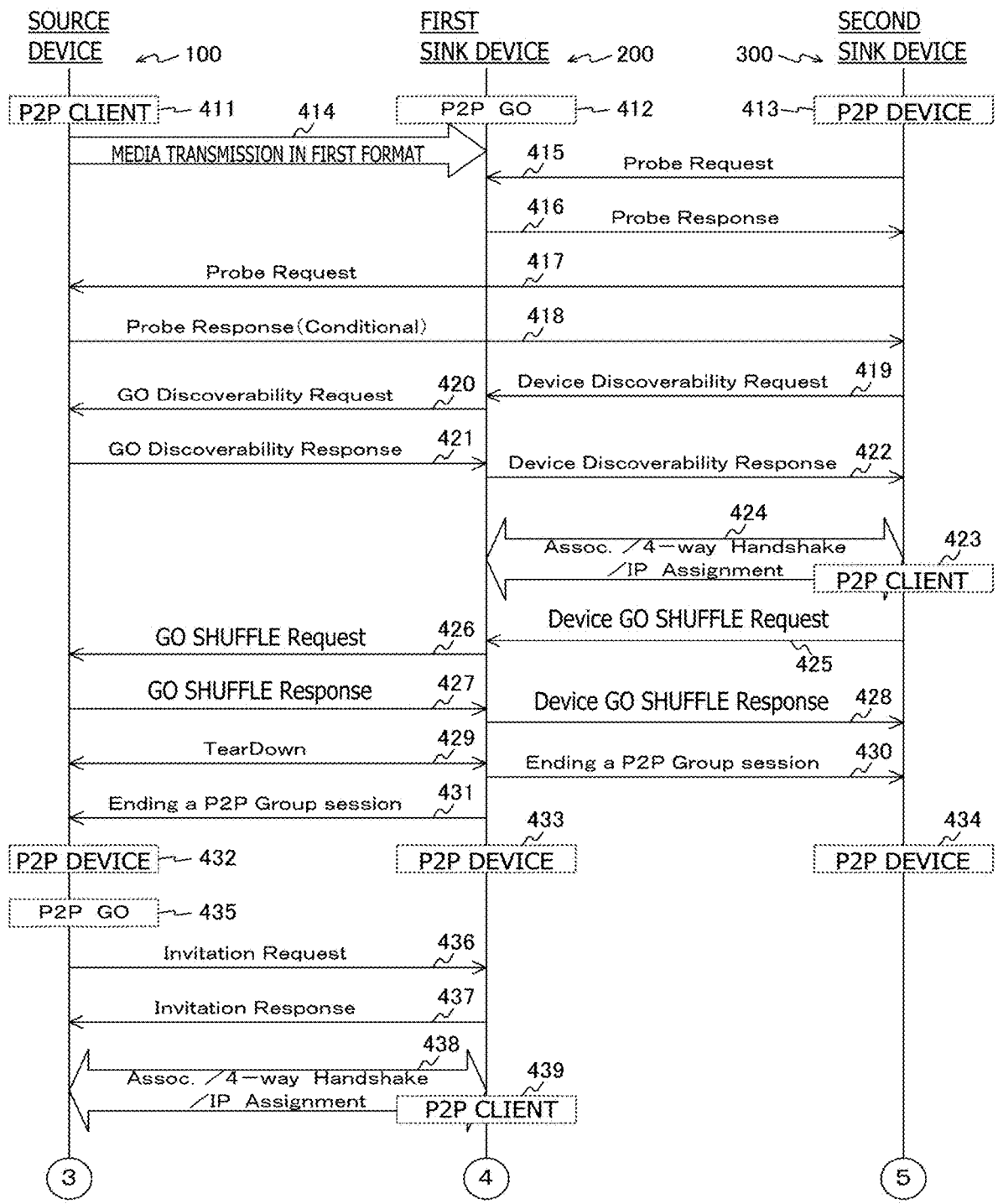
FIG. 28 is a sequence chart illustrating by way of example a communication processing sequence between the devices that make up the communication system 10 according to the first embodiment of the present technology.

Example of Communication in which at Least One of Source Device and Sink Device is Concurrent-Incompatible FIG. 28 is a sequence chart illustrating by way of example a communication processing sequence between the devices that make up the communication system 10 according to the first embodiment of the present technology. The communication processing sequence will be described with reference to FIGS. 8 and 9.

FIG. 28 illustrates an example of operation in which the second sink device 300 joins a group in an environment where the source device 100 is connected to the first sink device 200 by way of P2P direct communication. Specifically, initially, there is illustrated an example of operation in which the source device 100 is a P2P client 411, the first sink device 200 is a P2P GO 412, and the second sink device 300 is a P2P device 413.

It is assumed that the first sink device 200 has already been connected as the P2P GO 412 to the source device 100 (P2P client 411), and the source device 100 has been performing media transmission to the first sink device 200 using a first format (414). For example, as illustrated in FIG. 8 at "a," the first sink device 200 performs media transmission to the first sink device 200 using a first format (331).

Since the first sink device 200 has already been connected as the P2P GO 412 to the source device 100 (P2P client 411), the second sink device 300 performs an Invitation Request process on the first sink device 200 (415, 416). Alternatively, the first sink device 200 may perform a Provision Discovery process on the second sink device 300. In this example, the Invitation Request process will be described below.

When the second sink device 300 sends a Probe Request to the first sink device 200 (415), the first sink device 200 returns a Probe Response to the second sink device 300 (416).

The second sink device 300 performs a Probe Request process on the source device 100 (417, 418).

Since the source device 100 is connected to not only the first sink device 200 under the connection, but also the new second sink device 300, the source device 100 notifies the second sink device 300 of the fact that the number of simultaneously connected devices is two or more, as device information or service information.

The notifying process can be a notifying process for storing IE (Information Element) as part of a packet of a Probe Request or Probe Response, or a notifying process for storing IE (Information Element) as part of a Device Discovery Request or Device Discovery Response. The notifying process can be performed by exchanging at least one of the following items (a) through (d):

(a) P2P IE (Information Element)
(b) WFD IE (Information Element)
(c) Application service platform (ASP) (e.g., an ASP format command in a new format)
(d) Protocol according to universal plug and play (UPnP) standards In the sequence, the second sink device 300 (P2P device 413) sends a Probe Request to the source device 100 (P2P client 411) (417). If the second sink device 300 and the source device 100 use the same frequency channel, then it is possible for the second sink device 300 to receive the IE described above from the source device 100.

The second sink device 300 has sent the Probe Request to the first sink device 200 (P2P GO 412) (415). If the first sink device 200 and the source device 100 have already been in an environment for Miracast communication, then the possibility that they operate in the same frequency channel is high. Consequently, it is possible for the second sink device 300 and the source device 100 to use the same channel.

The second sink device 300 sends a Device Discoverability Request to the first sink device 200 (419). The first sink device 200 sends a GO Discoverability Request to the source device 100 (420). The source device 100 sends a GO Discoverability Response to the first sink device 200 (421). The first sink device 200 sends a Device Discoverability Response to the second sink device 300 (422). In the Probe Request process (415 through 418) described above, there is a possibility to be able to grasp at least one of the items of information obtained by the exchanges (419 through 422) between the devices (information to grasp the environment in which the first sink device 200 as the P2P GO is carrying out Miracast communication with the source device 100). With respect to the information that has been grasped in the above Probe Request process (415 through 418), the exchanges (419 through 422) for acquiring information between the devices may thus be omitted.

In this manner, the second sink device 300 can receive three IEs in a sequence up to the Device Discoverability Request. Based on the three IEs, the second sink device 300 can grasp the environment in which the first sink device 200 as the P2P GO is carrying out Miracast communication with the source device 100.

Because of the Device Discovery Request process and the Device Discovery Response process (419 through 422) described above, the first sink device 200 connects the second sink device 300 as a new P2P client 423. The first sink device 200 performs a group formation process (a process of 4-way Handshake, IP assignment, etc.) (424).

As illustrated in FIG. 8 at "b," for example, the source device 100, the first sink device 200, and the second sink device 300 make exchanges therebetween (333 through 335), enabling the second sink device 300 to become a new P2P client.

Then, the second sink device 300 sends a Device GO shuffle Request message to the first sink device 200 (425). In this instance, the second sink device 300 includes (A1) and (A2) illustrated below in the Device GO shuffle Request message on the basis of the topology information grasped by the above IE information, and sends the Device GO shuffle request message (425).

(A1) A request for asking the first sink device 200 to shift the P2P GO to the source device 100 as the second sink device 300 is unable to connect to the source device 100 in the present relationship between the P2P GO and the P2P client (A2) A request for connecting to the source device 100

When the first sink device 200 receives the Device GO shuffle Request message, the first sink device 200 sends a GO shuffle Request to the source device 100 (426). In this instance, the first sink device 200 includes (B1) through (B3) illustrated below in the GO shuffle Request and sends the GO shuffle Request (426).

(B1) Confirmation as to whether the source device 100 is capable of performing a plurality of operations (B2) Information indicative of whether the first sink device 200 (own device) has agreed with changing the roles of the P2P GO and the P2P client. This information includes a bit indicative of whether the first sink device 200 is permitted to become a P2P client.

(B3) A request for the second sink device 300 to connect to the source device 100

When the source device 100 receives the GO shuffle Request, the source device 100 is able to grasp (C1) and (C2) illustrated below.

(C1) A request for the second sink device 300 to connect to the source device 100

(C2) Whether the first sink device 200 has agreed with changing the roles of the P2P GO and the P2P client When the source device 100 grasps (C1) and (C2) described above, the source device 100 starts to prepare its own device to become a P2P GO. First, the source device 100 returns information that the source device 100 has started preparing itself to become a P2P GO to the first sink device 200. Specifically, the source device 100 includes response information about the above request information ((B1) through (B3)) in a GO shuffle Response, and sends the GO shuffle response to the first sink device 200 (427).

In this example, the source device 100 is incompatible with a concurrent process. Therefore, the source device 100 includes the fact that it is incompatible with a concurrent process as response information in the GO shuffle Response, and sends the GO shuffle Response to the first sink device 200 (427).

When the first sink device 200 receives the GO shuffle Response, with respect to the second sink device 300, the first sink device 200 includes response information about the request information described above ((A1) and (A2)) in a Device GO shuffle Response, and sends the Device GO shuffle Response to the second sink device 300 (428).

Inasmuch as the source device 100 has grasped that the first sink device 200 has agreed with changing the roles of the P2P GO and the P2P client, the source device 100 cuts off the communication with the first sink device 200 (Tear-Down command) (429). The source device 100 and the first sink device 200 are now cut off from each other (Ending a P2P Group session process), and go back to P2P devices (P2P Devices) (431). Similarly, the first sink device 200 and the second sink device 300 are cut off from each other (Ending a P2P Group session process), and go back to P2P devices (P2P Devices) (430).

According to these processes, the source device 100, the first sink device 200, and the second sink device 300 all become P2P devices (432 through 434). As illustrated in FIG. 9 at "a," for example, the source device 100, the first sink device 200, and the second sink device 300 make exchanges therebetween (337, 338), enabling themselves to become P2P devices.

The source device 100 grasps that it is necessary to launch its own device as a P2P GO by exchanging the Device GO shuffle Request, the Device GO shuffle Response, the GO shuffle Request, and the GO shuffle Response. Therefore, after the source device 100, the first sink device 200, and the second sink device 300 all have become P2P devices, the source device 100 is launched as a P2P GO (435). Alternatively, the source device 100 may change its role from the P2P client to a P2P GO, without going via a P2P device.

After the devices have become P2P devices (432 through 434) and before the source device 100 is launched as a P2P GO (435), the source device 100 and the first sink device 200 may exchange GO shuffle completion messages therebetween. For example, the source device 100 and the first sink device 200 may exchange a GO shuffle completion Request and a GO shuffle completion Response illustrated in FIG. 31 therebetween (488, 489).

Then, the source device 100 sends an Invitation Request message to the first sink device 200 (436). When the first sink device 200 receives the Invitation Request message, the first sink device 200 sends an Invitation Response message to the source device 100 (437).

Then, the source device 100 performs an Assoc./4-way Handshake/IP Assignment process between itself and the first sink device 200 (438). The first sink device 200 thus becomes a P2P client (439).

The Assoc. also includes Provisioning. Provisioning enables a displayed screen image that indicates a connected state between the source device 100 and the first sink device 200 to be displayed on the display unit of the second sink device 300. The user is prompted to make a selection using the screen image displayed on the display unit of the second sink device 300, causing the second sink device 300 to start connecting to the first sink device 200 or to the source device 100.

With regard to Persistent, a process for a situation in which the second sink device 300 holds a plurality of connection profiles (Persistent information) will be considered below.

For example, a P2P GO or a P2P device can hold items of information with respect to companion devices in the past (e.g., communication via AP, a P2P connection, or TDLS). For example, service set identifier (SSID), Group ID, MAC address, and credentials may be held as such items of information.

It is assumed that a source of media data and a destination of media data are holding each other's connection profiles. In such a case, a WSC exchange process can be omitted using a Persistent mode, making it possible to achieve higher protocol efficiency for shortening reconnection times.

Figure 30:
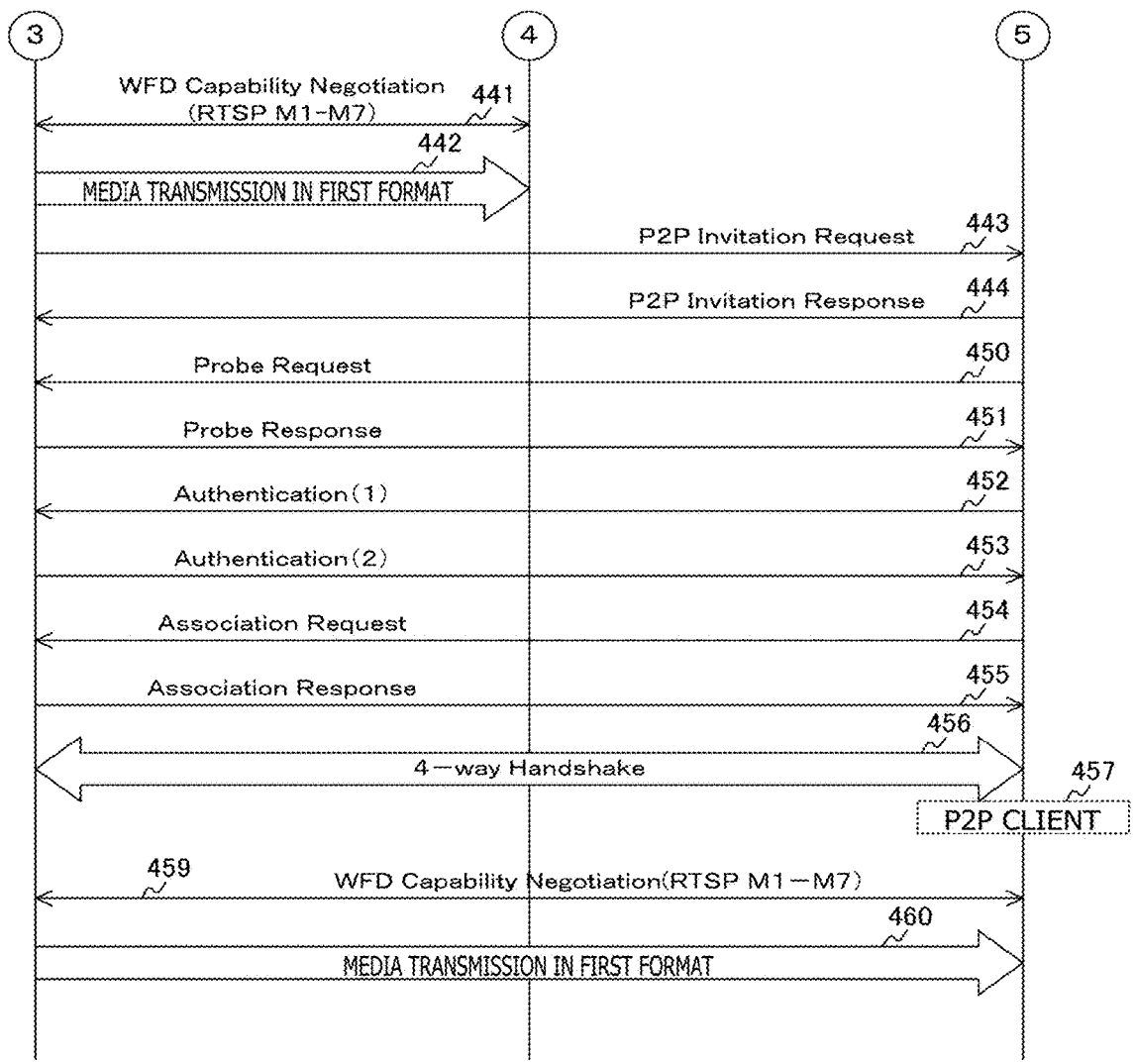
FIG. 30 is a sequence chart illustrating by way of example a communication processing sequence between the devices that make up the communication system 10 according to the first embodiment of the present technology.

For example, by thus saving credentials, etc., a reconnection process can be carried out while omitting the WSC exchange process, etc. An example of such a process is illustrated in FIG. 30.

Example of Connection Depending on Holding of Credentials of Destination

As illustrated in FIG. 28, the second sink device 300 can hold credentials in a situation where the source device 100 is a P2P client and the first sink device 200 is a P2P GO by connecting to the first sink device 200. However, the second sink device 300 may be imagined as not holding credentials in a situation where the source device 100 is a P2P GO. If a connection process is carried out from the onset in this case, the time of WPS (WSC exchange) tends to become longer.

According to the first embodiment of the present technology, processes will be described below separately under the following two conditions depending on whether to hold credentials:

(D1) If the second sink device 300 has already held credentials in a situation where the source device 100 is a P2P GO and the first sink device 200 is a P2P client, then those credentials are used.

(D2) The second sink device 300 has not held credentials in a situation where the source device 100 is a P2P GO and the first sink device 200 is a P2P client.

As to the credentials, group transient key (GTK) refers to a group key and pre-shared key (PSK) refers to a pre-shared key.

Example of Connection where Credentials are not Held

Figure 29:
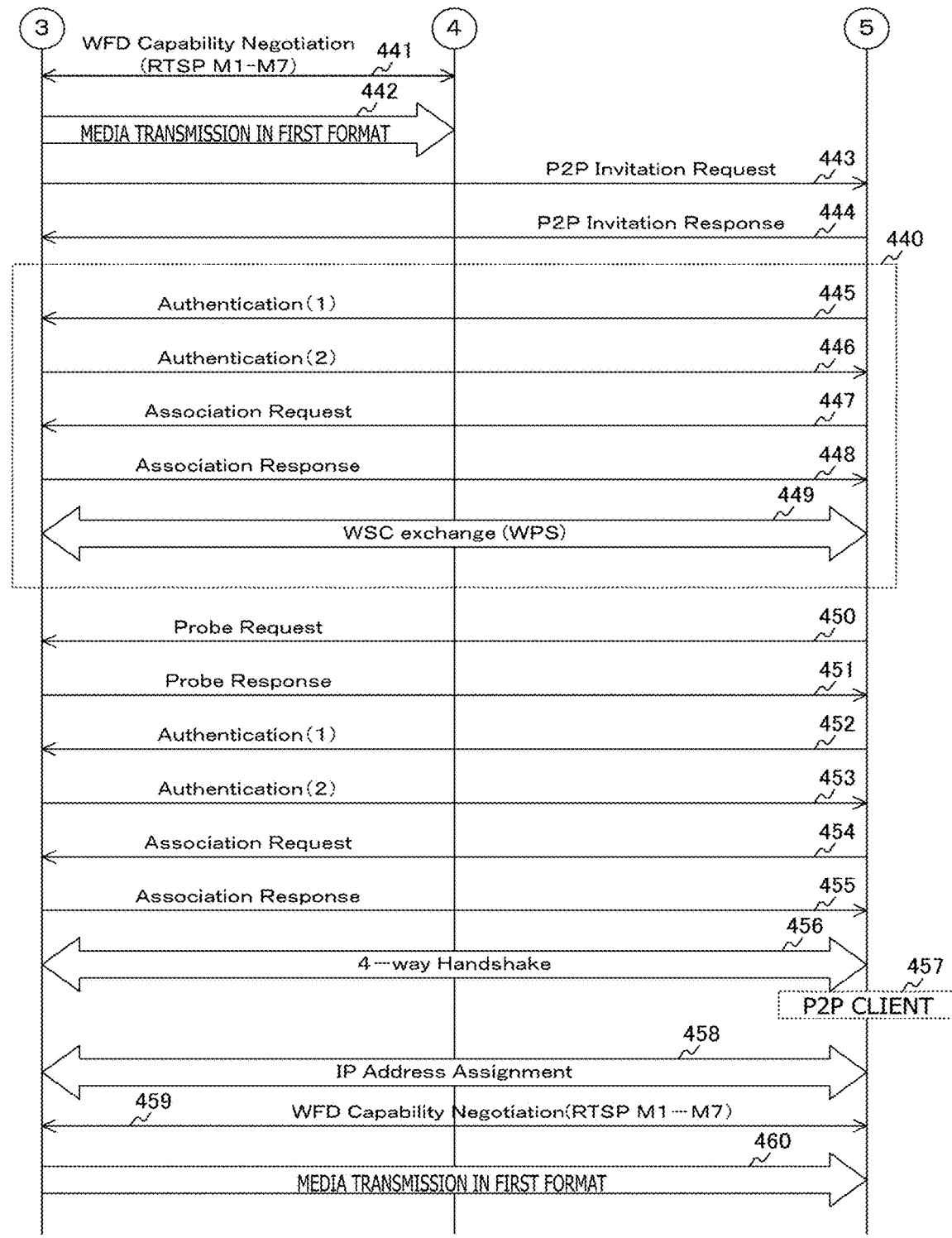
FIG. 29 is a sequence chart illustrating by way of example a communication processing sequence between the devices that make up the communication system 10 according to the first embodiment of the present technology.

FIG. 29 is a sequence chart illustrating by way of example a communication processing sequence between the devices that make up the communication system 10 according to the first embodiment of the present technology.

The communication processing sequence illustrated in FIG. 29 is performed following the example illustrated in FIG. 28. The communication processing sequence illustrated in FIG. 29 is an example corresponding to (D2) described above.

First, a WFD Capability Negotiation (RTSP M1 to M7) is carried out between the source device 100 and the first sink device 200 (441). Then, media transmission is performed from the source device 100 to the first sink device 200 using a first format (442).

Then, a P2P Invitation process is carried out between the source device 100 and the second sink device 300 (443, 444). Then, an Authentication process is carried out between the source device 100 and the second sink device 300 (445, 446). Then, an Association Request and an Association Response are exchanged between the source device 100 and the second sink device 300 (447, 448). Then, a WPS (WSC exchange) is made between the source device 100 and the second sink device 300 (449).

Then, a Probe Request and a Probe Response are exchanged between the source device 100 and the second sink device 300 (450, 451). Then, an Authentication process is carried out between the source device 100 and the second sink device 300 (452, 453). Then, an Association Request and an Association Response are exchanged between the source device 100 and the second sink device 300 (454, 455). Then, a 4-way Handshake is carried out between the source device 100 and the second sink device 300 (456).

According to these processes, the second sink device 300 becomes a P2P client (457).

Then, an IP Address Assignment is carried out between the source device 100 and the second sink device 300 (458). An IP address is now assigned.

Then, a WFD Capability Negotiation (RTSP M1 to M7) is carried out between the source device 100 and the second sink device 300 (459). Then, media transmission is performed from the source device 100 to the second sink device 300 using a first format (460).

As illustrated in FIG. 9 at "b," for example, media transmission is performed from the source device 100 to the first sink device 200 and the second sink device 300 using a first format (339, 340).

Example of Connection where Credentials are Held

FIG. 30 is a sequence chart illustrating by way of example a communication processing sequence between the devices that make up the communication system 10 according to the first embodiment of the present technology.

The communication processing sequence illustrated in FIG. 30 is performed following the example illustrated in FIG. 28. The communication processing sequence illustrated in FIG. 30 is an example corresponding to (D1) described above. The communication processing sequence illustrated in FIG. 30 is similar to the communication processing sequence illustrated in FIG. 29 except that some processes of the latter are omitted. Specifically, processes (445 through 449) in a dotted-line rectangle 440 illustrated in FIG. 29 and the IP Address Assignment (458) are omitted. Those items which are common to those illustrated in FIG. 29 are indicated by identical reference symbols, and will not be described below. In the example illustrated in FIG. 30, the IP Address Assignment (458) may be carried out rather than being not omitted.

It is assumed that the second sink device 300 has already held credentials in a situation where the source device 100 is a P2P GO and the first sink device 200 is a P2P client. In this case, as illustrated in FIG. 30, after SSID, Group ID, MAC address information has been grasped, a Persistent group can be formed. The group can be formed only by an Invoke in this case.

Conversely, it is assumed that the second sink device 300 does not hold credentials in a situation where the source device 100 is a P2P GO and the first sink device 200 is a P2P client. In this case, as illustrated in FIG. 29, since it is necessary to carry out WPS (WSC exchange), etc., the connection time tends to become longer. An example where information can be automatically exchanged and a connection can be shortened only by a 4-way Handshake process as with the example illustrated in FIG. 30 will be described below.

Example in which Information is Exchanged Using Action Frame

For example, credentials and SSID (e.g., Direct_xx) vary compared with the second sink device 300 being connected to the first sink device 200. Consequently, it is possible to use a notification process for the source device 100 to notify the second sink device 300 using an Action Frame (Short Frame). The Action Frame (Short Frame) represents, for example, a GO shuffle Response or a Device GO shuffle Response.

A connection can be shortened by using the following processes (E1) through (E3):

(E1) SSID decided by the source device 100 (Autonomous GO) is followed.

(E2) GTK is acquired from the source device 100 (Autonomous GO) at the time of Association or 4-way Handshake.

(E3) PSK is acquired by acquiring the key used between the source device 100 and the first sink device 200, using some algorithm. For example, PSK can be determined by performing a predetermined arithmetic operation (e.g., multiplication) on the PSK exchanged in the past or items of information used in the past (e.g., new SSID, low-order bit).

These items of information are exchanged on an encrypted channel prior to TearDown, and TearDown is performed after the exchange is finished.

Example of Changing of PSK

A process for the source device 100 to connect efficiently to the connection with the second sink device 300 will be described below.

For example, in the examples illustrated in FIGS. 28 and 30, since the first sink device 200 and the second sink device 300 have once been connected to each other, a PSK is shared. The source device 100 changes a PSK to be used in its connection to the first sink device 200 after the GO shuffle process.

Similarly, in a situation where the first sink device 200 and the second sink device 300 are connected to each other and the source device 100 and the first sink device 200 are connected to each other, only a Pass Phase may be changed and WPS may be omitted between the source device 100 and the second sink device 300.

Before the source device 100 launches a P2P GO from a P2P client and after the P2P GO has been launched, the source device 100 can regenerate a PSK according to some rules and may make an exchange in advance so as to use the PSK next time. Alternatively, the source device 100 may make the PSK fresh in some way and may use it on the P2P GO.

These processes can reduce a delay in the Wi-Fi simple configuration (WSC) exchange process, for example.

Example of Process of Changing IP Address

A process of changing an IP address will be described below. According to the first embodiment of the present technology, there is illustrated an example in which the first sink device 200 functions as a dynamic host configuration protocol (DHCP) server before a GO shuffle process is performed, but the source device 100 functions as a DHCP server after the GO shuffle process.

As described above, the source device 100 functions as a DHCP server after the GO shuffle process. After the GO shuffle process, as the source device 100 needs a time to launch a DHCP server and assign an IP address, the switching time increases. If an HDCP is used in Miracast communication, then it is necessary to connect the HDCP again due to a change in the assignment of an IP address.

Taking advantage of the fact that the default route of the source device 100 is directed to the first sink device 200, the IP addresses of the source device 100 and the first sink device 200 are switched around. An IP shuffle is thus carried out to use the IP address of the source device 100 as the IP address of the first sink device 200 and to use the IP address of the first sink device 200 as the IP address of the source device 100.

In this manner, the link of the source device 100 and the first sink device 200 which is able to perform a DHCP authentication by nature can be used as it is.

By sending a GO shuffle Request from the first sink device 200 to the source device 100, including information equivalent to that generated by an HDCP, the time of IP Assignment can be reduced. The DHCP policy of the source device 100 should preferably be made equivalent to the DHCP policy of the first sink device 200.

Example of Topology Setting Using User Interface

A process of setting a topology using a user interface will be described below.

For example, it is assumed that all of the devices are P2P devices when the second sink device 300 is actively trying to connect to a P2P GO. In such a case, there will be considered a process wherein the second sink device 300 holds both Persistent information to the source device 100 and Persistent information to the first sink device 200, using a Persistent mode. It is also assumed that both the source device 100 and the first sink device 200 hold Persistent information to the second sink device 300.

In this case, the second sink device 300, the source device 100, and the first sink device 200 can be connected using Persistent. Therefore, the display unit 301 of the second sink device 300 can display not only SSID or Group ID, but also information such as the source of media data and the destination of media data (e.g., the source device 100 and the first sink device 200). It is possible to set a topology by having the user perform selecting operations using the information thus displayed.

The present technology is not limited to these details. For example, the second sink device 300 may only grasp that the first sink device 200 is a P2P GO and the source device 100 is a P2P client. It is thus assumed that the second sink device 300 is grasping only device roles (a P2P GO and a P2P client), and that the second sink device 300 has sent a request for being connected in a multi-sink topology by a next command (GO shuffle Request) to the first sink device 200. In this situation, the first sink device 200 is grasping that its own device operates as a sink device though it is a P2P GO by itself and that the source device 100 operates as a P2P client. Consequently, the first sink device 200 is able to grasp that two sinks cannot be connected unless the P2P GO is shifted after having received a GO shuffle Request. Therefore, the first sink device 200 may send a GO shuffle Request command for shifting the P2P GO between the source device 100 and the first sink device 200 to the source device 100.

As illustrated in FIGS. 28 through 30, in order to perform stable data transmission on each P2P direct link, the source device 100 generates as many data paths as the number of sink devices and sends media data (e.g., image data and sound data) therethrough. In the examples illustrated in FIGS. 28 through 30, as the number of sink devices is two (the first sink device 200 and the second sink device 300), the source device 100 generates two data paths and send media data therethrough.

Content sent from the source device 100 to the first sink device 200 or to the second sink device 300 and displayed thereon after the topology has thus been set up may be the same content (e.g., images or sounds) or different content (e.g., images or sounds). For example, the source device 100 can send an image displayed thereon as it is to the first sink device 200, and can send content saved in the storage device of the source device 100 to the second sink device 300. The source device 100 may send only image data, only sound data, or only control data as media data.

Example of Generation of P2P Group

A process of generating a P2P group will be described below. The first embodiment of the present technology illustrates an example in which two processes of generating a P2P group are used.

The first generating process represents a generating process in which the user manually sets up a P2P group. The GO of a P2P group generated by this generating process will be referred to as Autonomous GO.

The second generating process represents a generating process for generating a P2P Group on the basis of an Intent Value. The GO of a P2P group generated by this generating process will be referred to as GO or P2P GO. The Intent value refers to a parameter for a device to become a GO preferentially (e.g., a value indicating the degree of priority to become a GO).

Figure 31:
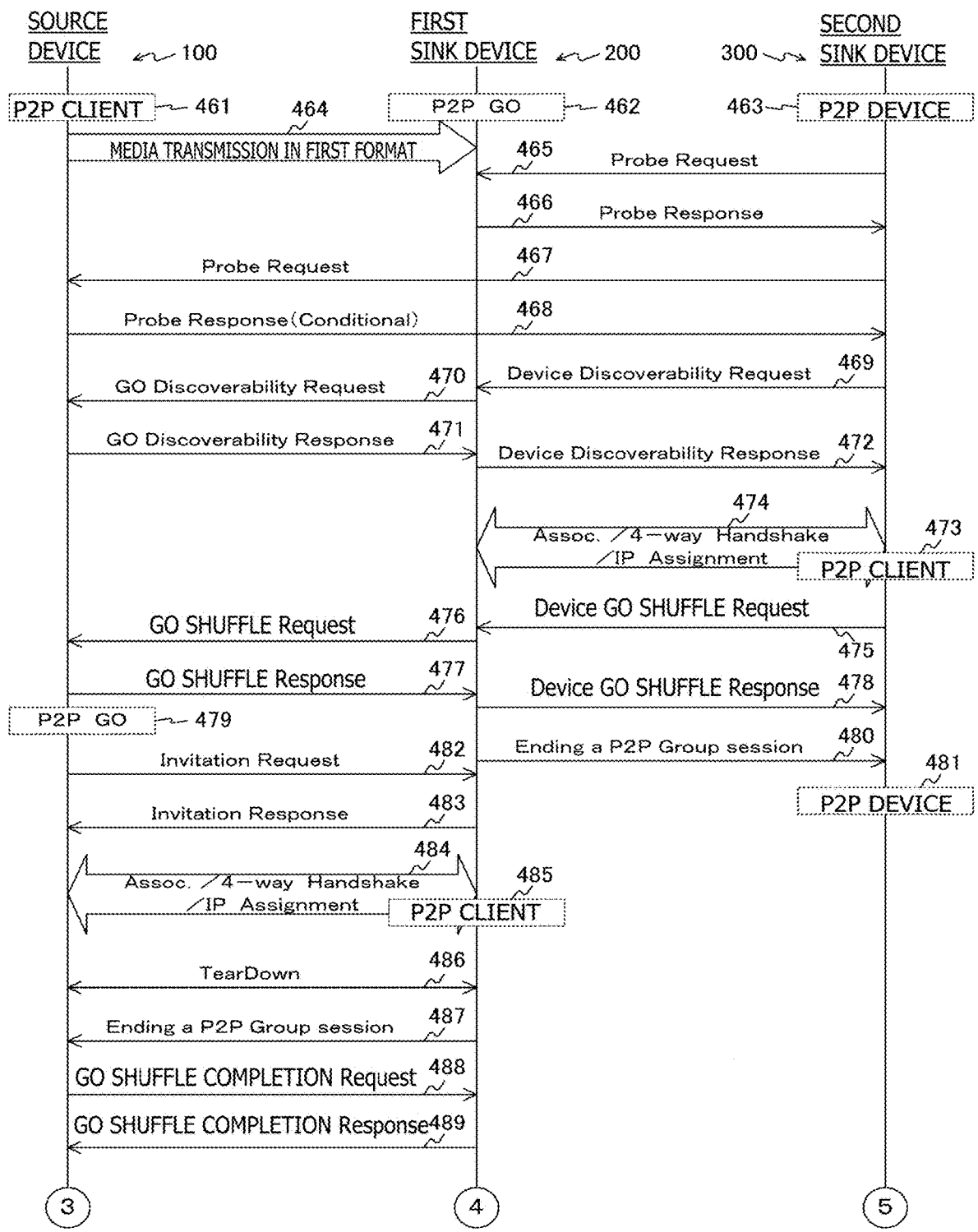
FIG. 31 is a sequence chart illustrating by way of example a communication processing sequence between the devices that make up the communication system 10 according to the first embodiment of the present technology.

Example of Communication In Situation where Both Source Device and Sink Device are Concurrent-Compatible FIG. 31 is a sequence chart illustrating by way of example a communication processing sequence between the devices that make up the communication system 10 according to the first embodiment of the present technology. The communication processing sequence will be described below with reference FIGS. 10 and 11. Since FIGS. 10 and 11 are similar to FIGS. 8 and 9 except that some parts of FIGS. 8 and 9 are modified, the differences from FIGS. 8 and 9 will mainly be described below.

In FIG. 31, an example that is feasible in a wirelessly connected environment where both the source device 100 and the first sink device 200 are operable concurrently will be illustrated.

The communication processing sequence illustrated in FIG. 31 is a modification of the communication processing sequence illustrated in FIG. 28. Those items which are common to those illustrated in FIG. 28 will partly not be described below. Specifically, the processes (461 through 478, 480, 479, 481 through 485) illustrated in FIG. 31 correspond to the processes (411 through 428, 430, 434, 435 through 439) illustrated in FIG. 28.

In the example illustrated in FIG. 31, after a second link between the source device 100 and the first sink device 200 has been connected, a TearDown message is exchanged (486). After a new P2P link has been connected (Assoc./4-way Handshake/IP Assignment), a first link is cut off (486, 487). In this manner, the cutoff time due to a GO shuffle can be reduced.

Specifically, after a new connection has been made, a link that is no longer used is cut off by TearDown, so that the other link can be set up without stopping the media transmission that has been connected originally. Accordingly, the time during which the media transmission is stopped by a change from the media transmission between the source device 100 and the first sink device 200 to the multi-sink topology can be reduced.

In FIG. 31, since the source device 100 can have its state changed from a P2P client to an Autonomous GO, as illustrated in FIG. 28, the source device 100 can become an Autonomous GO without returning to a P2P device. This example is illustrated in FIG. 11 at "a."

After the first sink device 200 has its state changed from a P2P GO to a P2P device, the first sink device 200 once returns to the P2P device. The first sink device 200 is connected to a P2P GO changed from the role of the source device 100, and becomes a P2P client. The first sink device 200 is imagined as holding credentials because it has once already been connected to the P2P GO of the source device 100. If the first sink device 200 is holding credentials, then it can become a P2P client without going from a P2P GO to a P2P device. This example is illustrated in FIG. 11 at "a."

Usually, the first sink device 200 is unable to become a P2P client until the source device 100 becomes an Autonomous GO and a beacon from the source device 100 is detected. However, by receiving a GO shuffle Response (Action Frame) before the source device 100 sends a beacon, the first sink device 200 is able to switch from a P2P device to a P2P client without receiving a beacon. Accordingly, the switching process can be carried out faster by the time to wait for receiving a beacon.

Inasmuch as the source device 100 and the first sink device 200 are not associated by Association, the GO shuffle Response shall be exchanged in an Action frame that can be received without Association. At least one of items of information including information indicating in which channel the GO shuffle Response is to be received, SSID, channel information at the time when the Autonomous GO is launched, and usable channel information can be included in the message of the GO shuffle Response and sent.

According to these processes, information of the channel of SSID and Autonomous GO is transmitted in the above Action Frame, enabling exchanges to start without waiting for a beacon.

After the source device 100 has automatically been promoted from a P2P client to an Autonomous GO, it sends an Invitation or an Invoke to the second sink device 300.

An example in which credentials are not held is the same as the communication processing sequence illustrated in FIG. 29. An example in which credentials are held is the same as the communication processing sequence illustrated in FIG. 30.

A process of changing an IP address will be described below. According to the first embodiment of the present technology, it is possible to use another process of changing an IP address than the process of changing an IP address illustrated in FIG. 28. For example, the source device 100 (P2P client) and the first sink device 200 (P2P GO) can have IP Assignment and HDCP Assignment, respectively, processed parallel to each other. After those processes have been finished, they can be switched to the source device 100 (P2P GO) and the first sink device 200 (P2P client). This process of changing an IP address can be used.

In this manner, the source device 100 can newly perform media transmission between itself and the second sink device 300 while performing media transmission between itself and the first sink device 200 that plays the role of the P2P GO. In this case, before newly performing media transmission between itself and the second sink device 300, the controller 140 of the source device 100 carries out a control process for exchanging information to change roles in performing each media transmission to the first sink device 200 and the second sink device 300. This information represents, for example, information indicating whether the first sink device 200 permits the role of the P2P GO to be changed. Furthermore, the information is information which represents, for example, indicating whether the source device 100 and the first sink device 200 each have a concurrent function. Furthermore, the information is information represents, for example, indicating whether the source device 100 is compatible with a plurality of operations for performing wireless communication with a plurality of devices. At least one of these items of information may be exchanged. At least one of these items of information is exchanged while being included, for example, in a message exchanged between the source device 100 and the first sink device 200.

If the first sink device 200 permits the role of the P2P GO to be changed, the controller 140 of the source device 100 performs a control process for connecting to the second sink device 300 after the role of the P2P GO has been changed from the first sink device 200 to the source device 100.

It is assumed that the first sink device 200 permits the role of the P2P GO to be changed and both the source device 100 and the first sink device 200 have a concurrent function. In this case, the controller 140 of the source device 100 cuts off the source device 100 and the first sink device 200 after having changed the role of the P2P GO from the first sink device 200 to the source device 100. The controller 140 of the source device 100 then performs a connection process for performing each media transmission to the first sink device 200 and the second sink device 300.

It is assumed that in case the first sink device 200 permits the role of the P2P GO to be changed, the second sink device 300 does not hold connection setting information about a situation where the source device 100 is a P2P GO and the first sink device 200 is a P2P client. In this case, before changing the role of the P2P GO from the first sink device 200 to the source device 100, the controller 140 performs a control process for including information for acquiring the connection setting information in a message exchanged between the source device 100 and the first sink device 200.

The controller 140 of the source device 100 can perform a control process for including at least one of information about a DHCP and MAC address information during communication in a message exchanged between the source device 100 and the first sink device 200 and exchanging the message. Furthermore, the controller 140 of the source device 100 can perform a control process for including at least one of information for shifting IP addresses while an HDCP is in operation and information required for Persistent in the message to be thus exchanged and exchanging the message.

When the controller 140 of the source device 100 has changed the role of the P2P GO from the first sink device 200 to the source device 100, the controller 140 can provide the user with notification information that indicates the change of the role.

Example of Communication in which First Sink Device does not Permit GO to be Changed and Source Device is Incompatible with Plurality of Operations FIGS. 32 through 35 are sequence charts illustrating by way of example communication processing sequences between the devices that make up the communication system 10 according to the first embodiment of the present technology. The communication processing sequences will be described below with reference to FIGS. 12 and 13. Since FIGS. 10 and 11 are similar to FIGS. 8 and 9 except that some parts of FIGS. 8 and 9 are modified, the differences from FIGS. 8 and 9 will mainly be described below.

Figure 32:
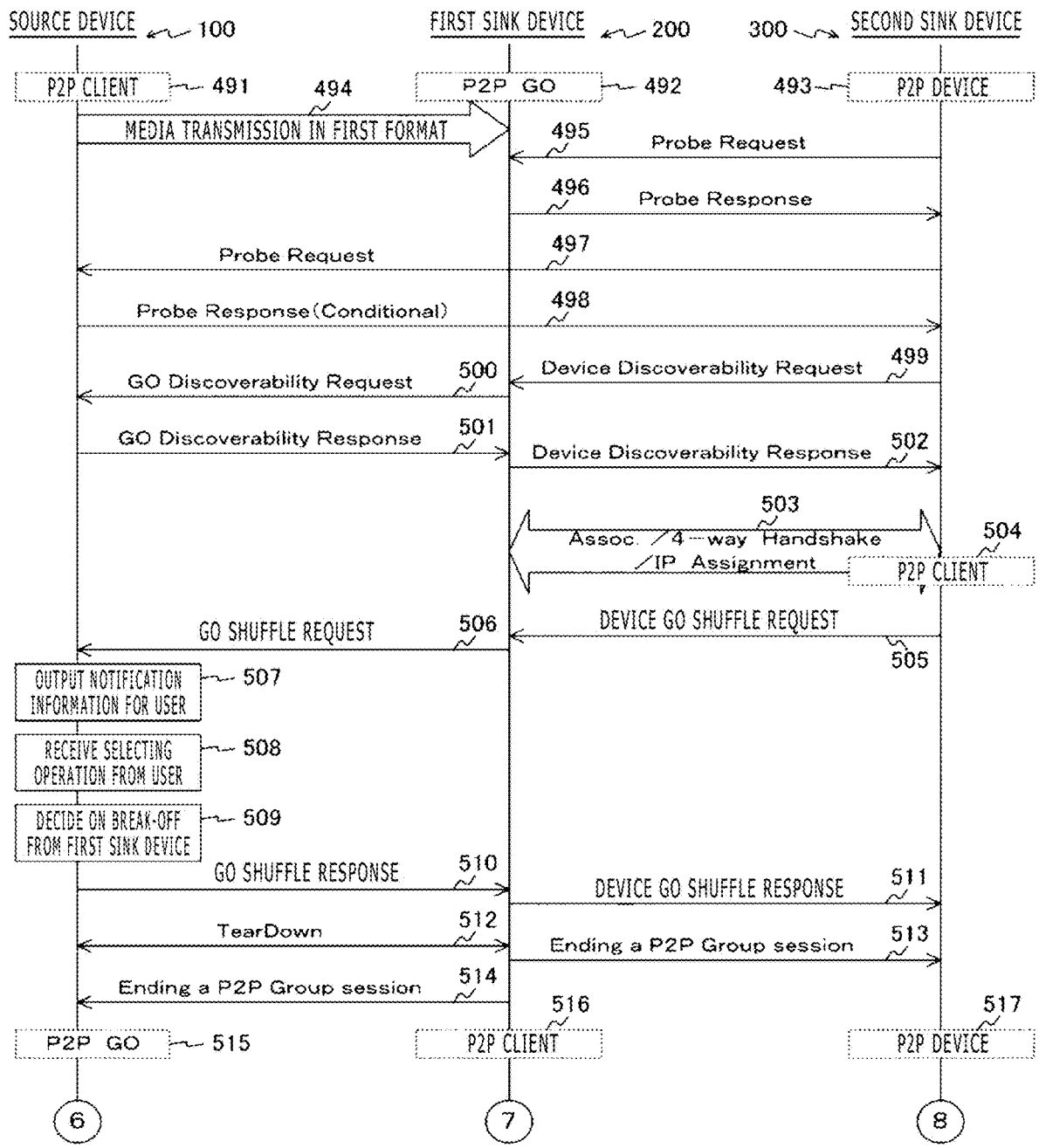
FIG. 32 is a sequence chart illustrating by way of example a communication processing sequence between the devices that make up the communication system 10 according to the first embodiment of the present technology.

The communication processing sequence illustrated in FIG. 32 is a modification of the communication processing sequence illustrated in FIG. 28. Those items which are common to those illustrated in FIG. 28 will partly not be described below. Specifically, the processes (491 through 506, 510 through 514) illustrated in FIG. 32 correspond to the processes (411 through 426, 427 through 431) illustrated in FIG. 28.

Figure 33:
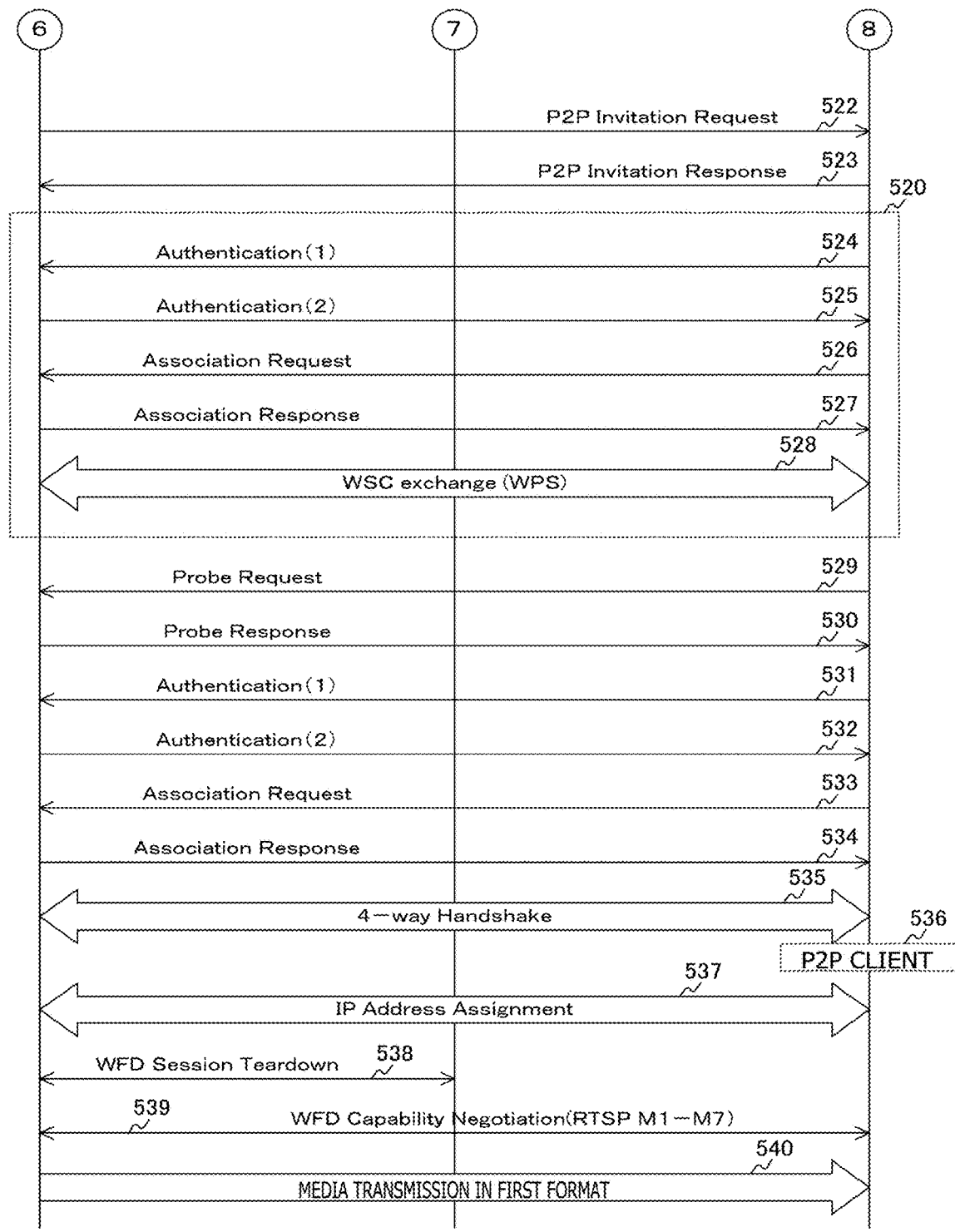
FIG. 33 is a sequence chart illustrating by way of example a communication processing sequence between the devices that make up the communication system 10 according to the first embodiment of the present technology.

The communication processing sequence illustrated in FIG. 33 is a modification of the communication processing sequence illustrated in FIG. 29. Those items which are common to those illustrated in FIG. 29 will partly not be described below. Specifically, the processes (522 through 537, 539, 540) illustrated in FIG. 33 correspond to the processes (443 through 458, 459, 460) illustrated in FIG. 29.

Figure 34:
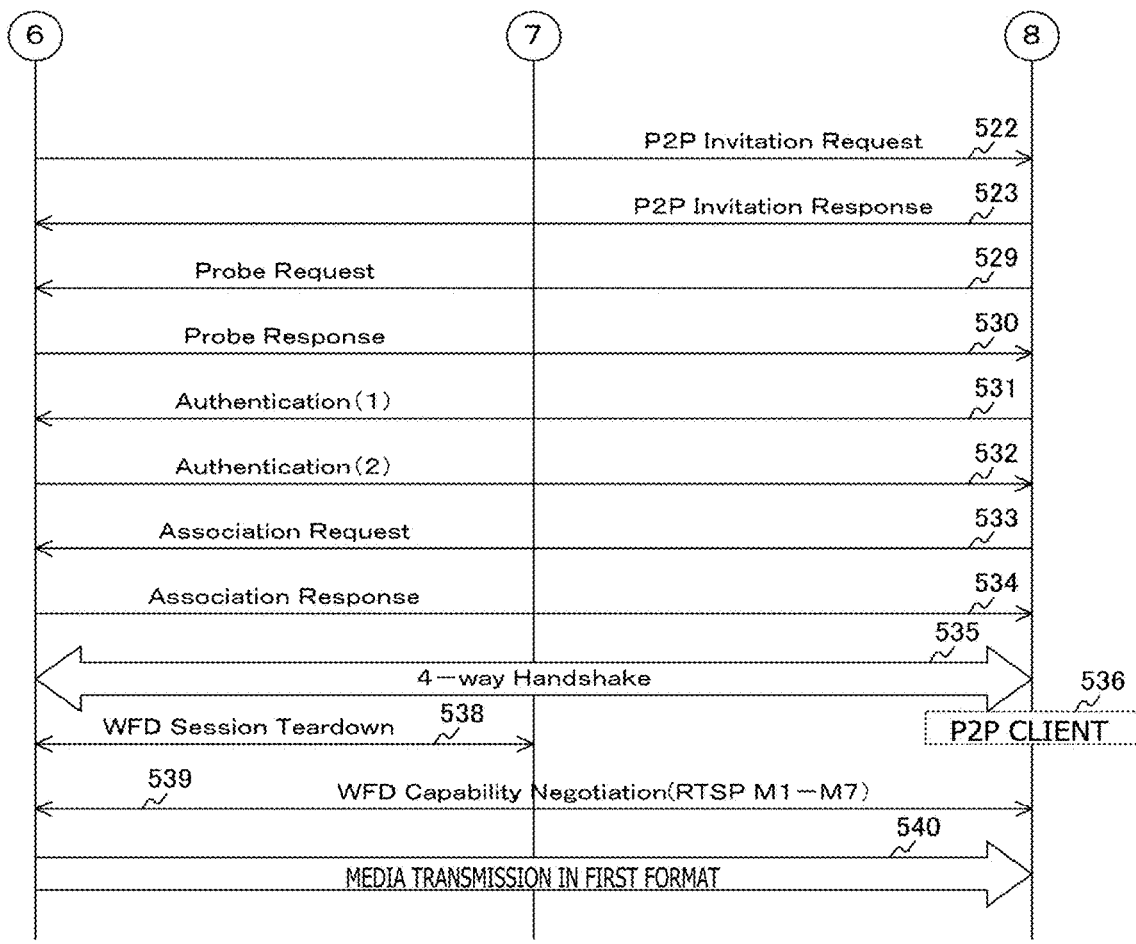
FIG. 34 is a sequence chart illustrating by way of example a communication processing sequence between the devices that make up the communication system 10 according to the first embodiment of the present technology.

The communication processing sequence illustrated in FIG. 34 is similar to the communication processing sequence illustrated in FIG. 33 except that some processes of the latter are omitted. Specifically, processes (524 through 528) in a dotted-line rectangle 520 illustrated in FIG. 33 and the IP Address Assignment (537) are omitted. Those items which are common to those illustrated in FIG. 33 are indicated by identical reference symbols, and will not be described below.

Figure 35:
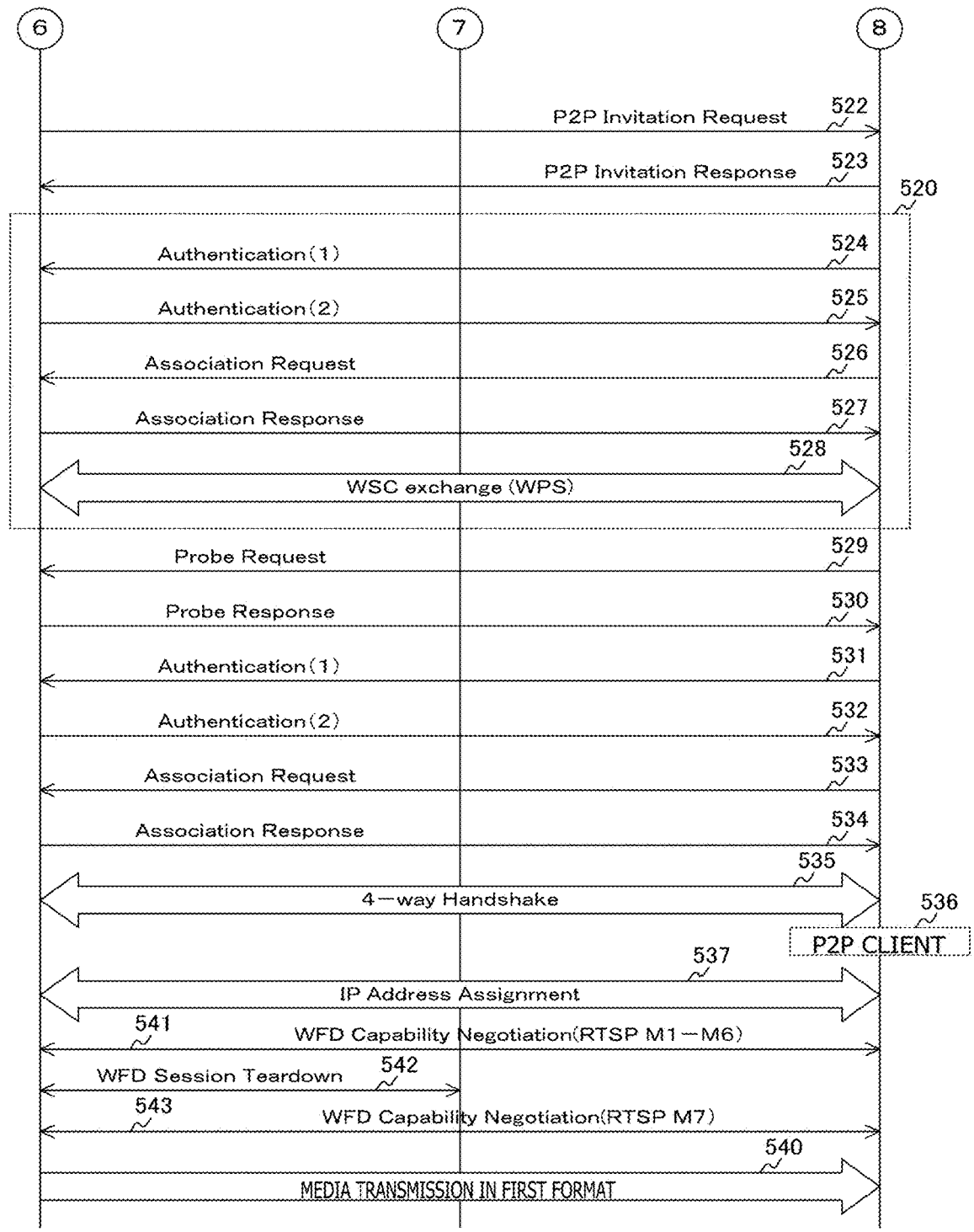
FIG. 35 is a sequence chart illustrating by way of example a communication processing sequence between the devices that make up the communication system 10 according to the first embodiment of the present technology.

The communication processing sequence illustrated in FIG. 35 is a modification of the communication processing sequence illustrated in FIG. 33. Those items which are common to those illustrated in FIG. 33 will partly not be described below. Specifically, the communication processing sequence illustrated in FIG. 35 is different from the communication processing sequence illustrated in FIG. 33 in that the processes (541 through 543) are carried out instead of the processes (538, 539).

FIG. 32 illustrates an example of communication in which the first sink device 200 does not permit changing from a P2P GO to a P2P client, and the source device 100 is incompatible with a plurality of operations.

The second sink device 300 inserts a message indicating that it desires to perform Miracast reception from the source device 100 into a Device GO shuffle Request, and sends the Device GO shuffle Request to the first sink device 200 (505).

Having received the Device GO shuffle Request, the first sink device 200 sends a GO shuffle Request to the source device 100 (506). The GO shuffle Request stores therein a bit indicating whether to permit the first sink device 200 to become a P2P client. In this example, the GO shuffle Request stores therein a bit indicating that the first sink device 200 is not permitted to become a P2P client. Exchanging the GO shuffle Request and a GO shuffle Response (506, 510) allows the source device 100 to be informed of the situation. The source device 100 can now determine changing of the operation mode of its own device. In this example, a bit has been described by way of example. The embodiment of the present technology is not limited to such a bit. The source device 100 may be notified of whether to permit the first sink device 200 to become a P2P client by an exchange of a message or other information, for example.

In the example illustrated in FIG. 32, it is assumed that a setting has been made such that the first sink device 200 recognizes that its own device is a sink device and a P2P GO and refuses to change from the P2P GO to a P2P client. Therefore, the first sink device 200 writes information for refusing to change from the P2P GO to a P2P client (information of the refusal of a GO shuffle) into the message of a GO shuffle Request. The first sink device 200 then sends the GO shuffle Request as a connection request from the second sink device 300 to the source device 100 (506).

Having received the GO shuffle Request, the source device 100 confirms the attributes of a connection scheme for its own device, the first sink device 200, and the second sink device 300, and grasps that only a P2P can connect to both devices. Consequently, the source device 100 decides that its own device is unable to connect to two P2P devices (the first sink device 200 and the second sink device 300). The source device 100 displays information that it is possible only to connect to either one of the two P2P devices (the first sink device 200 and the second sink device 300), and displays a screen image for selecting a device that the user desires to connect to on the display unit 190 (507). The screen image may be displayed as a pop-up on the display unit 190, for example. An example of the screen image is illustrated in FIG. 18. In this manner, the source device 100 can now seek a decision from the user.

As described above, if the source device 100 is incapable of a plurality of operations, it displays information indicating that it can only connect to either one sink device. In this case, for example, a display policy may be determined as indicated by (F1) and (F2) illustrated below. If necessary, such a display policy may be exchanged in advance using a Device GO shuffle Request and a Device GO shuffle Response, and a GO shuffle Request and a GO shuffle Response.

(F1) The first sink device 200 also indicates the pop-up displayed on the source device 100.

(F2) The first sink device 200 does not indicate the pop-up displayed on the source device 100.

FIG. 32 illustrates an example in which the second sink device 300 is selected as a device that the user desires to connect to. When the second sink device 300 is selected as a device that the user desires to connect to (508), the source device 100 decides to cut off the connection to the first sink device 200 (509). Then, the source device 100 sends a TearDown command to the first sink device 200 in order to cut off the connection to the first sink device 200 (512).

Furthermore, as illustrated in FIG. 33, after cutting off the first sink device 200, the source device 100 sends an Invitation Request to the second sink device 300 in order to connect to the second sink device 300 (522).

FIG. 32 thus illustrates an example in which the source device 100 does not perform a GO Negotiation after cutting off the first sink device 200. If the second sink device 300 becomes a P2P GO, then a GO Negotiation may be performed between the source device 100 and the second sink device 300, so that the second sink device 300 is connected as a P2P GO. However, the source device 100 can perform a preparatory process to become an Autonomous GO at the time it cuts off the first sink device 200.

Therefore, the source device 100 can start up more quickly than if it performs a GO Negotiation with the second sink device 300.

A connection request and a policy change request may be made in Request messages exchanged between the devices, and the results indicating whether the requests are accepted may be received in Response messages, thereby deciding a sink device to connect to. Alternatively, a sink device to connect to may be decided on the basis of other information (e.g., a numerical value such as an Intent Value or the like).

SSID for a device to be launched as a P2P GO may be stored in a message. It is possible to determine whether there are credentials and whether the device can be connected as a Persistent, on the basis of the SSID information.

FIG. 32 illustrates an example in which the source device 100 switches from a P2P client to an Autonomous GO. However, as with FIG. 28, the source device 100 may return to a P2P device.

FIG. 35 illustrates an example in which a processing command for Teardown sent from the source device 100 to the first sink device 200 is RTSP M6 sent from the source device 100 to the second sink device 300. However, the processing command for Teardown may be other than RTSP M6 insofar as it ranges from RTSP M4 to M6 sent from the source device 100 to the second sink device 300. For example, by transferring up to RTSP M4, the transfer format of the second sink device 300 can reliably be grasped. Furthermore, by transferring up to RTSP M6, a transmission setting can more reliably be made, for example.

It may thus be imagined that the first sink device 200 does not permit changing of the role of the P2P GO and the source device 100 is incompatible with a plurality of operations. In this case, the controller 140 of the source device 100 can provide the user with selection information (e.g., the selection screen images 390 and 393 illustrated in FIG. 18) for selecting a sink device for media transmission from the first sink device 200 and the second sink device 300.

Figure 36:
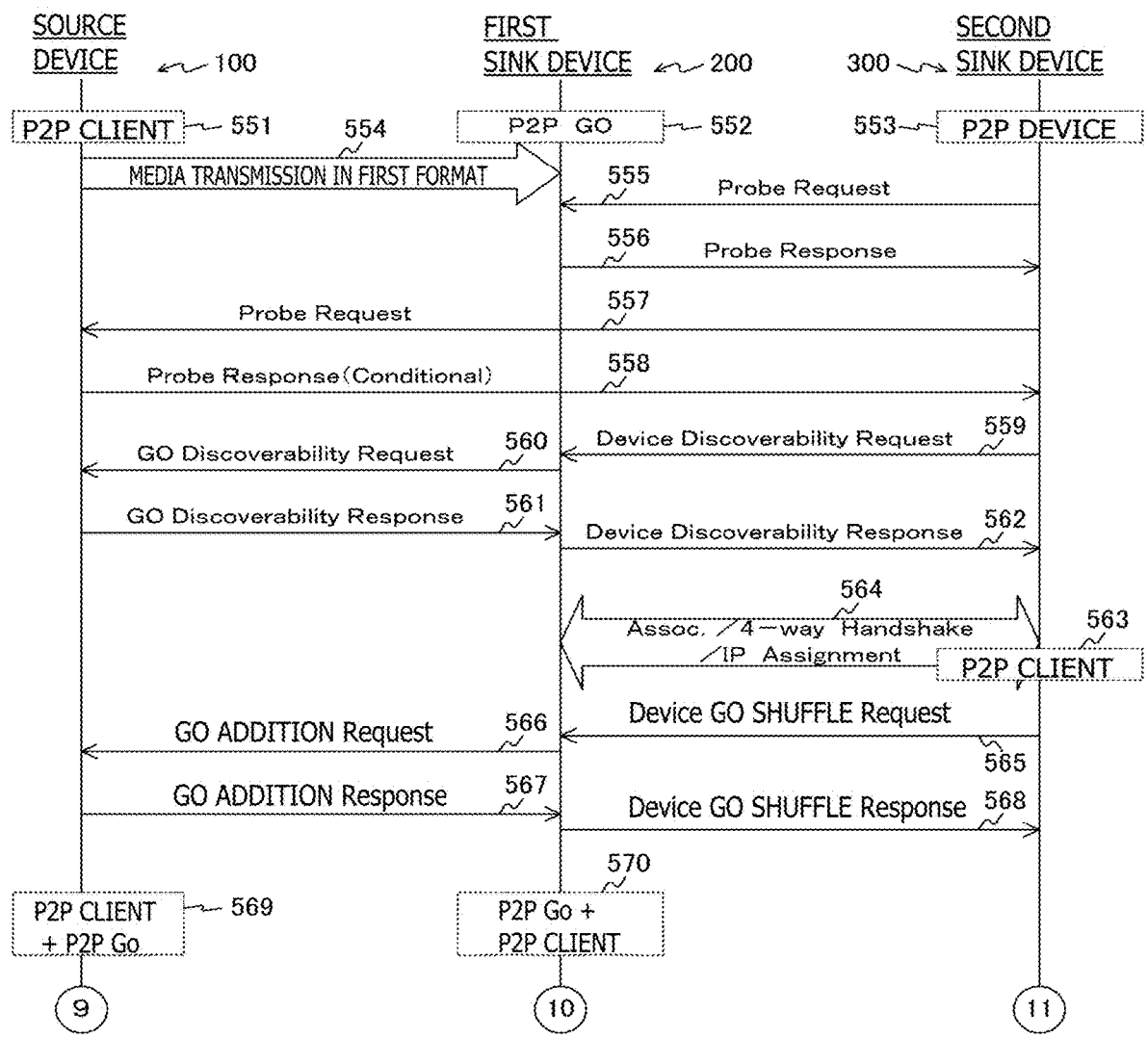
FIG. 36 is a sequence chart illustrating by way of example a communication processing sequence between the devices that make up the communication system 10 according to the first embodiment of the present technology.
Figure 37:
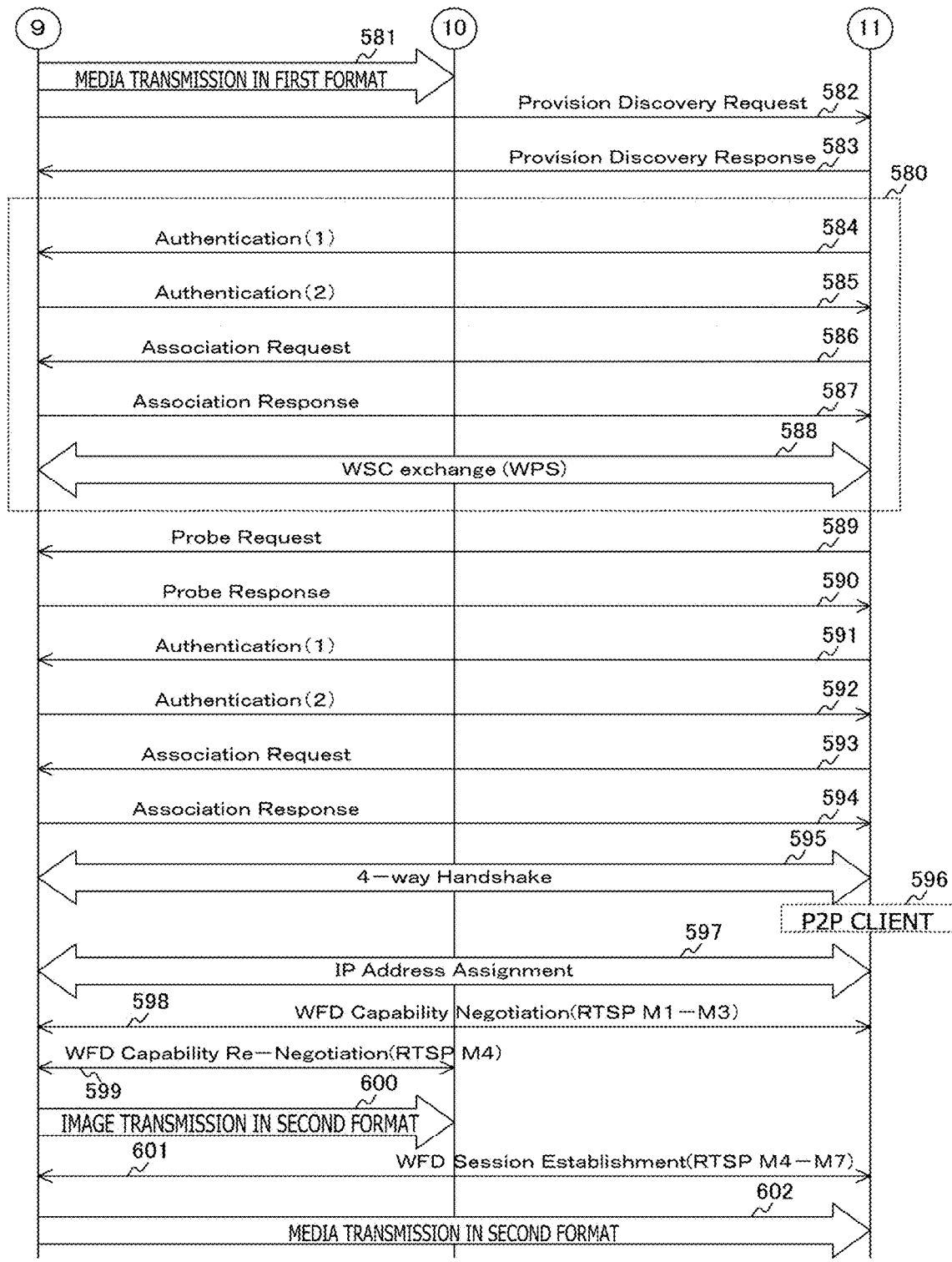
FIG. 37 is a sequence chart illustrating by way of example a communication processing sequence between the devices that make up the communication system 10 according to the first embodiment of the present technology.
Figure 38:
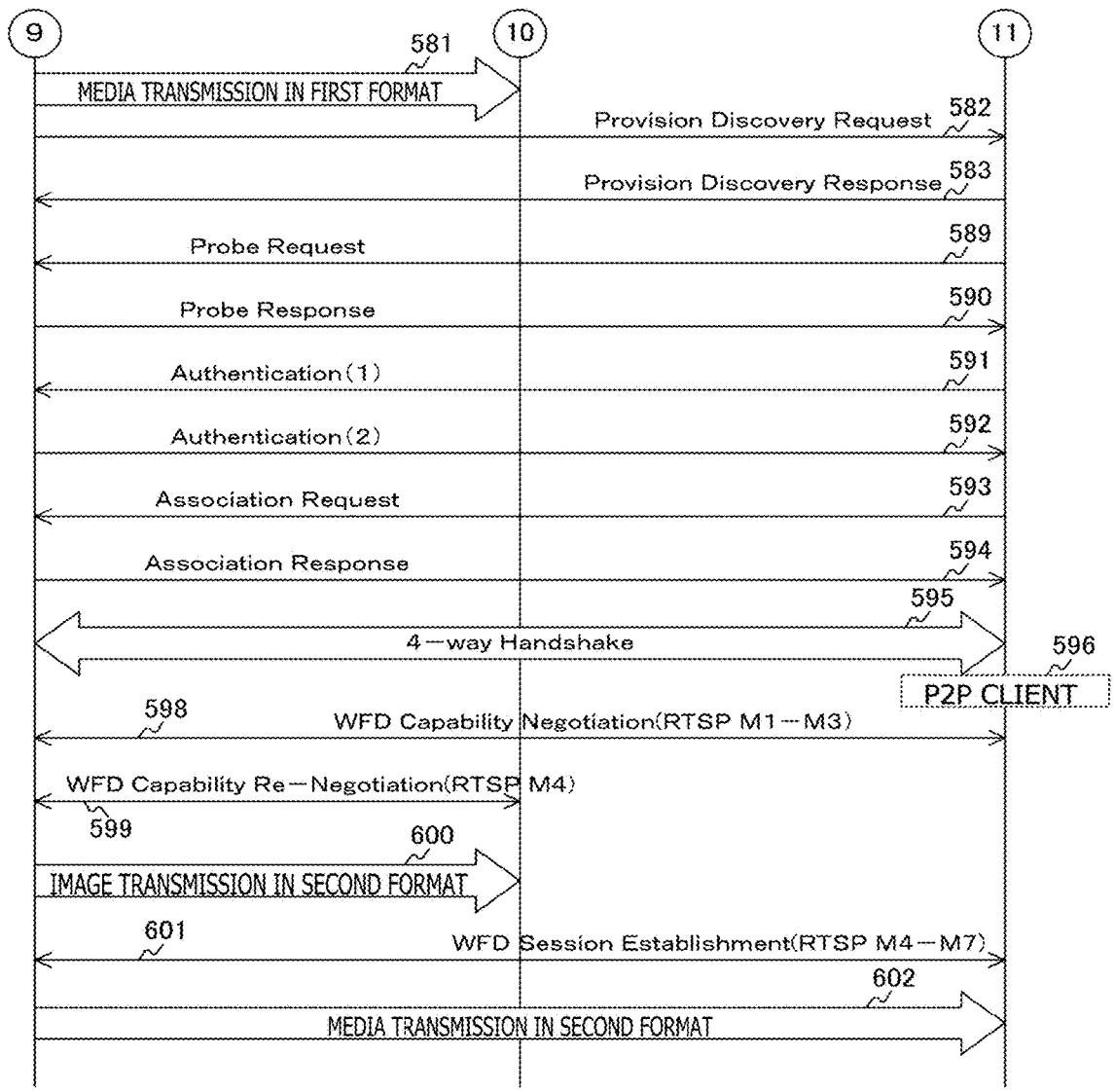
FIG. 38 is a sequence chart illustrating by way of example a communication processing sequence between the devices that make up the communication system 10 according to the first embodiment of the present technology.

Example of Communication in which First Sink Device does not Permit GO to be Changed and Source Device is Compatible with Plurality of Operations FIGS. 36 through 38 are sequence charts illustrating by way of example communication processing sequences between the devices that make up the communication system 10 according to the first embodiment of the present technology. The communication processing sequences will be described below with reference to FIGS. 14 and 15. Since FIGS. 14 and 15 are similar to FIGS. 8 and 9 except that some parts of FIGS. 8 and 9 are modified, the differences from FIGS. 8 and 9 will mainly be described below.

The communication processing sequence illustrated in FIG. 36 is a modification of the communication processing sequence illustrated in FIG. 28. Those items which are common to those illustrated in FIG. 28 will partly not be described below. Specifically, the processes (551 through 565, 568) illustrated in FIG. 36 correspond to the processes (411 through 425, 428) illustrated in FIG. 28.

The communication processing sequence illustrated in FIG. 37 is a modification of the communication processing sequence illustrated in FIG. 29. Those items which are common to those illustrated in FIG. 29 will partly not be described below. Specifically, the processes (581 through 597, 602) illustrated in FIG. 37 correspond to the processes (442 through 458, 460) illustrated in FIG. 29.

The communication processing sequence illustrated in FIG. 38 is similar to the communication processing sequence illustrated in FIG. 37 except that some processes of the latter are omitted. Specifically, processes (584 through 588) in a dotted-line rectangle 580 illustrated in FIG. 37 and the IP Address Assignment (597) are omitted. Those items which are common to those illustrated in FIG. 37 are indicated by identical reference symbols, and will not be described below.

FIG. 36 illustrates an example of communication in which the first sink device 200 does not permit changing from a P2P GO to a P2P client, and the source device 100 is compatible with a plurality of operations.

As with FIG. 28, the second sink device 300 sends a Device GO shuffle Request message to the first sink device 200 (565).

It is assumed here that the first sink device 200 grasps that its own device does not permit changing of a GO and the source device 100 is compatible with a plurality of operations. Therefore, when the first sink device 200 receives the Device GO shuffle Request message, it sends a GO addition Request to the source device 100 (566). In this case, the first sink device 200 includes (G1) and (G2) illustrated below in the GO addition Request and sends the GO addition Request (566).

(G1) A request for the second sink device 300 to connect to the source device 100

(G2) A request for the source device 100 to connect as a P2P GO to the second sink device 300

As with the example illustrated in FIG. 28, (B1) through (B3) described above may be sent as being included in the GO addition Request.

When the source device 100 has received the GO addition Request, the source device 100 can grasp (G1) and (G2) described above.

When the source device 100 grasps (G1) and (G2) described above, the source device 100 starts to prepare its own device to become a P2P GO with respect to the second sink device 300. The source device 100 returns information that the source device 100 has started preparing itself to become a P2P GO with respect to the second sink device 300 to the first sink device 200. Specifically, the source device 100 includes response information about the above request information ((G1) and (G2)) in a GO addition Response, and sends the GO addition response to the first sink device 200 (567).

In this example, the source device 100 is compatible with a plurality of operations. The source device 100 includes response information that it operates as a P2P client with respect to the first sink device 200 and operates as a P2P GO with respect to the second sink device 300 in the GO addition Response, and sends the GO addition Response to the first sink device 200 (567).

When the first sink device 200 receives the GO addition Response, with respect to the second sink device 300, the first sink device 200 includes response information with respect to the above request information ((A1) and (A2)) in a Device GO shuffle Response and sends the Device GO shuffle Response to the second sink device 300 (568).

Now, the source device 100 becomes a P2P client with respect to the first sink device 200 and becomes a P2P GO with respect to the second sink device 300 (569). The first sink device 200 becomes a P2P GO with respect to the source device 100 (570). An example of transition in this case is illustrated in FIG. 15 at "a" and "b."

An example in which the second sink device 300 does not hold credentials about a destination will be described below with reference to FIG. 37.

After an IP Address Assignment has been performed (597), a WFD Capability Negotiation (RTSP M1 to M3) is carried out between the source device 100 and the second sink device 300 (598). Then, a WFD Capability Re-Negotiation (RTSP M4) is carried out between the source device 100 and the first sink device 200 (599).

Then, a WFD Session Establishment (RTSP M4 to M7) is carried out between the source device 100 and the second sink device 300 (601).

In the example illustrated in FIG. 36, a process in which the second sink device 300 holds a plurality of connection profiles (Persistent information) with respect to Persistent will be described below.

For example, when the second sink device 300 is actively trying to connect to a P2P GO, the second sink device 300 is connected to the first sink device 200 if only the first sink device 200 is a P2P GO. However, providing the source device 100 is also launched as a P2P GO, a situation may be considered in which the second sink device 300 may hold both Persistent information for the source device 100 and Persistent information for the first sink device 200.

In such a situation, since there are two P2P GOs to deal with, the display unit 301 of the second sink device 300 displays not only SSID, but also information such as a source of media data and a destination of media data (e.g., the source device 100 and the first sink device 200), etc. The user can make a selection using the information thus displayed.

2. Second Embodiment

According to the first embodiment of the present technology, there has been illustrated an example in which a sink device to be newly joined makes a connection request in setting up a multi-sink topology. According to a second embodiment of the present technology, there will be illustrated an example in which a source device sends a connection request to a sink device to be newly joined in setting up a multi-sink topology.

The arrangements of information processing apparatus according to the second embodiment of the present technology are essentially the same as those of the source device 100, the first sink device 200, and the second sink device 300 illustrated in FIG. 1, etc. Those parts which are common to those according to the first embodiment of the present technology are indicated by identical reference symbols according to the first embodiment of the present technology, and will partly not be described below.

Example of Process of Sending Connection Request to New Sink Device

FIG. 39 is a diagram illustrating by way of example a selection screen image which is displayed on the source device 100 and the first sink device 200 according to the second embodiment of the present technology.

FIG. 39 illustrates at "a" a selection screen image 700 displayed on the display unit 190 of the source device 100. FIG. 39 illustrates at "b" a selection screen image 710 displayed on the display unit 251 of the first sink device 200. These selection screen images 700 and 710 may be displayed as a pop-up screen image, for example.

The selection screen image 700 is displayed after the operation button 372 in the notification screen image 371 illustrated in FIG. 19 at "a" is pressed, for example. The selection screen image 710 is displayed after the operation button 375 in the notification screen image 374 illustrated in FIG. 19 at "b" is pressed, for example.

For example, the user can send a connection request to a desired device by pressing a button of a desired device among operation buttons 701 and 702 in the selection screen image 700 and pressing a confirm button 703. Similarly, for example, the user can send a connection request to a desired device by pressing a button of a desired device among operation buttons 711 and 712 in the selection screen image 710 and pressing a confirm button 713.

Example of Operation of Source Device

Figure 40:
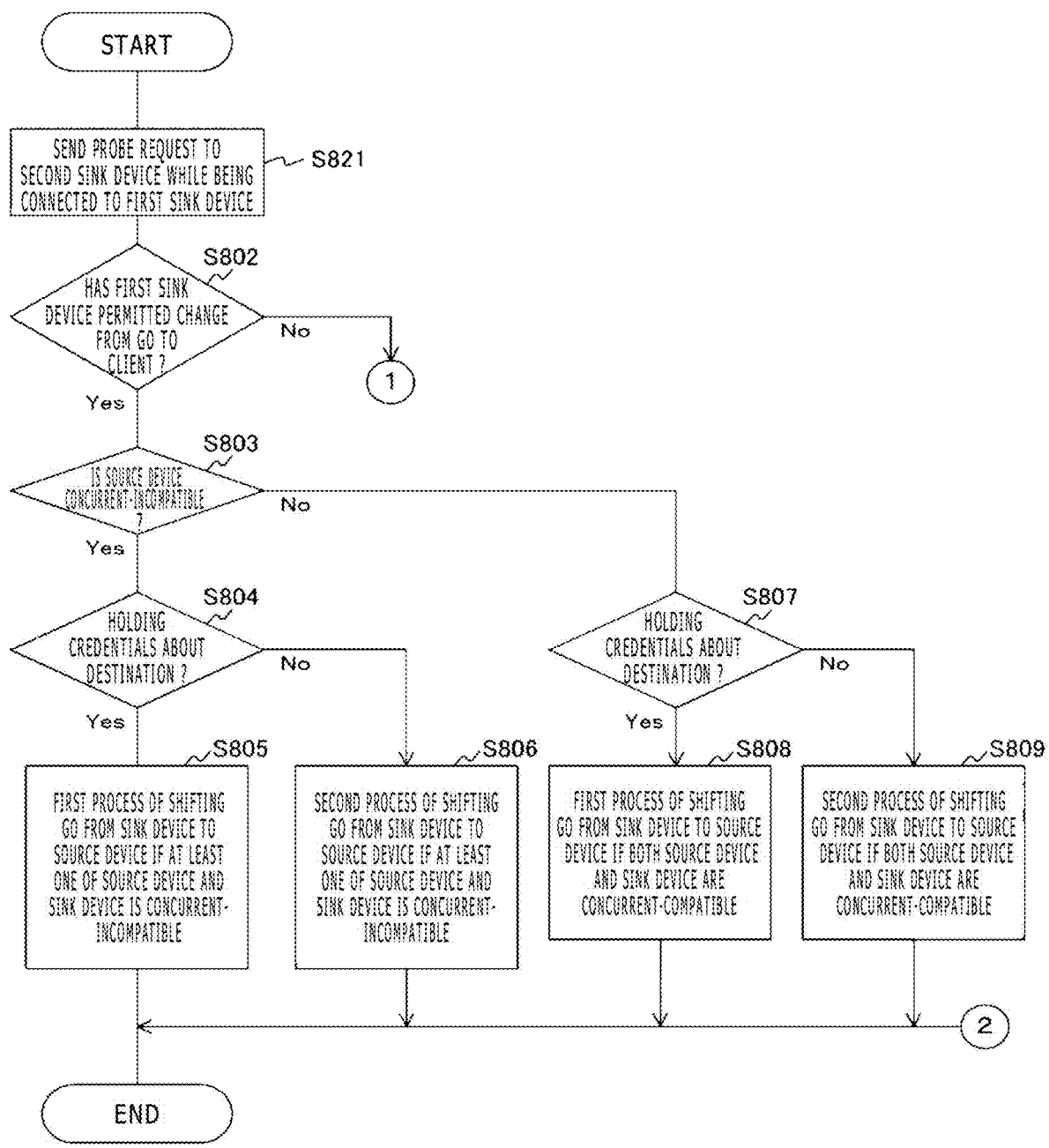
FIG. 40 is a flowchart illustrating by way of example a processing sequence of a multi-sink connection process carried out by the source device 100 according to the second embodiment of the present technology.

FIG. 40 is a flowchart illustrating by way of example a processing sequence of a multi-sink connection process carried out by the source device 100 according to the second embodiment of the present technology.

The processing sequence illustrated in FIG. 40 is a modification of the processing sequence illustrated in FIGS. 20 and 21, and is different from the processing sequence illustrated in FIGS. 20 and 21 in that the source device 100 sends a Probe Request to the second sink device 300. The other items are common to those illustrated in FIGS. 20 and 21 and denoted by identical reference symbols to those in FIGS. 20 and 21, and will not be described below.

Initially, the source device 100 sends a Probe Request to the second sink device 300 while being connected to the first sink device 200 (step S821). When the Probe Request is sent, the source device 100 begins to connect to the second sink device 300.

For example, the user can search for devices that are present around the source device 100 (devices that can wirelessly be connected to the source device 100) by displaying the notification screen image 371 illustrated in FIG. 19 at "a" and pressing the operation button 372 in the notification screen image 371. A screen image indicating the results of the search (e.g., the selection screen image 700 illustrated in FIG. 39 at "a") is now displayed on the display unit 190. The user performs a selecting operation to select a desired device in the displayed screen image, so that a Probe Request is sent to the desired device.

A first shifting process (step S805) for a P2P GO illustrated in FIG. 40 will be described in detail with reference to FIGS. 41 and 30.

A second shifting process (step S806) for a P2P GO illustrated in FIG. 40 will be described in detail with reference to FIGS. 41 and 29.

A first shifting process (step S808) for a P2P GO illustrated in FIG. 40 will be described in detail with reference to FIGS. 42 and 30.

A second shifting process (step S809) for a P2P GO illustrated in FIG. 40 will be described in detail with reference to FIGS. 42 and 29.

The first connection process (step S812) illustrated in FIG. 21 will be described in detail with reference to FIGS. 43 and 34.

The second connection process (step S813) illustrated in FIG. 21 will be described in detail with reference to FIGS. 43, 33, and 35.

The first connection process (step S815) illustrated in FIG. 21 will be described in detail with reference to FIGS. 44 and 38.

The second connection process (step S816) illustrated in FIG. 21 will be described in detail with reference to FIGS. 44 and 37.

Figure 41:
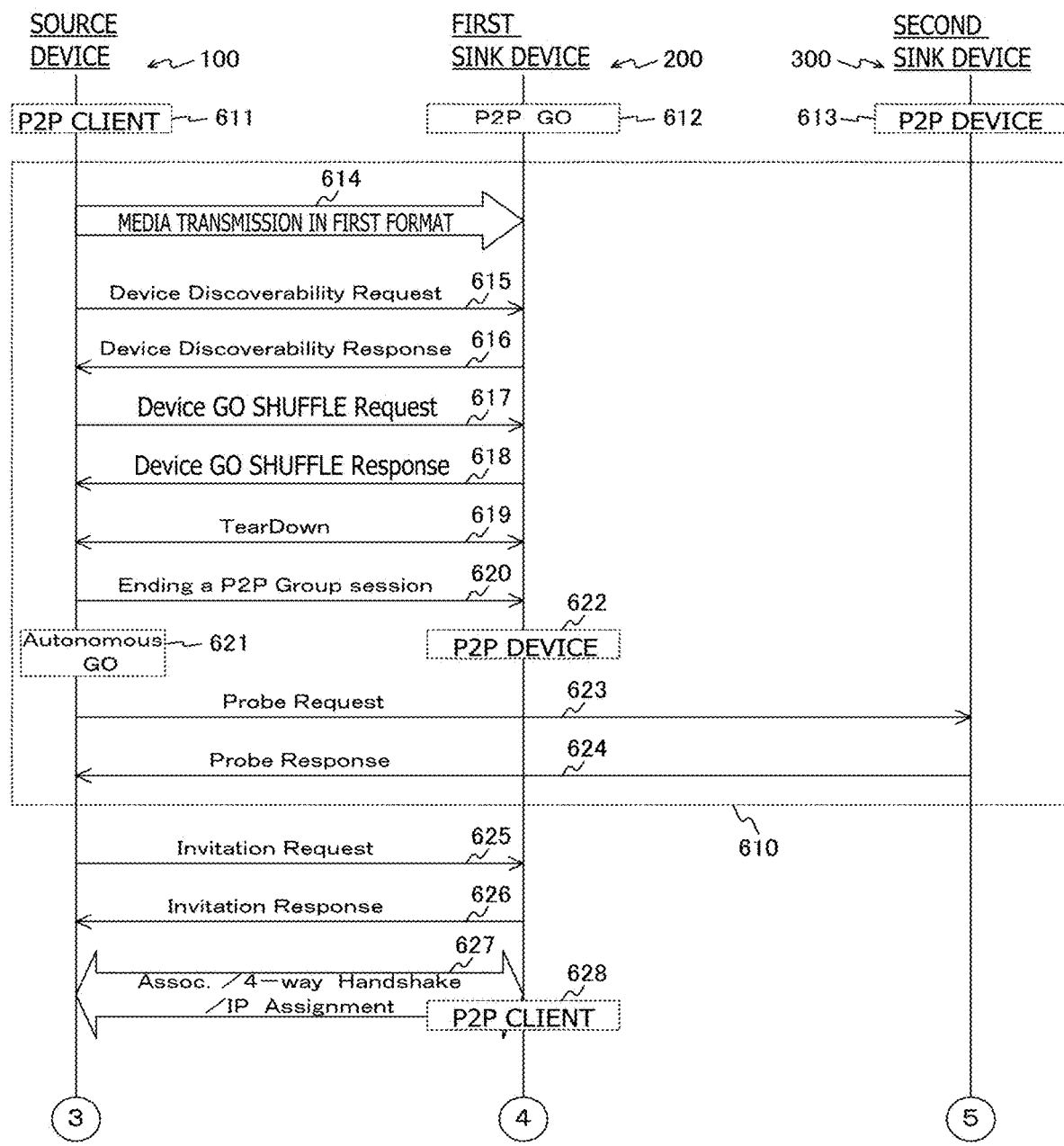
FIG. 41 is a sequence chart illustrating by way of example a communication processing sequence between the devices that make up a communication system 10 according to the second embodiment of the present technology.

Example of communication in which at least one of source device and sink device is concurrent-incompatible FIG. 41 is a sequence chart illustrating by way of example a communication processing sequence between the devices that make up a communication system 10 according to the second embodiment of the present technology.

FIG. 41 illustrates an example of operation in which the second sink device 300 joins a group in an environment where the source device 100 is connected to the first sink device 200 by way of P2P direct communication. Specifically, initially, there is illustrated an example of operation in which the source device 100 is a P2P client 611, the first sink device 200 is a P2P GO 612, and the second sink device 300 is a P2P device 613.

It is assumed that the first sink device 200 has already been connected as the P2P GO 612 to the source device 100 (the P2P client 611) and the source device 100 is performing media transmission to the first sink device 200 using a first format (614). A dotted-line rectangle 610 represents a period during which the source device 100 is performing media transmission to the first sink device 200.

AS described above, it is assumed that a user operation for connecting a new sink device has been performed on the source device 100. In this case, the source device 100 sends a Device Discoverability Request to the first sink device 200 (615). The first sink device 200 sends a Device Discoverability Response to the source device 100 (616). Information acquired by these exchanges (615, 616) may be imagined as having already been acquired by exchanges on a media transmission link. In such a situation, the exchanges (615, 616) may be omitted.

Then, the source device 100 sends a Device GO shuffle Request message to the first sink device 200 (617). In this case, the source device 100 includes following processes (H1) and (H2) in the Device GO shuffle Request message on the basis of the topology information grasped by the IE information described above, and sends the Device GO shuffle Request message (617).

(H1) A request for asking the first sink device 200 to shift the P2P GO to the source device 100 as the source device 100 is unable to connect to the second sink device 300 in the present relationship between the P2P GO and the P2P client (A2) A request for connecting to the second sink device 300

When the first sink device 200 receives the Device GO shuffle Request message, it includes response information about the request information ((H1) and (H2)) described above in a Device GO shuffle Response and sends the Device GO shuffle Response to the source device 100 (618). In this example, it is assumed that the first sink device 200 has agreed with changing of the roles of the P2P GO and the P2P client.

When the source device 100 grasps that the first sink device 200 has agreed with changing of the roles of the P2P GO and the P2P client, the source device 100 cuts off (TearDown command) the communication with the first sink device 200 (619). The source device 100 and the first sink device 200 are now cut off from each other (Ending a P2P Group session process) (620). Then, source device 100 becomes an Autonomous GO (621), and the first sink device 200 becomes a P2P device (P2P Device) (622).

Then, the source device 100 sends a Probe Request to the second sink device 300 (623). When the second sink device 300 receives the Probe Request, it sends a Probe Response to the source device 100 (624).

Then, the source device 100 sends an Invitation Request to the first sink device 200 (625). When the first sink device 200 receives the Invitation Request, it sends an Invitation Response to the source device 100 (626).

Then, the source device 100 performs an Assoc./4-way Handshake/IP Assignment process between itself and the first sink device 200 (627). The first sink device 200 thus becomes a P2P client (628).

Figure 42:
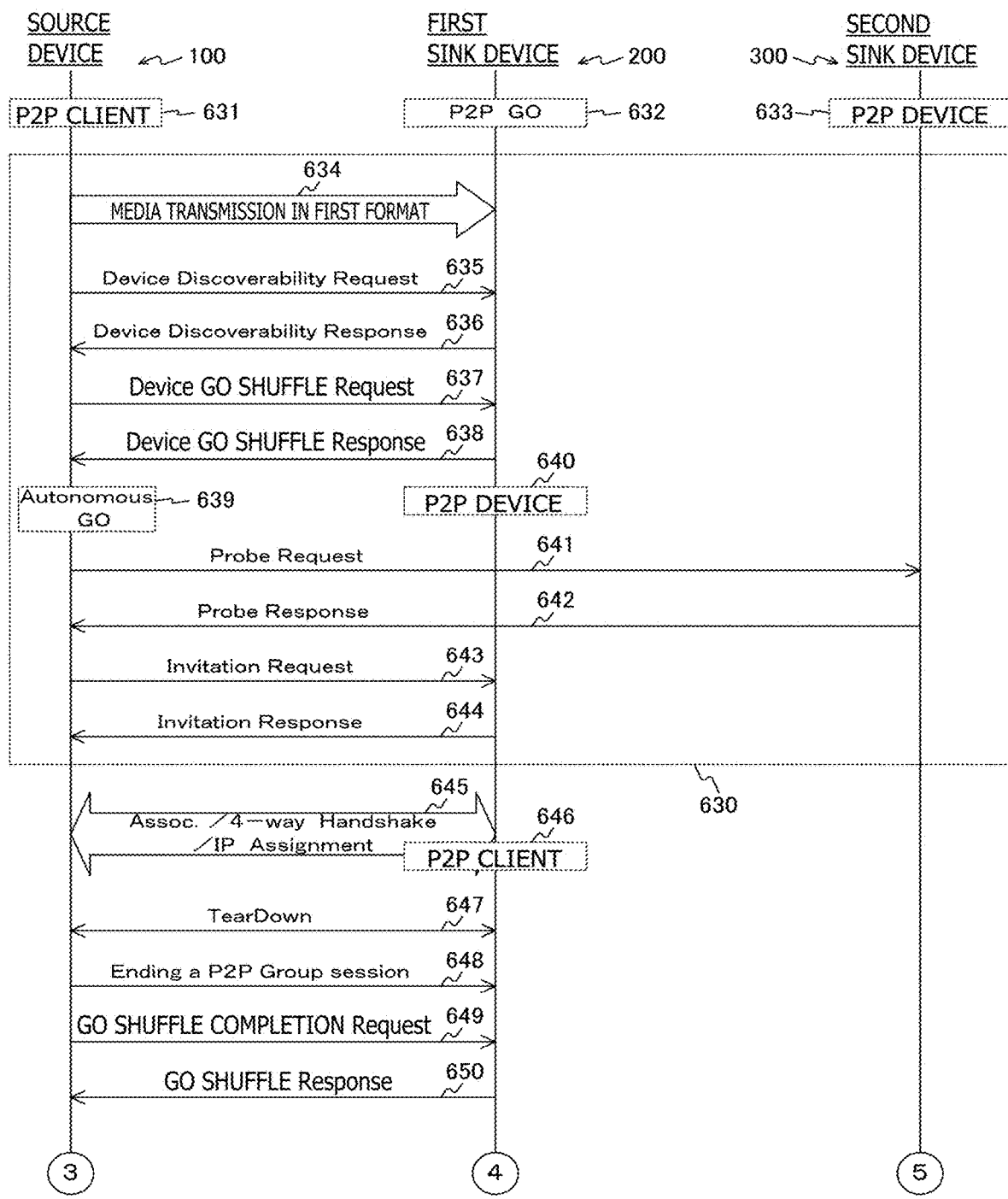
FIG. 42 is a sequence chart illustrating by way of example a communication processing sequence between the devices that make up the communication system 10 according to the second embodiment of the present technology.

Example of Communication in which Both Source Device and Sink Device are Concurrent-Compatible FIG. 42 is a sequence chart illustrating by way of example a communication processing sequence between the devices that make up the communication system 10 according to the second embodiment of the present technology.

The communication processing sequence illustrated in FIG. 42 is a modification of the communication processing sequence illustrated in FIG. 41. Since both the source device 100 and the first sink device 200 are concurrent-compatible, the timing to cut off the communication between the source device 100 and the first sink device 200 is different from that illustrated in FIG. 41 (647, 648). The communication processing sequence illustrated in FIG. 42 is also different from the communication processing sequence illustrated in FIG. 41 in that a GO shuffle completion Request and a GO shuffle Response are exchanged after the source device 100 and the first sink device 200 are cut off from each other (649, 650). Other details are common to those illustrated in FIG. 41 and will not be described below.

Figure 43:
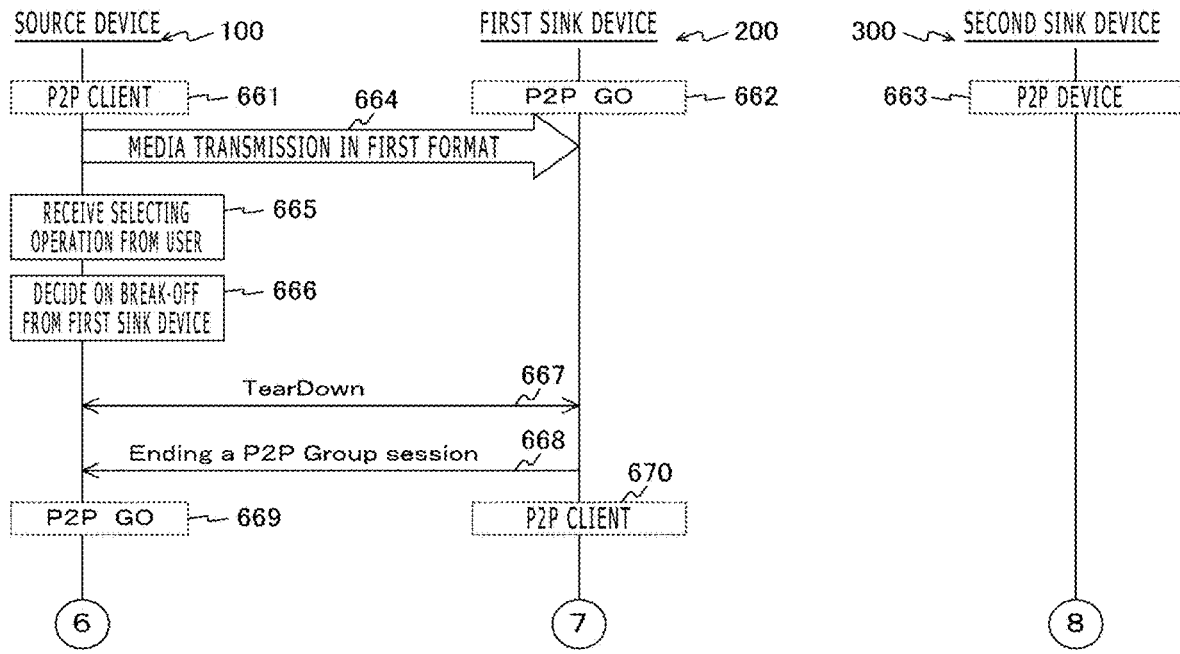
FIG. 43 is a sequence chart illustrating by way of example a communication processing sequence between the devices that make up the communication system 10 according to the second embodiment of the present technology.

Example of Communication in which First Sink Device does not Permit GO to be Changed and Source Device is Incompatible with Plurality of Operations FIG. 43 is a sequence chart illustrating by way of example a communication processing sequence between the devices that make up the communication system 10 according to the second embodiment of the present technology.

The communication processing sequence illustrated in FIG. 43 is a modification of the communication processing sequence illustrated in FIG. 32. Those items which are common to those illustrated in FIG. 32 will not be described below. Specifically, the processes (661 through 670) illustrated in FIG. 43 correspond to the processes (491 through 494, 508, 509, 512, 514 through 516) illustrated in FIG. 32.

Figure 44:
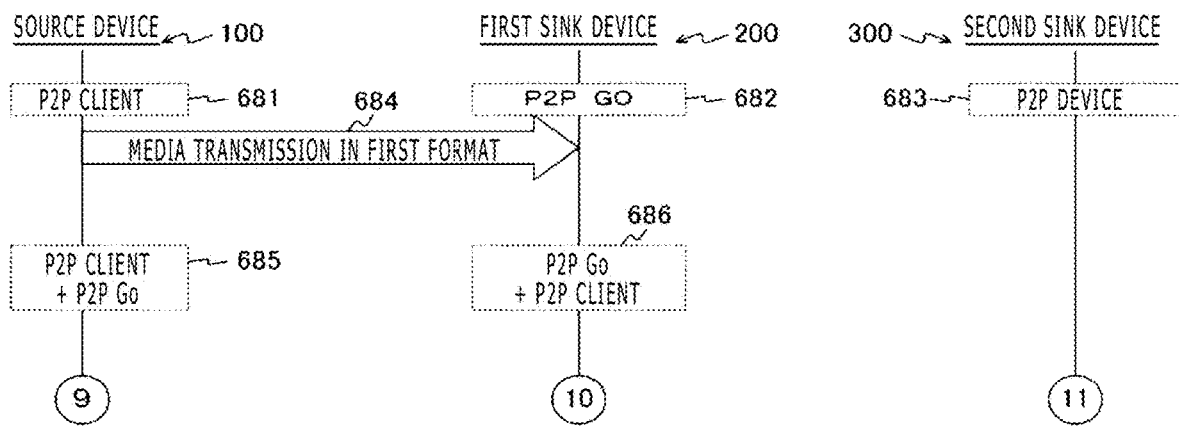
FIG. 44 is a sequence chart illustrating by way of example a communication processing sequence between the devices that make up the communication system 10 according to the second embodiment of the present technology.

Example of communication in which first sink device does not permit GO to be changed and source device is compatible with plurality of operations FIG. 44 is a sequence chart illustrating by way of example a communication processing sequence between the devices that make up the communication system 10 according to the second embodiment of the present technology.

The communication processing sequence illustrated in FIG. 44 is a modification of the communication processing sequence illustrated in FIG. 36. Those items which are common to those illustrated in FIG. 36 will not be described below. Specifically, the processes (681 through 686) illustrated in FIG. 44 correspond to the processes (551 through 554, 569, 570) illustrated in FIG. 36.

In the embodiments of the present technology, two sink devices are illustrated by way of example. However, there is no limit on the number of sink devices. Instead of or together with a notification screen image (e.g., the notification screen images illustrated in FIGS. 16 through 19) displayed to give a notification to the user, a message to that effect may be output as a sound. Furthermore, the user may be notified using a notification by way of vibrations or other notifying means.

The device role manager 320 (illustrated in FIG. 5) for managing the roles of a plurality of devices that make up a multi-sink may be provided in at least one of the devices that make up the multi-sink on the basis of the above-described information exchanged between the devices. Alternatively, the device role manager 320 (illustrated in FIG. 5) may be provided in an external device other than the devices that make up the multi-sink. A device for managing these devices and a device for storing management information thereof may be different from each other.

A transmission system for a multi-sink topology where one source device sends data to a plurality of sink devices often uses a multiple unicast transmission scheme for sending unicast packets to each of the sink devices or a multi-cast transmission scheme for transmitting data to all the sink devices. In a sequence for transmitting data in those transmission schemes, the source device (e.g., a server) performs a service for grasping the reception abilities of the respective sink devices and making settings in a way led by the source device. For example, as typified by MPEG-dynamic adaptive streaming over HTTP (DASH), an environment in which the sink devices request qualities (image quality and sound quality) and a transmission rate from the source device and the source device transmits data at the requested qualities (image quality and sound quality) and transmission rate is often established.

According to the protocol of a lower-order layer, since it is highly possible for wireless communication in particular to suffer a high error rate, the possibility that multi-cast transmission will be used is higher as more sink devices are involved. As the multi-cast communication described above is a best-effort service, it is greatly affected by the wireless radio-wave propagation environment, and may not receive data depending on the radio-wave propagation environment. IEEE802.11aa standards have been prescribed for efficient wireless transmission. However, it is expected that P2P direct connections typified by Wi-Fi CERTIFIED Miracast will begin from now on to be compatible with a plurality of sink devices (hereinafter referred to as multi-sink topology).

Only a P2P GO can be connected to a plurality of P2P client devices. Therefore, if a P2P GO is a sink device in a multi-sink topology, for example, when a newly joining device tries to connect to a group, it can be connected only to a sink device. In this situation, the topology needs to be changed to a topology that allows the newly joining device to be connected to a source device for direct media transmission. According to the embodiments of the present technology, a multi-sink topology can effectively be set up by exchanging GO shuffle messages.

Providing all connected devices are compatible with a concurrent function, a new P2P link can easily be established. It is important to specify how messages should be exchanged for efficiency in shuffling a P2P GO.

When the link between a P2P GO and a P2P client is cut off during a process of shuffling a GO, if an IP Assignment is normally carried out after a TearDown command has been transmitted, then the HDCP process needs time. Moreover, the HDCP process performed after an IP has been set also needs time. If a GO shuffle is performed during Miracast communication, then it is necessary to shorten a communication shutdown state.

According to the embodiments of the present technology, if a sink device is a P2P GO and already connected devices are compatible with a concurrent mode in a multi-sink topology, then when a newly joining device is to connect to a group, the time required to cut off the present link due to a topology change including the newly joining device can be reduced.

Connection switching between devices, even if they do not hold credentials for such connection switching, can be shortened. The downtime can further be reduced by appropriately dealing with a DHCP shift, an HDCP shift, and a connection profile (Persistent information).

If a sink device is a P2P GO, then the sink device is in an environment where it can release the authority of the P2P GO and can change its state from the P2P GO to a P2P client. Since the P2P GO has a DHCP server function, it affects another network environment as it performs an IP Assignment, etc. in the other network environment. Therefore, if a sink device is a P2P GO, then it is important to appropriately realize exchanges in an environment where the sink device is unable to transfer the authority of the P2P GO.

As described above, if a sink device is a P2P GO, it affects another network environment and the P2P GO cannot be shifted. According to the embodiments of the present technology, intended media transmission can appropriately be carried out by providing a user interface that is capable of providing services that the user desires.

In a situation where a newly joining sink device holds a plurality of connection profiles (Persistent information), it can appropriately deal with a source device even if the source device is not a P2P GO. In a situation where a source device and a sink device being connected have exchanged credentials and a newly joining sink device does not hold credentials for the source device, the connection time can be shortened.

As described above, the embodiments of the present technology are able to realize a multi-sink-compatible wireless communication system. In other words, the embodiments of the present technology are able to set up a multi-sink topology. If each of devices being connected is compatible with a concurrent mode, the time required to cut off the present link due to a topology change including a newly joining device can be reduced. The downtime can further be reduced by appropriately dealing with a DHCP shift, an HDCP shift, and a connection profile (Persistent information). In other words, information processing apparatus (source devices and sink devices) can appropriately be connected wirelessly.

The source device 100, the first sink device 200, and the second sink device 300 according to the embodiments of the present technology can be applied to devices used in various fields. For example, they can be applied to devices used in automobiles (e.g., car navigation apparatus or smartphones). For example, the source device 100 can be installed in a front seat of an automobile, and the first sink device 200 and the second sink device 300 can be installed in a rear seat of the automobile.

The user on the rear seat may operate the wireless communication system to enjoy images and sounds from the source device 100 on the first sink device 200 or the second sink device 300. The present technology is also applicable to an education field. For example, the tutor in a classroom uses the source device 100, whereas the students use the first sink device 200 or the second sink device 300. Each time a student who has come to listen to a lecture enters the classroom, the student connects a sink device owned thereby to the source device 100 to use images and sounds from the source device 100. In this manner, the present technology can be used to improve the academic ability of each student.

3. Application Examples

The technology in the present disclosure is applicable to various products. For example, the source device (information processing apparatus) 100, the first sink device (information processing apparatus) 200, and the second sink device (information processing apparatus) 300 may be realized as mobile terminals such as smartphones, tablet personal computers (PCs), laptop PCs, portable game terminals, or digital cameras, fixed terminals such as television receivers, printers, digital scanners, or network storages, or in-vehicle terminals such as navigation apparatus. Furthermore, the source device (information processing apparatus) 100, the first sink device (information processing apparatus) 200, and the second sink device (information processing apparatus) 300 may be realized as terminals for machine to machine (M2M) communication (also referred to as machine type communication (MTC) terminals) such as smart meters, vending machines, remote monitoring apparatus, or point of sale (POS) terminals. Moreover, the source device (information processing apparatus) 100, the first sink device (information processing apparatus) 200, and the second sink device (information processing apparatus) 300 may be wireless communication modules (e.g., integrated circuit modules each including a single die) mounted on the above terminals.

3-1. First Application Example

Figure 45:
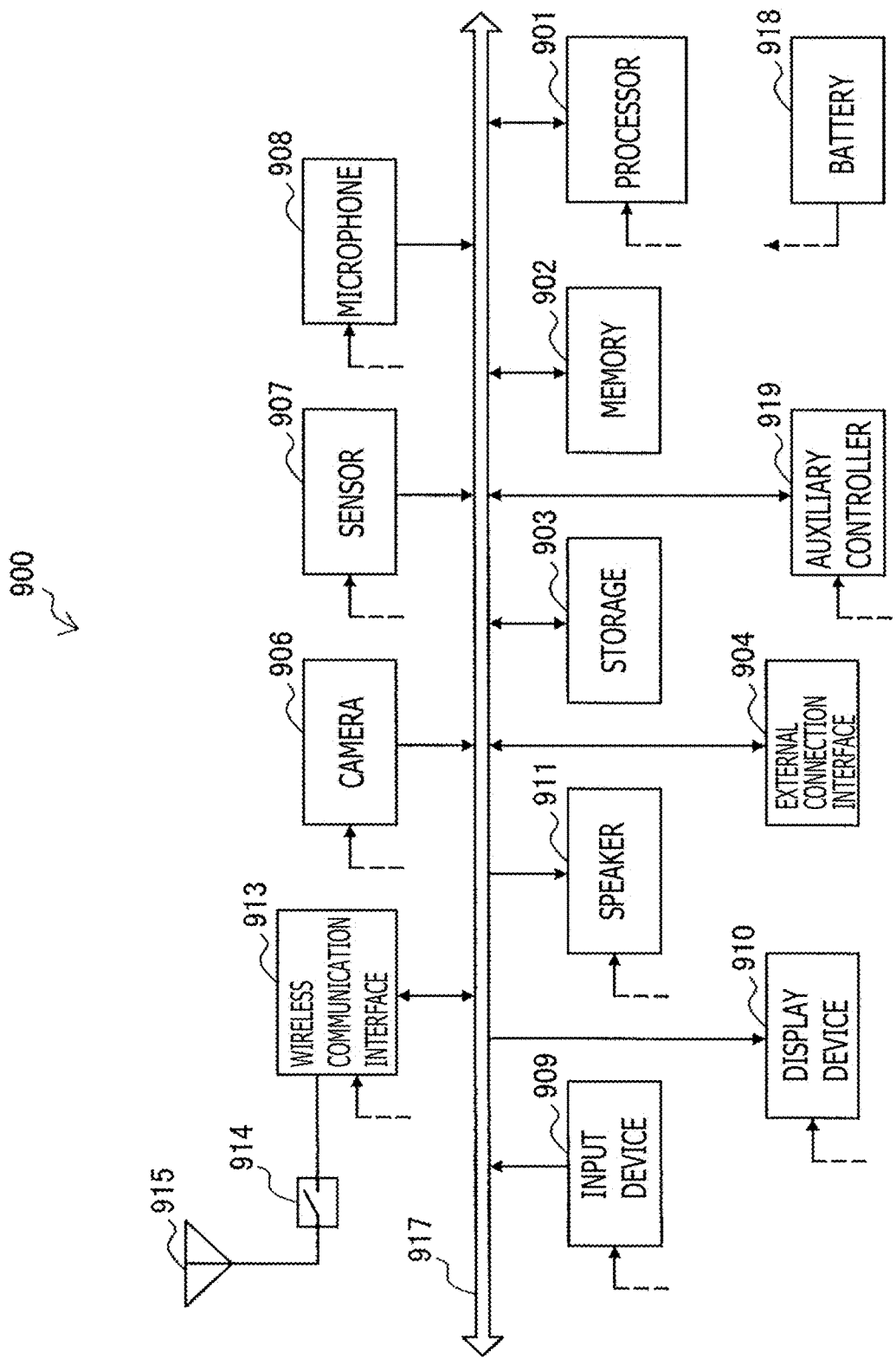
FIG. 45 is a block diagram illustrating by way of example a general arrangement of a smartphone.

FIG. 45 is a block diagram illustrating by way of example a general arrangement of a smartphone 900 to which a technique according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may include, for example, a central processing unit (CPU) or a system on chip (SoC), and controls the functions of an application layer and other layers of the smartphone 900. The memory 902 includes a random access memory (RAM) and a read only memory (ROM), and stores programs executed by the processor 901 and data. The storage 903 may include a storage medium such as a semiconductor memory or a hard disk. The external connection interface 904 refers to an interface for connecting an external device such as a memory card or a universal serial bus (USB) device to the smartphone 900.

The camera 906 has an image-capturing device such, for example, as a charge coupled device (CCD) or a complementary metal oxide semiconductor (CMOS), and generates captured images. The sensor 907 may include a group of sensors such as a positioning sensor, a gyro sensor, a geomagnetic sensor, and an acceleration sensor, for example. The microphone 908 converts sounds input to the smartphone 900 into a sound signal. The input device 909 includes, for example, a touch sensor for detecting touches on the screen of the display device 910, a keypad, a keyboard, buttons, or switches, and receives operations from the user or information inputs. The display device 910 has a screen provided by a liquid crystal display (LCD) or an organic light-emitting diode (OLED), and displays output images from the smartphone 900. The speaker 911 converts a sound signal output from the smartphone 900 into sounds.

The wireless communication interface 913 supports one or more of wireless LAN standards such as IEEE802.11a, 11b, 11g, 11n, 11ac, and 11ad, and performs wireless communication. In an infrastructure mode, the wireless communication interface 913 can communicate with other devices through a wireless LAN access point. In a direct communication mode such as an ad hoc mode or Wi-Fi Direct or the like, the wireless communication interface 913 can communicate directly with other devices. According to Wi-Fi Direct, unlike the ad hoc mode, one of two terminals operates as an access point, but communication takes place directly between the terminals. The wireless communication interface 913 may typically include a baseband processor, a radio frequency (RF) circuit, and a power amplifier, etc. The wireless communication interface 913 may include a one-chip module having an integrated assembly of a memory storing a communication control program, a processor for executing the communication control program, and related circuits. The wireless communication interface 913 may support, in addition to the wireless LAN system, other types of wireless communication systems including a short-distance wireless communication system, a proximity wireless communication system, and a cellular communication system. The antenna switch 914 switches between a plurality of circuits (e.g., circuits for different wireless communication systems) included in the wireless communication interface 913 for connection to the antenna 915. The antenna 915 has a single element or a plurality of antenna elements (e.g., a plurality of antenna elements of a multi-input multi-output (MIMO) antenna), and is used to send and receive wireless signals via the wireless communication interface 913. The antenna 915 also has a wireless communication interface function to connect to a public link such as IEEE802.16, 3GPP specifications (e.g., W-CDMA, GSM (trademark), WiMAX, WiMAX2, LTE, or LTE-A), or the like, and can communicate with a public link.

The smartphone 900 is not limited to the example illustrated in FIG. 45, but may have a plurality of antennas (e.g., an antenna for a wireless LAN, an antenna a proximity wireless communication system, and an antenna for public link communication). In such a case, the antenna switch 914 may be omitted from the arrangement of the smartphone 900.

The bus 917 interconnects the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies electric power to the blocks of the smartphone 900 illustrated in FIG. 45 through feed lines partly illustrated by the broken lines in FIG. 45.

The auxiliary controller 919 performs a required minimum of the functions of the smartphone 900 in a sleep mode, for example.

In the smartphone 900 illustrated in FIG. 45, the controller 140 described with reference to FIG. 3 and the controller 270 described with reference to FIG. 4 may be implemented by the wireless communication interface 913. At least part of the functions of these controllers may be implemented by the processor 901 or the auxiliary controller 919.

The smartphone 900 may operate as a wireless access point (software AP) when the processor 901 performs an access point function at an application level. The wireless communication interface 913 may have a wireless access point function.

3-2. Second Application Example

Figure 46:
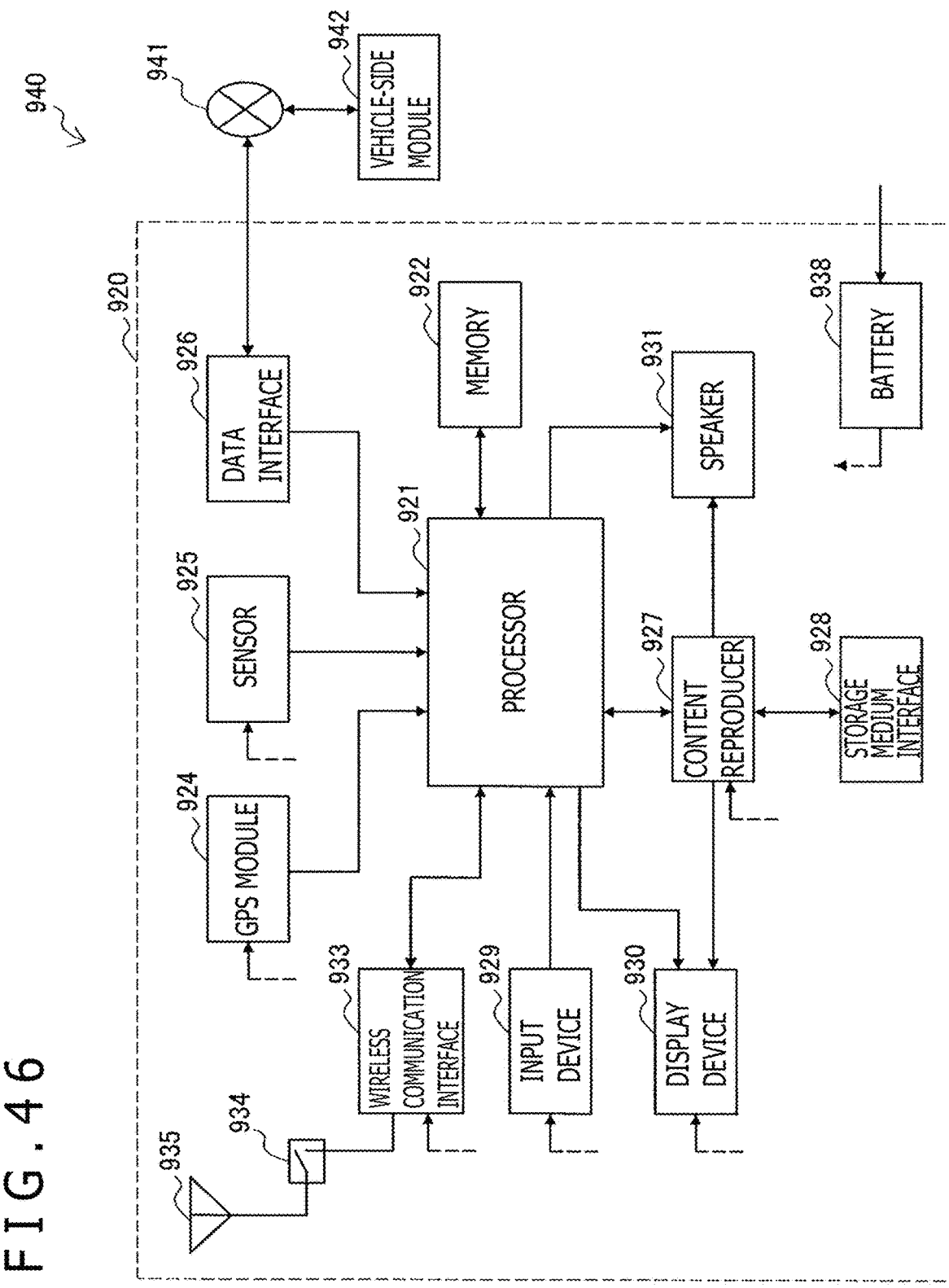
FIG. 46 is a block diagram illustrating by way of example a general arrangement of a car navigation apparatus.

FIG. 46 is a block diagram illustrating by way of example a general arrangement of a car navigation apparatus 920 to which a technique according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may include, for example, a CPU or a SoC, and controls the functions of a navigation function and other functions of the car navigation apparatus 920. The memory 922 includes a RAM and a ROM, and stores programs executed by the processor 921 and data.

The GPS module 924 measures the position (e.g., latitude, longitude, and height) of the car navigation apparatus 920 using GPS signals received from GPS satellites. The sensor 925 may include a group of sensors such as a gyro sensor, a geomagnetic sensor, and an air pressure sensor, for example. The data interface 926 is connected to an in-vehicle network 941 through terminals, not illustrated, for example, and acquires data such as vehicle speed data generated by the vehicle.

The content reproducer 927 reproduces content stored in a storage medium (e.g., a compact disc (CD) or a digital versatile disc (DVD)) inserted in the storage medium interface 928. The input device 929 includes, for example, a touch sensor for detecting touches on the screen of the display device 930, buttons, or switches, and receives operations from the user or information inputs. The display device 930 has a screen provided by an LCD or an OLED, and displays images from the navigation function and content that is reproduced. The speaker 931 outputs sounds from the navigation function and content that is reproduced.

The wireless communication interface 933 supports one or more of wireless LAN standards such as IEEE802.11a, 11b, 11g, 11n, 11ac, and 11ad, and performs wireless communication. In an infrastructure mode, the wireless communication interface 933 can communicate with other devices through a wireless LAN access point. In a direct communication mode such as an ad hoc mode or Wi-Fi Direct or the like, the wireless communication interface 933 can communicate directly with other devices. The wireless communication interface 933 may typically include a baseband processor, an RF circuit, and a power amplifier, etc. The wireless communication interface 933 may include a one-chip module having an integrated assembly of a memory storing a communication control program, a processor for executing the communication control program, and related circuits. The wireless communication interface 933 may support, in addition to the wireless LAN system, other types of wireless communication systems including a short-distance wireless communication system, a proximity wireless communication system, and a cellular communication system. The antenna switch 934 switches between a plurality of circuits included in the wireless communication interface 933 for connection to the antenna 935. The antenna 935 has a single element or a plurality of antenna elements, and is used to send and receive wireless signals via the wireless communication interface 933.

The car navigation apparatus 920 is not limited to the example illustrated in FIG. 46, but may have a plurality of antennas. In such a case, the antenna switch 934 may be omitted from the arrangement of the car navigation apparatus 920.

The battery 938 supplies electric power to the blocks of the car navigation apparatus 920 illustrated in FIG. 46 through feed lines partly illustrated by the broken lines in FIG. 46. The battery 938 stores electric power supplied from the vehicle.

In the car navigation apparatus 920 illustrated in FIG. 46, the controller 140 described with reference to FIG. 3 and the controller 270 described with reference to FIG. 4 may be implemented by the wireless communication interface 933. At least part of the functions of these controllers may be implemented by the processor 921.

The technology in the present disclosure may be implemented as an in-vehicle system (or a vehicle) 940 including one or more blocks of the car navigation apparatus 920 described above, the in-vehicle network 941, and a vehicle-side module 942. The vehicle-side module 942 generates vehicle-side data such as a vehicle speed, an engine rotational speed, or failure information, and outputs the generated data to the in-vehicle network 941.

The embodiments described above have been illustrated by way of example for realizing the present technology, and items in the embodiments and inventive particular items in the scope of claims for patent correspond to each other. Similarly, inventive particular items in the scope of claims for patent and items in the embodiments to which the same names are applied correspond to each other. However, the present technology is not limited to the embodiments, and various changes and modifications may be made to the embodiments without departing from the scope and sprits of the present technology.

The processing sequences described in the above embodiments may be understood as a method including those sequences or may be understood as a program for enabling a computer to perform those sequences or a recording medium storing such a program. The recording medium may include, for example, a compact disc (CD), a minidisc (MD), a digital versatile disc (DVD), a memory card, a Blu-ray disc (Blu-ray (registered trademark) Disc), or the like.

The advantages referred to in the present description are given by illustrative example only, and not limitative. Other advantages may also be added.

The present technology may also be arranged as follows:

(1)

An information processing apparatus including:

a wireless communication unit configured to perform data transmission with another information processing apparatus; and a controller configured to, while data transmission is being performed between the information processing apparatus and a first information processing apparatus which plays the role of a group owner of a network made up of at least the information processing apparatus and the first information processing apparatus, if the information processing apparatus is to newly perform data transmission with a second information processing apparatus, perform a control process to exchange information to change roles for carrying out each data transmission to the first information processing apparatus and the second information processing apparatus.

(2)

The information processing apparatus according to the above (1), wherein the controller performs a control process to exchange, as the information, at least one of information indicative of whether the first information processing apparatus permits the role of the group owner to be changed, information indicative of whether the information processing apparatus and the first information processing apparatus each have a concurrent function, and information indicative of whether the information processing apparatus is compatible with a plurality of operations for carrying out wireless communications with a plurality of devices.

(3)

The information processing apparatus according to the above (1) or (2), wherein the controller performs a control process to include the information in a message exchanged between the information processing apparatus and the first information processing apparatus and exchange the message.

(4)

The information processing apparatus according to any one of the above (1) to (3), wherein if the first information processing apparatus permits the role of the group owner to be changed, the controller performs a control process to change the role of the group owner from the first information processing apparatus to the information processing apparatus and thereafter perform a connection process to connect to the second information processing apparatus.

(5)

The information processing apparatus according to any one of the above (1) to (3), wherein if the first information processing apparatus permits the role of the group owner to be changed and both the information processing apparatus and the first information processing apparatus have a concurrent function, the controller performs a control process to change the role of the group owner from the first information processing apparatus to the information processing apparatus, thereafter perform a cutoff process to cut off the information processing apparatus and the first information processing apparatus from each other, and perform a connection process to perform each data transmission to the first information processing apparatus and the second information processing apparatus.

(6)

The information processing apparatus according to any one of the above (1) to (5), wherein if the first information processing apparatus permits the role of the group owner to be changed, and when the second information processing apparatus does not hold connection setting information about a situation where the information processing apparatus is a group owner and the first information processing apparatus is a client, the controller performs a control process to include information for acquiring the connection setting information in a message exchanged between the information processing apparatus and the first information processing apparatus before the role of the group owner is changed from the first information processing apparatus to the information processing apparatus.

(7)

The information processing apparatus according to any one of the above (1) to (6), wherein the controller performs a control process to include at least one of information about dynamic host configuration protocol, media access control address information during communication, information for shifting an Internet protocol address while high-bandwidth digital content protection system is in operation, and information required for Persistent, in a message exchanged between the information processing apparatus and the first information processing apparatus, and exchange the message.

(8)

The information processing apparatus according to any one of the above (1) to (7), wherein if connection setting information of a connected state after the role is changed is not held, the controller applies a predetermined rule to first connection setting information already shared before the role is changed, thereby generating second connection setting information after the role is changed.

(9)

The information processing apparatus according to the above (8), wherein the controller uses only the first connection setting information which only the information processing apparatus and the first information processing apparatus have, in generating the second connection setting information.

(10)

The information processing apparatus according to any one of the above (1) to (3) and (7) to (9), wherein if the first information processing apparatus does not permit the role of the group owner to be changed, and the information processing apparatus is incompatible with a plurality of operations, the controller provides the user with selection information for selecting one of the first information processing apparatus and the second information processing apparatus for data transmission.

(11)

The information processing apparatus according to the above (10), wherein the controller manages image information to be handled for data transmission and the selection information differently from each other.

(12)

The information processing apparatus according to any one of the above (1) to (3) and (7) to (9), wherein if the first information processing apparatus permits the role of the group owner to be changed, and when the role of the group owner is changed from the first information processing apparatus to the information processing apparatus, the controller provides the user with notification information for notifying the user of the changed role of the group owner.

(13)

The information processing apparatus according to any one of the above (1) to (12), wherein the wireless communication unit performs data transmission with the other information processing apparatus according to Wireless Fidelity CERTIFIED Miracast specifications.

(14)

An information processing method for, while data transmission is being performed between an own apparatus and a first information processing apparatus which plays the role of a group owner of a network made up of at least the own apparatus and the first information processing apparatus, if the own apparatus is to newly perform data transmission with a second information processing apparatus, performing a control process to exchange information to change roles for carrying out each data transmission to the first information processing apparatus and the second information processing apparatus.

(15)

A program for enabling a computer to perform, while data transmission is being performed between an own apparatus and a first information processing apparatus which plays the role of a group owner of a network made up of at least the own apparatus and the first information processing apparatus, if the own apparatus is to newly perform data transmission with a second information processing apparatus, a control process to exchange information to change roles for carrying out each data transmission to the first information processing apparatus and the second information processing apparatus.

REFERENCE SIGNS LIST

10 Communication system
41 Source device
42 First sink device
43 Second sink device
100 Source device
110 Antenna
120 Wireless communication unit
130 Control signal receiver
140 Controller
150 Image/sound signal generator
160 Image/sound compressor
170 Stream transmitter
180 Operation receiver
190 Display unit
200 First sink device
210 Antenna
220 Wireless communication unit
230 Stream receiver
240 Image/sound expander
250 Image/sound output unit
251 Display unit
252 Sound output unit
260 User information acquisition unit
270 Controller
280 Control signal transmitter
290 Management information holder
300 Second sink device
301 Display unit
320 Device role manager
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory 924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle-side module

The invention claimed is:

1. An information processing apparatus comprising:
a wireless communication unit configured to perform data transmission with another information processing apparatus; and
a controller configured to,
exchange first information with a first information processing apparatus, wherein the first information includes information indicative of whether the first information processing apparatus permits a role of a group owner to be changed,
perform data transmission between said information processing apparatus and said first information processing apparatus which plays the role of the group owner of a network made up of at least said information processing apparatus and said first information processing apparatus based on the first information, and
if said information processing apparatus is to newly perform data transmission with a second information processing apparatus, perform a control process to transmit a second information to the second information processing apparatus, to change roles for carrying out each data transmission to said first information processing apparatus and to said second information processing apparatus, wherein said second information includes
the first information, and at least one of information indicative of whether said information processing apparatus and said first information processing apparatus each have a concurrent function, and
information indicative of whether said information processing apparatus is compatible with a plurality of operations for carrying out wireless communications with a plurality of devices, the concurrent function being to at least one of a source device being configured to set up a concurrent session with one more sink devices, and a sink device being configured to set up a concurrent session with one more source devices.

2. The information processing apparatus according to claim 1, wherein said controller performs a control process to include said first information in a message exchanged between said information processing apparatus and said first information processing apparatus and exchange said message.

3. The information processing apparatus according to claim 1, wherein if said first information processing apparatus permits the role of said group owner to be changed, said controller performs a control process to change the role of said group owner from said first information processing apparatus to said information processing apparatus and thereafter perform a connection process to connect to said second information processing apparatus.

4. The information processing apparatus according to claim 1, wherein if said first information processing apparatus permits the role of said group owner to be changed and both said information processing apparatus and said first information processing apparatus have the concurrent function, said controller performs a control process to change the role of said group owner from said first information processing apparatus to said information processing apparatus, and thereafter performs a cutoff process to cut off said information processing apparatus and said first information processing apparatus from each other, and perform a connection process to perform data transmission to said first information processing apparatus and said second information processing apparatus.

5. The information processing apparatus according to claim 1, wherein in response to a determination by said controller that said first information processing apparatus permits the role of said group owner to be changed, and in response to a determination by said controller that said second information processing apparatus does not hold connection setting information about a situation where said information processing apparatus is a group owner and said first information processing apparatus is a client, said controller performs a control process to include information for acquiring said connection setting information in a message exchanged between said information processing apparatus and said first information processing apparatus before the role of said group owner is changed from said first information processing apparatus to said information processing apparatus.

6. The information processing apparatus according to claim 1, wherein said controller performs a control process to include at least one of information about dynamic host configuration protocol, media access control address information during communication, information for shifting an Internet protocol address while high-bandwidth digital content protection system is in operation, and information required for Persistent, in a message exchanged between said information processing apparatus and said first information processing apparatus, and exchange said message.

7. The information processing apparatus according to claim 1, wherein, in response to a determination by said controller that connection setting information of a connected state after said role is changed is not held, said controller applies a predetermined rule to first connection setting information already shared before said role is changed, thereby generating second connection setting information after said role is changed.

8. The information processing apparatus according to claim 1, wherein upon a determination by said controller that said first information processing apparatus does not permit the role of said group owner to be changed, and when said information processing apparatus is incompatible with a plurality of operations, said controller provides a user with selection information for selecting one of said first information processing apparatus and said second information processing apparatus for data transmission.

9. The information processing apparatus according to claim 8, wherein said controller manages image information to be handled for data transmission and said selection information differently from each other.

10. The information processing apparatus according to claim 1, wherein, in response to a determination by said controller that said first information processing apparatus permits the role of said group owner to be changed, and when the role of said group owner is changed from said first information processing apparatus to said information processing apparatus, said controller provides a user with notification information for notifying the user of the changed role of said group owner.

11. The information processing apparatus according to claim 1, wherein said wireless communication unit performs data transmission with said other information processing apparatus according to Wireless Fidelity CERTIFIED Miracast specifications.

12. An information processing method, implemented in a controller in an information processing apparatus, the method comprising:
   exchanging, the controller, first information with a first information processing apparatus, wherein the first information includes information indicative of whether the first information processing apparatus permits a role of a group owner to be changed,
   performing, by the controller, data transmission between the information processing apparatus and a first information processing apparatus, which plays a role of the group owner of a network made up of at least said information processing apparatus and said first information processing apparatus based on the first information, and
   under a condition that the information processing apparatus is to newly perform data transmission with a second information processing apparatus, performing a control process to transmit a second information to the second information processing apparatus, to change roles for carrying out each data transmission to said first information processing apparatus and to said second information processing apparatus, wherein
said second information includes
   the first information, and at least one of information indicative of whether said information processing apparatus and said first information processing apparatus each have a concurrent function, and
   information indicative of whether said information processing apparatus is compatible with a plurality of operations for carrying out wireless communications with a plurality of devices,
the concurrent function being to at least one of
   a source device being configured to set up a concurrent session with one more sink devices, and
   a sink device being configured to set up a concurrent session with one more source devices.

* * * * *